US011648685B2

(12) United States Patent
Angle et al.

(10) Patent No.: US 11,648,685 B2
(45) Date of Patent: May 16, 2023

(54) MOBILE ROBOT PROVIDING ENVIRONMENTAL MAPPING FOR HOUSEHOLD ENVIRONMENTAL CONTROL

(71) Applicant: iRobot Corporation, Bedford, MA (US)

(72) Inventors: Colin Angle, Beverly, MA (US); David Snelling, Needham, MA (US); Melissa O'Dea, Chelmsford, MA (US); Timothy S. Farlow, Billerica, MA (US); Samuel Duffley, Cambridge, MA (US); Jeffrey W. Mammen, Westford, MA (US); Michael J. Halloran, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 264 days.

(21) Appl. No.: 16/138,155

(22) Filed: Sep. 21, 2018

(65) Prior Publication Data

US 2019/0097827 A1 Mar. 28, 2019
US 2020/0403820 A9 Dec. 24, 2020

Related U.S. Application Data

(60) Division of application No. 16/020,313, filed on Jun. 27, 2018, now abandoned, which is a continuation of
(Continued)

(51) Int. Cl.
*G05D 1/02* (2020.01)
*B25J 13/00* (2006.01)
(Continued)

(52) U.S. Cl.
CPC ............ *B25J 13/006* (2013.01); *G05B 15/02* (2013.01); *G05D 1/0022* (2013.01);
(Continued)

(58) Field of Classification Search
CPC . G05B 2219/2642; B25J 5/007; B25J 9/0003; B25J 9/1694; B25J 9/1697;
(Continued)

(56) References Cited

U.S. PATENT DOCUMENTS

| 5,086,535 | A | * | 2/1992 | Grossmeyer | ........ | A47L 11/4011 |
| | | | | | | 15/340.1 |
| 5,787,545 | A | * | 8/1998 | Colens | .................... | H02J 7/025 |
| | | | | | | 15/340.1 |

(Continued)

FOREIGN PATENT DOCUMENTS

| AU | 2013374347 | 4/2015 |
| AU | 2014207323 | 4/2015 |

(Continued)

OTHER PUBLICATIONS

Thomas, Amanda, "How Often Should I . . . ?", Sep. 19, 2012, https://www.quickanddirtytips.com/house-home/housekeeping/how-often-should-i (Year: 2012).*

(Continued)

*Primary Examiner* — Spencer D Patton
(74) *Attorney, Agent, or Firm* — Schwegman Lundberg & Woessner, P.A.

(57) ABSTRACT

A mobile robot includes a processor connected to a memory and a wireless network circuit, for executing routines stored in the memory and commands generated by the routines and received via the wireless network circuit. The processor drives the mobile robot to a multiplicity of accessible two dimensional locations within a household, and commands an end effector, including at least one motorized actuator, to perform mechanical work in the household. A plurality of routines include a first routine which monitors a wireless local network and detects a presence of a network entity on the wireless local network, a second routine which receives a signal from a sensor detecting an action state of one of the
(Continued)

network entities, the action state changeable between waiting and active, and a third routine which commands the end effector to change state of performing mechanical work based on the presence and on the action state.

20 Claims, 20 Drawing Sheets

Related U.S. Application Data application No. 15/709,874, filed on Sep. 20, 2017, now Pat. No. 10,391,638, which is a continuation of application No. 14/956,523, filed on Dec. 2, 2015, now Pat. No. 9,802,322, which is a continuation of application No. 14/160,299, filed on Jan. 21, 2014, now Pat. No. 9,233,472, which is a continuation-in-part of application No. 14/046,940, filed on Oct. 5, 2013, now Pat. No. 9,380,922.

(60) Provisional application No. 61/772,940, filed on Mar. 5, 2013, provisional application No. 61/754,319, filed on Jan. 18, 2013.

(51) Int. Cl.
| | |
|---|---|
| *H04L 12/28* | (2006.01) |
| *G05D 1/00* | (2006.01) |
| *H04L 67/62* | (2022.01) |
| *H04L 67/125* | (2022.01) |
| *H04W 4/30* | (2018.01) |
| *G05B 15/02* | (2006.01) |
| *G06F 15/16* | (2006.01) |
| *G06Q 10/1093* | (2023.01) |
| *H04B 5/00* | (2006.01) |

(52) U.S. Cl.
CPC .......... *G05D 1/0044* (2013.01); *G06F 15/16* (2013.01); *G06Q 10/1095* (2013.01); *H04L 12/282* (2013.01); *H04L 12/2809* (2013.01); *H04L 67/125* (2013.01); *H04L 67/62* (2022.05); *H04W 4/30* (2018.02); *A47L 2201/00* (2013.01); *G05B 2219/2642* (2013.01); *G05D 2201/0203* (2013.01); *H04B 5/0031* (2013.01); *H04L 2012/285* (2013.01); *H04L 2012/2841* (2013.01); *Y10S 901/01* (2013.01)

(58) Field of Classification Search
CPC ............... B25J 11/008; B25J 11/0085; G05D 2201/203; G05D 2201/208; G05D 2201/0215; G05D 2201/0211; G05D 2201/0206; H04L 2012/285; H04L 12/2803; H04L 12/282; Y10S 901/01; A47L 2201/00–06
See application file for complete search history.

(56) References Cited

U.S. PATENT DOCUMENTS

| | | | |
|---|---|---|---|
| 5,942,869 A | 8/1999 | Katou et al. | |
| 6,389,329 B1 | 5/2002 | Colens | |
| 6,532,404 B2 | 3/2003 | Colens | |
| 6,594,844 B2 | 7/2003 | Jones | |
| 6,658,325 B2 | 12/2003 | Zweig | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,909,921 B1 | 6/2005 | Bilger | |
| 6,965,209 B2 | 11/2005 | Jones et al. | |
| 7,024,278 B2 | 4/2006 | Chiappetta et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,332,890 B2 | 2/2008 | Cohen et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler et al. | |
| 7,769,492 B2 | 8/2010 | Wang et al. | |
| 8,364,309 B1* | 1/2013 | Bailey | G05D 1/0272 700/245 |
| 8,374,421 B1 | 2/2013 | Hickman | |
| 8,438,695 B2 | 5/2013 | Gilbert, Jr. et al. | |
| 8,510,255 B2 | 8/2013 | Fadell et al. | |
| 8,528,157 B2 | 9/2013 | Schnittman et al. | |
| 8,639,644 B1 | 1/2014 | Hickman et al. | |
| 8,798,834 B2 | 8/2014 | Jeong et al. | |
| 8,903,590 B2 | 12/2014 | Jeon | |
| 9,008,835 B2 | 4/2015 | Dubrovsky et al. | |
| 9,233,472 B2 | 1/2016 | Angle et al. | |
| 9,375,847 B2 | 6/2016 | Angle et al. | |
| 9,380,922 B2* | 7/2016 | Duffley | G05D 1/0274 |
| 9,802,322 B2 | 10/2017 | Angle et al. | |
| 9,874,873 B2 | 1/2018 | Angle et al. | |
| 10,391,638 B2 | 8/2019 | Angle et al. | |
| 10,488,857 B2 | 11/2019 | Duffley et al. | |
| 2002/0016649 A1 | 2/2002 | Jones | |
| 2002/0113877 A1 | 8/2002 | Welch | |
| 2002/0120364 A1* | 8/2002 | Colens | B25J 9/1694 700/262 |
| 2002/0173877 A1 | 11/2002 | Zweig | |
| 2003/0025472 A1 | 2/2003 | Jones et al. | |
| 2003/0184436 A1 | 10/2003 | Seales et al. | |
| 2003/0187573 A1 | 10/2003 | Agnew et al. | |
| 2004/0020000 A1* | 2/2004 | Jones | G05D 1/0238 15/319 |
| 2004/0049877 A1 | 3/2004 | Jones et al. | |
| 2004/0113777 A1 | 6/2004 | Matsuhira et al. | |
| 2004/0158357 A1 | 8/2004 | Lee et al. | |
| 2004/0187457 A1 | 9/2004 | Colens | |
| 2004/0207355 A1 | 10/2004 | Jones et al. | |
| 2005/0010331 A1 | 1/2005 | Taylor et al. | |
| 2005/0067994 A1 | 3/2005 | Jones et al. | |
| 2005/0171636 A1 | 8/2005 | Tani | |
| 2005/0204505 A1 | 9/2005 | Kashiwagi | |
| 2005/0204717 A1 | 9/2005 | Colens | |
| 2005/0287038 A1* | 12/2005 | Dubrovsky | B25J 13/006 422/63 |
| 2006/0095158 A1 | 5/2006 | Lee et al. | |
| 2006/0235585 A1 | 10/2006 | Tanaka | |
| 2006/0287801 A1 | 12/2006 | Im | |
| 2006/0293788 A1 | 12/2006 | Pogodin | |
| 2007/0192910 A1 | 8/2007 | Vu et al. | |
| 2007/0250212 A1 | 10/2007 | Halloran et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2008/0311878 A1 | 12/2008 | Martin et al. | |
| 2009/0037033 A1 | 2/2009 | Phillips et al. | |
| 2009/0082879 A1 | 3/2009 | Dooley et al. | |
| 2009/0082897 A1 | 3/2009 | Cain et al. | |
| 2009/0281661 A1 | 11/2009 | Dooley et al. | |
| 2009/0303042 A1 | 12/2009 | Song et al. | |
| 2009/0306822 A1 | 12/2009 | Augenbraun et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0077802 A1 | 3/2011 | Halloran et al. | |
| 2011/0153081 A1* | 6/2011 | Romanov | A47L 9/2873 700/255 |
| 2011/0194413 A1 | 8/2011 | Radunovic et al. | |
| 2011/0264305 A1 | 10/2011 | Choe et al. | |
| 2012/0066168 A1 | 3/2012 | Fadell et al. | |
| 2012/0125363 A1 | 5/2012 | Kim et al. | |

(56) References Cited

U.S. PATENT DOCUMENTS

| | | | |
|---|---|---|---|
| 2012/0229660 A1 | 9/2012 | Matthews et al. | |
| 2012/0256009 A1 | 10/2012 | Mucignat et al. | |
| 2012/0259481 A1 | 10/2012 | Kim | |
| 2012/0265370 A1 | 10/2012 | Kim et al. | |
| 2012/0310463 A1 | 12/2012 | Jeong et al. | |
| 2012/0323365 A1 | 12/2012 | Taylor et al. | |
| 2013/0056032 A1 | 3/2013 | Choe et al. | |
| 2013/0060379 A1 | 3/2013 | Choe et al. | |
| 2013/0206177 A1 | 8/2013 | Burlutskiy | |
| 2014/0100736 A1* | 4/2014 | Kim | B25J 9/0003 701/26 |
| 2014/0167931 A1 | 6/2014 | Lee | |
| 2014/0207280 A1 | 7/2014 | Duffley et al. | |
| 2014/0207281 A1 | 7/2014 | Angle et al. | |
| 2014/0207282 A1 | 7/2014 | Angle et al. | |
| 2015/0230100 A1 | 8/2015 | Atia et al. | |
| 2016/0000289 A1 | 1/2016 | Senoo et al. | |
| 2016/0167234 A1 | 6/2016 | Angle et al. | |
| 2016/0226676 A1* | 8/2016 | Shin | H04L 12/2827 |
| 2016/0282862 A1 | 9/2016 | Duffley et al. | |
| 2016/0282863 A1 | 9/2016 | Angle et al. | |
| 2018/0071918 A1 | 3/2018 | Angle et al. | |
| 2018/0304472 A1 | 10/2018 | Angle et al. | |

FOREIGN PATENT DOCUMENTS

| | | | |
|---|---|---|---|
| AU | 2013374347 | | 5/2016 |
| AU | 2014207323 | | 2/2017 |
| AU | 2017200992 | | 3/2017 |
| AU | 2017200992 | | 1/2019 |
| CA | 2886106 | | 7/2014 |
| CA | 2886451 | | 7/2014 |
| CN | 1391388 | A | 1/2003 |
| CN | 1768683 | | 5/2006 |
| CN | 1900987 | A | 1/2007 |
| CN | 101194813 | | 6/2008 |
| CN | 100431808 | C | 11/2008 |
| CN | 201327585 | | 10/2009 |
| CN | 201602711 | | 10/2010 |
| CN | 201602711 | U * | 10/2010 |
| CN | 102018481 | | 4/2011 |
| CN | 102053623 | A | 5/2011 |
| CN | 102065738 | A | 5/2011 |
| CN | 102083352 | | 6/2011 |
| CN | 102341724 | | 2/2012 |
| CN | 109965778 | A | 7/2019 |
| CN | 110051288 | A | 7/2019 |
| CN | 109965778 | | 8/2022 |
| CN | 110051288 | | 11/2022 |
| EP | 2 381 328 | A2 | 10/2011 |
| EP | 2 508 957 | A2 | 10/2012 |
| EP | 2 511 782 | A2 | 10/2012 |
| EP | 2945783 | A1 | 11/2015 |
| EP | 2946567 | | 11/2015 |
| GB | 2407651 | | 5/2005 |
| JP | 2000342497 | | 12/2000 |
| JP | 2002-085305 | | 3/2002 |
| JP | 2002244731 | A | 8/2002 |
| JP | 2002312035 | A | 10/2002 |
| JP | 2004033340 | | 2/2004 |
| JP | 2005160958 | | 6/2005 |
| JP | 2005-211498 | | 8/2005 |
| JP | 2005211359 | A | 8/2005 |
| JP | 2005331128 | | 12/2005 |
| JP | 2005352707 | | 12/2005 |
| JP | 2006020830 | A | 1/2006 |
| JP | 2007147217 | | 6/2007 |
| JP | 2007159609 | | 6/2007 |
| JP | 2007330567 | A | 12/2007 |
| JP | 2008023142 | A | 2/2008 |
| JP | 2008191738 | | 8/2008 |
| JP | 2009088995 | A | 4/2009 |
| JP | 2009518716 | A | 5/2009 |
| JP | 2010017428 | | 1/2010 |
| JP | 2010089844 | A | 4/2010 |
| JP | 2010-198064 | | 9/2010 |
| JP | 2011233149 | | 11/2011 |
| JP | 2012-190073 | | 10/2012 |
| JP | 2004350801 | | 12/2016 |
| JP | 2020124508 | | 8/2020 |
| KR | 10-2006-0078099 | A | 7/2006 |
| KR | 10-0645379 | B1 | 11/2006 |
| KR | 10-2008-0052029 | A | 6/2008 |
| KR | 10-2009-0012542 | A | 2/2009 |
| KR | 10-2009-0036766 | A | 4/2009 |
| KR | 20090012542 | U | 12/2009 |
| KR | 10-2012-0114671 | A | 10/2012 |
| KR | 10-2012-0126772 | A | 11/2012 |
| WO | WO-9601072 | A1 * | 1/1996 ......... A47L 11/4011 |
| WO | 2008136570 | | 11/2008 |
| WO | 2012/142225 | | 10/2012 |
| WO | 2014113091 | | 7/2014 |
| WO | WO-2014113713 | A1 | 7/2014 |
| WO | WO-2014113806 | A1 | 7/2014 |

OTHER PUBLICATIONS

ABC Oriental Rug, "Carpet Tips," accessed Jan. 14, 2013, https://www.abc-oriental-rug.com/carpet-tips.html (Year: 2013).*

"Chinese Application Serial No. 201710707170.7, Office Action dated Jul. 18, 2019", w/ English Translation, 29 pgs.

"Chinese Application Serial No. 201710707170.7, Office Action dated Feb. 26, 2020", w English Translation, 26 pgs.

"Japanese Application Serial No. 2020-029004, Voluntary Amendment filed Mar. 6, 2020", w English claims, 13 pgs.

"Chinese Application Serial No. 201910111197.9, Notification to Make Divisional Application dated Oct. 10, 2020", w English translation, 3 pgs.

"U.S. Appl. No. 16/020,313, Appeal Decision filed Nov. 23, 2020", 10 pgs.

"Chinese Application Serial No. 201910111141.3, Office Action dated Oct. 16, 2020", w English translation, 24 pgs.

"U.S. Appl. No. 14/046,940, Final Office Action dated Oct. 29, 2015", 15 pgs.

"U.S. Appl. No. 14/046,940, Non Final Office Action dated Jun. 1, 2015", 14 pgs.

"U.S. Appl. No. 14/046,940, Notice of Allowance dated Mar. 16, 2016", 8 pgs.

"U.S. Appl. No. 14/046,940, Notice of Allowance dated Apr. 7, 2016", 5 pgs.

"U.S. Appl. No. 14/046,940, Response filed Jan. 28, 2016 to Final Office Action dated Oct. 29, 2015", 14 pgs.

"U.S. Appl. No. 14/046,940, Response filed May 6, 2015 to Restriction Requirement dated Mar. 11, 2015", 7 pgs.

"U.S. Appl. No. 14/046,940, Response filed Sep. 21, 2015 to Non Final Office Action dated Jun. 1, 2015", 12 pgs.

"U.S. Appl. No. 14/046,940, Restriction Requirement dated Mar. 11, 2015", 7 pgs.

"U.S. Appl. No. 14/158,557, Non Final Office Action dated Jun. 11, 2015", 9 pgs.

"U.S. Appl. No. 14/158,557, Non Final Office Action dated Sep. 21, 2015", 14 pgs.

"U.S. Appl. No. 14/158,557, Notice of Allowance dated Mar. 8, 2016", 5 pgs.

"U.S. Appl. No. 14/158,557, Response filed Jan. 12, 2016 to Non Final Office Action dated Sep. 21, 2015", 11 pgs.

"U.S. Appl. No. 14/158,557, Response filed May 6, 2015 to Restriction Requirement dated Mar. 10, 2015", 7 pgs.

"U.S. Appl. No. 14/158,557, Response filed Jul. 8, 2015 to Non Final Office Action dated Jun. 11, 2015", 12 pgs.

"U.S. Appl. No. 14/158,557, Restriction Requirement dated Mar. 10, 2015", 5 pgs.

"U.S. Appl. No. 14/160,299, Non Final Office Action dated Sep. 21, 2015", 10 pgs.

"U.S. Appl. No. 14/160,299, Notice of Allowance dated Oct. 27, 2015", 7 pgs.

"U.S. Appl. No. 14/160,299, Response filed Aug. 24, 2015 to Restriction Requirement dated Aug. 17, 2015", 7 pgs.

(56) References Cited

OTHER PUBLICATIONS

"U.S. Appl. No. 14/160,299, Response filed Oct. 13, 2015 to Non Final Office Action dated Sep. 21, 2015", 8 pgs.
"U.S. Appl. No. 14/160,299, Restriction Requirement dated Aug. 17, 2015", 7 pgs.
"U.S. Appl. No. 14/956,523, Notice of Allowance dated Jun. 23, 2017", 9 pgs.
"U.S. Appl. No. 14/956,523, Preliminary Amendment filed Mar. 7, 2016", 5 pgs.
"U.S. Appl. No. 14/956,523, Preliminary Amendment filed Dec. 2, 2015", 3 pgs.
"U.S. Appl. No. 15/162,756, Non Final Office Action dated Mar. 20, 2017", 6 pgs.
"U.S. Appl. No. 15/162,756, Non Final Office Action dated Aug. 10, 2017", 6 pgs.
"U.S. Appl. No. 15/162,756, Notice of Allowance dated Dec. 19, 2017", 2 pgs.
"U.S. Appl. No. 15/162,756, Preliminary Amendment filed Sep. 15, 2016", 7 pgs.
"U.S. Appl. No. 15/162,756, Response filed May 26, 2017 to Non Final Office Action dated Mar. 20, 2017", 8 pgs.
"U.S. Appl. No. 15/162,756, Response filed Oct. 5, 2017 to Non Final Office Action dated Aug. 10, 2017", 8 pgs.
"U.S. Appl. No. 15/174,292, Advisory Action dated May 1, 2019", 3 pgs.
"U.S. Appl. No. 15/174,292, Advisory Action dated Jun. 18, 2018", 4 pgs.
"U.S. Appl. No. 15/174,292, Applicant's Summary of Examiner Interview filed Feb. 1, 2019", 1 pg.
"U.S. Appl. No. 15/174,292, Examiner Interview Summary dated Jan. 23, 2019", 4 pgs.
"U.S. Appl. No. 15/174,292, Examiner Interview Summary dated Oct. 18, 2018", 4 pgs.
"U.S. Appl. No. 15/174,292, Final Office Action dated Feb. 4, 2019", 17 pgs.
"U.S. Appl. No. 15/174,292, Final Office Action dated Apr. 10, 2018", 14 pgs.
"U.S. Appl. No. 15/174,292, Non Final Office Action dated Jul. 26, 2018", 14 pgs.
"U.S. Appl. No. 15/174,292, Non Final Office Action dated Oct. 4, 2017", 18 pgs.
"U.S. Appl. No. 15/174,292, Notice of Allowance dated Jul. 15, 2019", 5 pgs.
"U.S. Appl. No. 15/174,292, Preliminary Amendment filed Jun. 6, 2016", 4 pgs.
"U.S. Appl. No. 15/174,292, Preliminary Amendment filed Sep. 13, 2016", 7 pgs.
"U.S. Appl. No. 15/174,292, Response filed Feb. 5, 2018 to Non Final Office Action dated Oct. 4, 2017", 11 pgs.
"U.S. Appl. No. 15/174,292, Response filed Apr. 3, 2019 to Final Office Action dated Feb. 4, 2019", 11 pgs.
"U.S. Appl. No. 15/174,292, Response filed Jun. 11, 2018 to Final Office Action dated Apr. 10, 2018", 11 pgs.
"U.S. Appl. No. 15/174,292, Response filed Jul. 10, 2018 to Advisory Action dated Jun. 18, 2018", 12 pgs.
"U.S. Appl. No. 15/174,292, Response filed Nov. 20, 2018 to Non Final Office Action dated Jul. 26, 2018", 12 pgs.
"U.S. Appl. No. 15/709,874, Notice of Allowance dated Jun. 3, 2019", 15 pgs.
"U.S. Appl. No. 15/709,874, Preliminary Amendment filed Mar. 21, 2018", 6 pgs.
"U.S. Appl. No. 15/709,874, Preliminary Amendment filed Sep. 20, 2017", 3 pgs.
"U.S. Appl. No. 16/020,313, Appeal Brief filed Jul. 25, 2019", 19 pgs.
"U.S. Appl. No. 16/020,313, Applicant's Summary of Examiner Interview filed Jan. 22, 2019", 1 pg.
"U.S. Appl. No. 16/020,313, Examiner Interview Summary dated Jan. 9, 2019", 3 pgs.
"U.S. Appl. No. 16/020,313, Final Office Action dated Apr. 16, 2019", 12 pgs.
"U.S. Appl. No. 16/020,313, Non Final Office Action dated Oct. 9, 2018", 11 pgs.
"U.S. Appl. No. 16/020,313, Preliminary Amendment filed Jun. 27, 2018", 6 pgs.
"U.S. Appl. No. 16/020,313, Response filed Jan. 9, 2019 to Non Final Office Action dated Oct. 9, 2018", 8 pgs.
"U.S. Appl. No. 16/020,313, Response filed Sep. 21, 2018 to Restriction Requirement dated Jul. 25, 2018", 4 pgs.
"U.S. Appl. No. 16/020,313, Restriction Requirement dated Jul. 25, 2018", 5 pgs.
"Chinese Application Serial No. 201710707187.2, Office Action dated May 20, 2019", W/English Translation, 10 pgs.
"European Application Serial No. 13871603.0, Communication Pursuant to Article 94(3) EPC dated Mar. 18, 2019", 4 pgs.
"European Application Serial No. 14740799.3, Intention to Grant dated May 15, 2019", 105 pgs.
"European Application Serial No. 14740799.3, Response filed Mar. 8, 2016 to Communication pursuant to Rules 161(2) and EPC dated Sep. 16, 2015", 16 pgs.
"European Application Serial No. 14740799.3, Response filed Nov. 22, 2016 to Extended European Search Report dated Aug. 3, 2016", 23 pgs.
"Japanese Application Serial No. 2017-198403, Office Action dated Nov. 30, 2018", 8 pgs.
Antalóczy, Tibor "LG Hom-bot 2.0 demo at CES 2012" Robot Buying Guide Retrieved from the internet at URL: http://robotbg.com/news/2012/01/14/lg_hom_bot_20_demo_at_ces_2012 (3 pages) (Accessed Jun. 4, 2015) (Jan. 13, 2012).
Extended European Search Report Corresponding to European Application No. 13871603.0 (7 Pages) (dated Aug. 1, 2016).
Extended European Search Report Corresponding to European Application No. 14740799.3 (23 Pages) (dated Aug. 3, 2016).
International Search Report and Written Opinion Corresponding to International Application No. PCT/US2014/012110 (15 pages) (dated May 9, 2014).
International Search Report and Written Opinion Corresponding to International Application No. PCT/US2014/02368 (18 pages) (dated May 20, 2014).
"LG Smart Appliances for 2012 Deliver Connectivity, Efficiency Through Smart Thinq™ Technologies" Press release (8 pages) (Jan. 9, 2012).
Nathan, Mike "Roomba used to map indoor air quality" Retrieved from the internet at URL: http://hackaday.com/2011/07/20/roomba-used-to-map-indoor-air-quality/ (Jul. 20, 2011).
Notification of Transmittal of the International Search Report and the Written Opinion of the International Searching Authority, or the Declaration, in corresponding PCT Application No. PCT/US2013/063598 (14 pages) (dated Jan. 24, 2014).
Notification Concerning Transmittal of International Preliminary Report on Patentability in corresponding PCT Application No. PCT/US2013/063598 (10 pages) (dated Jul. 30, 2015).
Notification Concerning Transmittal of International Preliminary Report on Patentability in corresponding PCT Application No. PCT/US2014/012110 (10 pages) (dated Jul. 30, 2015).
Notification Concerning Transmittal of International Preliminary Report on Patentability in corresponding PCT Application No. PCT/US2014/012368 (14 pages) (dated Jul. 30, 2015).
Pratt, Brian "Roomote iPhone App YouTube video" Retrieved from the internet at URL: https://youtu.be/Jd-yYoZcXJw (1 page) (uploaded Mar. 24, 2010).
St. John, J. "The IPv6-Addressable Light Bulb Goes On Sale" Retrieved from the internet at URL: http://www.greentechmedia.com/articles/read/the-ipv6-addressable-light-bulb-goes-on-sale (Oct. 22, 2012).
Examination Report corresponding to Australian Application No. 2017200992 (3 pages) (dated Feb. 15, 2018).
Japanese Office Action corresponding to Japanese Application No. 2015-553718 (Foreign Text, 4 Pages; English Translation Thereof, 4 Pages) (dated Oct. 27, 2017).
Japanese Office Action corresponding to Japanese Application No. 2015-553900 (3 Pages) (dated Feb. 20, 2018).

(56) References Cited

OTHER PUBLICATIONS

"Canadian Application Serial No. 2,886,451, Response filed Feb. 12, 2020 to Office Action dated Aug. 12, 2019", 16 pgs.
"Japanese Application Serial No. 2017-198403, Preliminary Examination Report dated May 12, 2020", w English Translation, 2 pgs.
"Chinese Application Serial No. 201710707170.7, Response filed May 12, 2020 to Office Action dated Feb. 26, 2020", w English claims, 11 pgs.
"Chinese Application Serial No. 201710707187.2, Office Action dated May 8, 2020", W English Translation, 8 pgs.
"Chinese Application Serial No. 201710707187.2, Response filed Jul. 23, 2020 to Office Action dated May 8, 2020", w English claims, 19 pgs.
"European Application Serial No. 19203324.9, Response filed May 12, 2020 to Communication Pursuant to Article 94(3) EPC dated Jan. 2, 2020", 51 pgs.
"Canadian Application Serial No. 2,886,106, Office Action dated Jan. 7, 2020", 4 pgs.
"U.S. Appl. No. 16/020,313, Reply Brief filed Jan. 22, 2020", 6 pgs.
"U.S. Appl. No. 16/020,313, Examiner's Answer dated Nov. 22, 2019", 9 pgs.
"Australian Application Serial No. 2014207323, Voluntary Amendment filed Mar. 23, 2015", 4 pgs.
"Australian Application Serial No. 2014207323, Voluntary Amendment filed Oct. 21, 2016", 16 pgs.
"Australian Application Serial No. 2014207323, Examination Report dated Oct. 25, 2016", 3 pgs.
"Australian Application Serial No. 2014207323, Response filed Dec. 6, 2016 to Examination Report dated Oct. 25, 2016", 3 pgs.
"Australian Application Serial No. 2017200992, Response filed Jan. 16, 2019 to Examination Report dated Feb. 15, 2018", 16 pgs.
"Australian Application Serial No. 2013374347, Voluntary Amendment filed Mar. 23, 2015", 4 pgs.
"Australian Application Serial No. 2013374347, Voluntary Amendment filed Apr. 22, 2016", 16 pgs.
"European Application Serial No. 13871603.0, Response filed Feb. 10, 2016 to Communication pursuant to Rules 161(1) and 162 EPC dated Aug. 25, 2015", 19 pgs.
"European Application Serial No. 13871603.0, Response filed Sep. 20, 2016 to Extended European Search Report dated Aug. 1, 2016", 16 pgs.
"European Application Serial No. 13871603.0, Response filed May 2, 2019 to Communication Pursuant to Article 94(3) EPC dated Mar. 18, 2019", 12 pgs.
"European Application Serial No. 13871603.0, Office Action dated Sep. 20, 2019", 8 pgs.
"European Application Serial No. 19203324.9, Extended European Search Report dated Dec. 6, 2019", 4 pgs.
"Chinese Application Serial No. 201710707170.7, Response filed Dec. 2, 2019 to Office Action dated Jul. 18, 2019", w English claims, 13 pgs.
"European Application Serial No. 19203324.9, Communication Pursuant to Article 94(3) EPC dated Jan. 2, 2020", 5 pgs.
Leivas, G, "Sensor fusion based on multi-self-organizing maps for SLAM", Multisensor fusion and integration for intelligent systems (MFI), (Sep. 5, 2010), 139-143.
"Canadian Application Serial No. 2,886,451, Office Action dated Aug. 3, 2020", 3 pgs.
"Canadian Application Serial No. 2,886,451, Office Action dated Aug. 12, 2019", 3 pgs.
"Japanese Application Serial No. 2017-198403, Examiners Decision of Final Refusal dated Oct. 24, 2019", w English Translation, 6 pgs.
"Chinese Application Serial No. 201710707187.2, Response filed Oct. 8, 2019 to Office Action dated May 20, 2019", w English claims, 20 pgs.
"Japanese Application Serial No. 2017-198403, Notification of Reasons for Refusal dated Dec. 24, 2020", w English Translation, 13 pgs.
"U.S. Appl. No. 16/020,313 Request to Reopen Prosecution under 37 C.F.R. 41.50 filed Jan. 20, 2021", 9 pgs.
"U.S. Appl. No. 16/020,313, Non Final Office Action dated Mar. 19, 2021", 11 pgs.
"Canadian Application Serial No. 2,886,451, Response filed Dec. 3, 2020 to Office Action dated Aug. 3, 2020", 1 pg.
"Chinese Application Serial No. 201910111197.9, Response field Feb. 25, 2021 to Notification to Make Divisional Application dated Oct. 10, 2020", w/ English Claims, 5 pgs.
"Japanese Application Serial No. 2020-029004, Notification of Reasons for Rejection dated Apr. 9, 2021", w/o English Translation, 4 pgs.
"Chinese Application Serial No. 201910111197.9, Office Action dated Jun. 4, 2021", W English Translation, 19 pgs.
"Japanese Application Serial No. 2021-103251, Notification of Reasons for Refusal dated Aug. 27, 2021", w English translation, 8 pgs.
"Chinese Application Serial No. 201910111141.3, Office Action dated Aug. 13, 2021", w English Translation, 17 pgs.
"Chinese Application Serial No. 202011551850.2, Voluntary Amendment filed Aug. 4, 2021", w English Claims, 12 pgs.
"Japanese Application Serial No. 2017-198403, Response filed Jun. 22, 2021 to Notification of Reasons for Refusal dated Dec. 24, 2020", w English Claims, 124 pgs.
"Canadian Application Serial No. 2,886,451, Office Action dated Oct. 14, 2021", 4 pgs.
"Chinese Application Serial No. 202011551850.2, Notification to Make Divisional Application dated Aug. 30, 2021", w o English Translation, 1 pg.
"Chinese Application Serial No. 201910111141.3, Response filed Oct. 27, 2021 to Office Action dated Aug. 13, 2021", w English Claims, 42 pgs.
"Chinese Application Serial No. 201910111197.9, Response filed Dec. 16, 2021 to Office Action dated Jun. 4, 2021", w English Claims, 6 pgs.
"Chinese Application Serial No. 201910111141.3, Office Action dated Dec. 14, 2021", w English Translation, 18 pgs.
"Canadian Application Serial No. 2,886,451, Response Filed Oct. 17, 2022 to Examiner's Rule 86(2) Requisition dated Jun. 17, 2022", 15 pgs.
"Chinese Application Serial No. 202011551850.2, Office Action dated Jan. 27, 2022", w English Translation, 16 pgs.
"Chinese Application Serial No. 201910111141.3, Response filed Feb. 24, 2022 to Office Action dated Dec. 14, 2021", w English Claims, 42 pgs.
"Chinese Application Serial No. 201910111141.3, Decision of Rejection dated Mar. 16, 2022", w English translation, 13 pgs.
"Japanese Application Serial No. 2021-103251, Response filed Feb. 21, 2022 to Notification of Reasons for Refusal dated Aug. 27, 2021", w English Claims, 17 pgs.
"Canadian Application Serial No. 2,886,451, Response filed Feb. 10, 2022 to Office Action dated Oct. 14, 2021", 11 pgs.
"Chinese Application Serial No. 201910111197.9, Office Action dated Mar. 21, 2022", w English translation, 15 pgs.
"Japanese Application Serial No. 2021-103251, Examiners Decision of Final Refusal dated May 9, 2022", w English translation, 7 pgs.
"Chinese Application Serial No. 201910111197.9, Response Filed Jun. 6, 2022 to Office Action dated Mar. 21, 2022", W English Claims, 8 pgs.
"Chinese Application Serial No. 202011551850.2, Response Filed Jun. 9, 2022 to Office Action dated Jan. 27, 2022", W English Claims, 5 pgs.
"Canadian Application Serial No. 2,886,451, Examiner's Rule 86(2) Requisition dated Jun. 17, 2022", 6 pgs.
"Chinese Application Serial No. 202011551850.2, Office Action dated Jun. 23, 2022", 12 pgs.
"Chinese Application Serial No. 201910111141.3, Response Filed Jun. 30, 2022 to Decision of Rejection dated Mar. 16, 2022", W English Claims, 8 pgs.
"Chinese Application Serial No. 201910111141.3, Response Filed Aug. 4, 2022 to Consultation by Phone mailed Jul. 20, 2022.", W English Claims, 11 pgs.

(56) References Cited

OTHER PUBLICATIONS

"Chinese Application Serial No. 202011551850.2, Response Filed Sep. 8, 2022 to Office Action dated Jun. 23, 2022", W English Claims, 7 pgs.

"Japanese Application Serial No. 2021-103251, Response Filed Sep. 8, 2022 Examiners Decision of Final Refusal dated May 9, 2022", W English Claims, 23 pgs.

"Chinese Application Serial No. 202011551850.2, Office Action dated Sep. 26, 2022", w English translation, 15 pgs.

"Chinese Application Serial No. 202011551850.2, Decision of Rejection dated Jan. 19, 2023", w o English Translation, 6 pgs.

"Canadian Application Serial No. 2,886,451, Examiners Rule 86(2) Report dated Feb. 2, 2023", 4 pgs.

"Japanese Application Serial No. 2021-103251, Response filed Jan. 5, 2023 to Preliminary Examination Report dated Oct. 31, 2022", w English Claims, 10 pgs.

\* cited by examiner

MOBILE ROBOT PROVIDING ENVIRONMENTAL MAPPING FOR HOUSEHOLD ENVIRONMENTAL CONTROL

RELATED APPLICATION(S)

The present application claims the benefit of and priority from U.S. Provisional Patent Application No. 61/754,319, entitled "Environmental Management Systems Including Mobile Robots And Methods Using Same", filed Jan. 18, 2013, U.S. Provisional Patent Application No. 61/772,940, entitled "Environmental Management Systems Including Mobile Robots And Methods Using Same", filed Mar. 5, 2013, U.S. Utility application Ser. No. 14/046,940, now U.S. Pat. No. 9,380,922, entitled "Environmental Management Systems including Mobile Robots And Methods Using Same", filed Oct. 5, 2013, U.S. Utility application Ser. No. 14/160,299, now U.S. Pat. No. 9,233,472, entitled "Mobile Robot Providing Environmental Mapping for Household Environmental Control", filed Jan. 21, 2014, U.S. Utility application Ser. No. 14/956,523, entitled "Mobile Robot Providing Environmental Mapping for Household Environmental Control", filed Dec. 2, 2015, U.S. Utility application Ser. No. 15/709,874, filed Sep. 20, 2017, and U.S. Utility application Ser. No. 16/020,313 filed Jun. 27, 2018, the disclosures of which are incorporated herein by reference in their entireties.

FIELD OF THE INVENTION

The present invention relates to mobile robots and, more particularly, to systems and methods including the same.

BACKGROUND OF THE INVENTION

Connectivity (i.e., wireless connection to the Internet and remote clients) has been contemplated for household appliances for some time.

Recently, the term "Internet of Things" has come to represent the idea that household articles of all kinds can be connected to the public Internet. Once connected, such articles can report various data to server and client devices. For example, one idea is to connect smart light bulbs to household WAN (Wireless Area Network). Each light bulb would have a processor, memory, some means of detecting or interpreting status, power, and a wireless connection. Using these components, the light bulb can report its status, can be polled, etc.

The concept is broad, and generally is only distinct from household connectivity in general (e.g., computers, cable boxes, media devices, and the like) in that the Internet of Things articles are not normally considered to include sufficient computing resources or communications to meaningfully connect to the public Internet. A conventional refrigerator would not connect to the Internet: the same device as an "Internet of Things" article would include computational, sensor, and communications hardware and sufficient software to become an entity addressable remotely and locally; the expectation being that this Internet Fridge could report its various states (power consumption or the like) and respond to remote commands (increase or decrease internal temperature).

Household mobile robots may also become "Internet of Things" articles. In some ways, household mobile robots are a distinct species within this set—generally, speaking, the autonomy of the household mobile robot sets it apart from other appliances. No other appliance performs in an unpredictable and variable environment. No other appliance makes a multiplicity of autonomous decisions based on tens or hundreds of sensor inputs in order to achieve mission completion.

A dishwasher—even an Internet of Things dishwasher—does not know anything about is contents and runs the equivalent of simple scripts controlling motors and pumps, potentially interrupted by simple clog or other sensors. An iRobot® Roomba® vacuuming robot, during the course of its mission, may detect its own state in numerous ways, and may flexibly escape from challenging situations in the household, as well as engage in predictive and planning activities.

There exist many unmet challenges in the integration of the rich and autonomous behavior of a household mobile robot with the core concepts of "Internet of Things" connectivity.

SUMMARY OF EMBODIMENTS OF THE INVENTION

In the following Summary of Embodiments of the Invention, certain paragraphs include mention to an invention and/or embodiments of an invention disclosed herein, using an indefinite article with the discussion of "embodiments" or "invention". This terminology signifies non-necessary, optional features of one or more invention(s) disclosed herein.

According to embodiments of the present invention, or according to an invention disclosed herein, a mobile robot includes a processor connected to a memory and a wireless network circuit, for executing routines stored in the memory and commands generated by the routines and received via the wireless network circuit. The mobile robot includes driven wheels commandable by the processor to reach a multiplicity of accessible two dimensional locations within a household, and an end effector, including at least one motorized actuator, commandable by the processor to perform mechanical work in the household, the processor executing a plurality of routines. The plurality of routines include a first routine which monitors a wireless local network by communicating with the wireless network circuit, and detects a presence state of one or more network entities on the wireless local network, a second routine which receives a signal from a sensor, the sensor detecting an action state of one of the network entities, the action state changeable between waiting and active, and a third routine which commands the end effector to change state of performing mechanical work based on the presence and on the action state detected by the first and second routines.

In some embodiments, or in an invention disclosed herein or preceding, the term "end effector" includes the working payload of a mobile or articulated autonomous or remotely controlled robot, including the customary meaning of manipulators and tools, as well as cleaning head ends. An end effector as recited herein need not be at the end of an arm or mast, but may be directly attached to a mobile robot or via a suspension or other linkage. A working payload performs mechanical work using a powered actuator that moves a tool. One example of a working payload would be a cleaning head (such as a rotating or reciprocating brush or pad and/or a vacuuming tool). A network entity as discussed herein is a machine and/or controller that registers on a network, is assigned a unique address for sending and receiving messages, and is available to other network entity machines and/or controller son the same network or a connected network.

In some embodiments, or in an invention disclosed herein and/or preceding, the "same network" signifies a set of private addresses on a private IP (Internet Protocol) subnet behind a routing or switching network entity that provides NAT hosting (network address translation from the interact at large to the private subnet, usually using one of the RFC 1918 private address spaces), and each network entity on the private subnet can scan the private IP addresses of the other network entities as well as MAC (media access control) addresses associated with each private IP address. In some embodiments, or in an invention disclosed herein, a routine running on the processor of a network entity (e.g., the mobile robot) can monitor the private subnet for the MAC address of another network entity (e.g., a mobile handset) and execute some action, as discussed herein, when the MAC address watched for appears at an IP address on the private subnet. In some embodiments, or in an invention disclosed herein, a "presence state" is the observed state of another network entity (i.e., a scan and detection of another network entity's IP and MAC addresses, signifying potential proximity to the scanning network entity, and/or a change in that detection from a previous scan, signifying possible arrival and departure from a proximity). In general, this relates to the typical wireless range of a typical household wireless AP (access point), which extends for a limited range, with 10-20 meters being an upper limit consumer equipment. In other words, when a mobile handset travels beyond a 10-20 meter limit from the nearest household wireless AP, the person carrying it may have left the household. Depending on correlations with other factors (e.g., two or more of historical work-time hours, historical patterns of mobile handset movement, speed and pattern of signal decrease leading to departure status, and/or length of time missing from the network) reliability of an assessment of arrival or departure by the analyzing routines (being executed by the mobile robot processor, application resident on the mobile handset, or environmental control panel processor) may be increased.

In some embodiments, or in an invention disclosed herein or preceding, the first routine detects the presence state of a mobile device on the wireless local network, and the second routine receives a signal from a call state sensor in the mobile device, the sensor detecting the call state of the mobile device as the action state, the call state changeable between call readiness and call received. In embodiments, or in an invention disclosed herein, the signal received by the second routine is sent from a monitoring application running on the mobile device, in embodiments, or in an invention disclosed herein, the end effector is the cleaning head of the mobile robot. In embodiments, or in an invention disclosed herein, the third routine commands the cleaning head of the robot to change state of cleaning, based on the presence of the mobile device on the wireless local network and on the call state of the mobile device as the action state.

In some embodiments, or in an invention disclosed herein or preceding, the term "action state" includes one or more states reflecting transitions between idle and active for an actuator or control system. The action state is a logic or data state applied to actuated mechanical, electrical, signal, or other actuator, and may be stored in a database and/or directly and reactively monitored by a sensor. In addition, there may be an intermediate state during which a decision to act is made by logic in the system. For example, for a call state or call "action state" (e.g., whether a telephone is active for a call), a telephone may be ready for a call, may be ringing a call yet not yet answered, and a call may be in progress. Further, the action state need not be "on" versus "off", it may be "lower" versus "higher", or expressed with variable ranges. For example, a state of cleaning or cleaning "action state" (e.g., whether a cleaning head powered by an actuator is active for cleaning), a cleaning head may be idle, may be in a low-power or low-speed mode, and may be in a high-power or high-speed mode.

In embodiments, or in an invention disclosed herein or preceding, when the mobile device receives a call, the call state changes from waiting to active. In some embodiments, or in an invention disclosed herein, the state of cleaning is changed from the motorized cleaning or floor movement actuator (either or both) being powered to off, and in other embodiments, or in an invention disclosed herein, the state of cleaning is changed from the motorized actuator operating full power to operating at a low power, low decibel state. In embodiments, a full power state represents the motorized actuator operating a vacuum fan or a roller element of the cleaning head at full speed and a lower power state represents the motorized actuator operating the vacuum fan or roller element of the cleaning head a lower speed.

In other embodiments, or in an invention disclosed herein or preceding, the signal received by the second routine is sent from a sensor on the mobile robot. In some examples, the sensor on the mobile robot is an audio sensor for hearing the call signal, i.e., audible or ultrasonic ring. In other examples, the sensor on the mobile robot is a radio receiver for detecting a radio frequency signal indicative of a phone call, e.g., in the same or similar frequency bands as the cell phone modem of the phone call. In some embodiments, or in an invention disclosed herein, the sensor signaling receipt of a call is a single sensor or a combination of sensors on the mobile device, such as an accelerometer measuring the motion associated with raising a telephonic device to an ear, a proximity sensor for measuring the proximity of the telephonic device to a listener's head, a vibration actuator or sensor for causing or detecting a vibration indicative of a ring, and a microphone on the phone for audibly detecting a ring.

In some embodiments, or in an invention disclosed herein, decisions that are rendered by routines executed by a mobile robot processor are instead or in the alternative executed by routines executed by a compartmentalized or other application hosted by an operating system running via the smart phone processor, so long as the mobile robot processor and the smart phone are network entities that may communicate with one another. The present disclosure contemplates that such routines may be executed by the partner application on a smart phone, and resulting data, commands, or information used by the mobile robot processor to cause the mobile robot to activate actuators may be transported over a shared network.

In some embodiments, or in an invention disclosed herein or preceding, the first routine detects the presence state of a mobile device on the wireless local network, and the second routine receives a signal from a cleaning readiness sensor in the mobile robot, the sensor detecting the cleaning readiness state of the mobile robot as the action state, the cleaning readiness state changeable between cleaning readiness and cleaning active. In embodiments, or in an invention disclosed herein, the mobile robot executes a monitoring routine for monitoring the cleaning readiness. In some embodiments, cleaning readiness is a battery charge of the mobile robot (the corresponding cleaning readiness sensor relying on electronic coulometry and/or other battery charge state sensor, for example), and in other embodiments, the cleaning readiness is a stasis state of the mobile robot (the corresponding cleaning readiness sensor being a "stasis"

sensor relying on one or more odometers, accelerometers, or actuator current measurements to determine whether the robot is able to freely move or is stuck or restricted in movement). In embodiments, or in an invention disclosed herein, the end effector is the cleaning head of the mobile robot, the cleaning readiness is a stasis state, and the motorize actuator is stationary in a stasis state.

In some embodiments, or in an invention disclosed herein or preceding, the third routine commands the cleaning head of the robot to change state of cleaning based on the presence of the mobile device on the wireless local network and on the cleaning readiness state of the mobile robot as the action state.

One advantage of a mobile robot receiving a signal indicative of the presence of an occupant, as determined by their mobile device appearing on the local network, is that the mobile robot executes a monitoring routine, and in response to conditions set in the monitoring routine, reactively responds to presence. In some embodiments or in an invention disclosed herein and preceding, the mobile robot independently monitors the local network for the presence of one or more mobile device, and alternatively or in addition, the mobile device enters the network and notifies the mobile robot of its presence through an application, or set of executable commands running on the mobile device processor for wirelessly communicating instructions to the mobile robot.

In some embodiments or in an invention disclosed herein or preceding, a mobile robot's processor may execute routine(s) that, in response to an initiating signal or measurement being monitored that together signify both that the robot is ready and the household occupant is absent, launch and execute a mission, for example, a cleaning mission, if the mobile device leaves the network and the mobile robot is ready, for example if a mobile robot battery is charged. A "mission" includes a start-to-finish set of mechanical work tasks performed while traveling (where the robot navigates through space) having an initiating criteria (e.g., a user command, a schedule, threshold, or setpoint based command or decision) and a terminating and/or completing criteria. (e.g., a time limit, an area limit, a remaining battery charge limit, a number of times for an area to be covered, and/or a cleanliness score from dirt detection) Missions may be completed in more than one sortie. The mobile robot's processor will execute routine(s) that, in response to a initiating signal or measurement being monitored that together signify both that the robot is operating normally (and possibly loudly) and the household occupant has requested less noise in their proximity or has a sudden need for additional quietness, drive away from an occupant, quiet itself, or turn off its power supply to quiet the robot when an occupant takes a phone call. The mobile robot therefore behaves in a situationally responsive way by interrupting its mission so that the occupant can hear a caller on the mobile device without background noise interference.

In embodiments, or in an invention disclosed herein or preceding, the mobile robot retreats from an occupant holding or carrying a mobile device or the mobile robot quiets its motorized actuators, such as those for actuating the vacuum fan, those for actuating the drive wheels and/or those for actuating one or more cleaning head rollers or brushes. The mobile robot monitors the call state and, in embodiments, monitors for the radio frequency indicative of a call. When the call has ended, the mobile robot autonomously returns to where it discontinued its mission and completes coverage of that room. The mobile robot, therefore, completes its mission throughout the living space while accommodating for the presence of an occupant and for the receipt of a call on a mobile device.

In an embodiment or in an invention herein described or preceding, a change of state of cleaning includes commanding all noise-generating actuators of the mobile robot, including driven wheel actuators, to stop and/or idle pending call completion; or additionally or in the alternative, a change of the state of cleaning includes commanding actuators to restart the cleaning head of the mobile robot following a change in the call state of the mobile device from call-in-progress to call-ended; or additionally or in the alternative, a change of the state of cleaning includes commanding actuators to restart the cleaning head of the mobile robot following a change in the presence of the mobile device on the wireless local network from present to absent.

According to an embodiment, or according to an invention disclosed herein or preceding, the mobile robot processor and wireless network circuit monitor a local wireless network of approximately 5-20 meters maximum range for a change from presence to absence of the mobile device as a departure from the household, and once determining the mobile device has departed, wait for a time period to verify departure of the mobile device from the household before restarting a cleaning mission within the household.

According to an embodiment, or according to an invention disclosed herein or preceding, the mobile robot processor and wireless network circuit monitor a local wireless network of approximately 5-20 meters maximum range for a unique identity of a handheld and portable mobile device to determine that the handheld an portable mobile device is present in the household.

According to an embodiment, or according to an invention disclosed herein or preceding, the mobile robot processor and wireless network circuit monitor a local wireless network of approximately 5-20 meters maximum range for a unique identity of a handheld and portable mobile device to determine that the handheld an portable mobile device is present in the household. In this case, in addition or in an alternative, the mobile robot processor and wireless network adapter scan for a unique media access control address of a handheld and portable mobile device to determine that the handheld and portable mobile device is present in the household. Further alternatively or in addition in this embodiment or invention as preceding, the mobile robot processor and wireless network circuit scan for an internet protocol address on a private internet protocol subnet, and compare medial access control addresses of newly scanned internet protocol addresses to at least one previously stored unique media access control addresses corresponding to known handheld and portable mobile devices to determine that the handheld and portable mobile device has arrived at the household.

According to an embodiment, or according to an invention disclosed herein or preceding, the mobile robot processor and wireless network circuit monitor a local wireless network of approximately 5-20 meters maximum range for a target network entity, and once determining a new target network entity has arrived on a private internet protocol subnet, ping the target network entity at a private subnet address and unique media access control address to verify the target network entity has arrived at the household.

According to an embodiment, or according to an invention disclosed herein or preceding, further comprising a localization circuit including a localization sensor, and once determining a target network entity has arrived on a private Internet protocol subnet, the mobile robot processor records a location where the state of cleaning is changed and a cleaning mission terminated. In this case, in addition or in the alternative, the mobile robot returns to the location where the state of cleaning was changed to resume a cleaning mission following a re-initiation of the cleaning mission.

According to an embodiment, or according to an invention disclosed herein or preceding, wherein the mobile robot processor and wireless network circuit monitor a local wireless network of approximately 5-20 meters maximum range for a change from presence to absence of a known network entity as a departure from the household, and once determining the network entity has departed, waits for a time period to verify departure before initiating a cleaning mission within the household.

In some embodiments of an invention disclosed herein or preceding, a mobile robot includes a processor connected to a memory and a wireless network circuit, for executing routines stored in the memory and commands generated by the routines and received via the wireless network circuit. The mobile robot includes driven wheels (i.e., driven by a motor or actuator) commandable by the processor to reach a multiplicity of accessible two dimensional locations within a household, and a cleaning head, including at least one motorized actuator, commandable by the processor to perform mechanical work in the household, the processor executing a plurality of routines. The plurality of routines include a first routine which monitors a wireless local network by communicating with the wireless network circuit, and detects a presence state of one or more mobile devices on the wireless local network, a second routine which receives a signal from a call state sensor in a mobile device, the sensor detecting a call state of the mobile device, the call state changeable between call readiness and call received, and a third routine which commands the motorized actuator of the cleaning head to change state of performing mechanical work based on the presence of the mobile device on the wireless local network and on the call state of the mobile device detected by the first and second routines.

In some embodiments, or in an invention disclosed herein or preceding, the multiplicity of accessible two dimensional locations is a set of X, Y co-ordinates (a localization or "location") or X, Y, theta co-ordinates (a "pose") reflecting a location on the floor not occupied by some obstacle, and/or a set of the accessible locations or poses or location cells recorded in an occupancy grid. In this case, the occupancy grid or free floor space can optionally be used by the microprocessor to conduct path planning, i.e., sequencing different trajectories to avoid obstacles, and command the driven wheels to move about the free floor space. Path planning may be substantially direct (e.g., the shortest or fastest path, optionally using path planning algorithms such as variants of Dijkstra's A* or D* algorithms); sampling oriented (e.g., taking some number of samples—e.g., 5-20—on a path over a number of minutes, optionally using path planning algorithms where the constraint is a distributed sample set and not the shortest of fastest path, or roaming and/or random): or area coverage oriented (e.g., taking a larger number of samples—e.g. 20-100—in a manner that assigns each sample to a location, optionally topologically or metrically related to one another, or kept as a 3D matrix).

In some embodiments, or in an invention disclosed herein or preceding, the signal received by the second routine is sent from a monitoring application running on the mobile device.

In some embodiments, or according to an invention disclosed herein or preceding, a mobile robot includes a processor connected to a memory and a wireless network circuit, for executing routines stored in the memory and commands generated by the routines and received via the wireless network circuit. The mobile robot includes driven wheels commandable by the processor to reach a multiplicity of accessible two dimensional locations within a household, and a cleaning head, including at least one motorized actuator, commandable by the processor to perform mechanical work in the household, the processor executing a plurality of routines. The plurality of routines include a first routine which monitors a wireless local network by communicating with the wireless network circuit, and detects a presence state of a mobile device on the wireless local network, a second routine which receives a signal from a cleaning readiness sensor in the mobile robot, the sensor detecting the cleaning readiness state of the mobile robot, the cleaning readiness state changeable between cleaning readiness and cleaning active, and a third routine which commands the cleaning head of the robot to change state of cleaning based on the presence of the mobile device on the wireless local network and on the cleaning readiness state of the mobile robot as detected by the first and second routines.

According to some embodiments, or in an invention disclosed herein or preceding, a mobile robot includes a processor connected to a memory and a wireless network circuit, for executing routines stored in the memory and commands generated by the routines and received via the wireless network circuit. The mobile robot further includes driven wheels commandable by the processor to reach a multiplicity of accessible two dimensional locations within a household, and an environmental sensor readable by the processor, the processor executing a plurality of routines. The plurality of routines include a first routine which commands the driven wheels to move the robot about the household, a second routine which takes sensor readings at a plurality of the accessible two dimensional locations within the household, and a third routine which, based on the sensor readings throughout the household, sends data to a network entity having a dedicated environmental sensor resulting in the activation of a motorized actuator on the network entity to perform mechanical work in the household, despite the dedicated environmental sensor's local reading determining otherwise.

In embodiments, or in an invention disclosed herein or preceding, the mobile robot moves about the household on a primary mission and simultaneously collects environmental sensor readings as a secondary mission. In some embodiments the primary mission is a cleaning mission. In embodiments, or in an invention disclosed herein or preceding, the sensor readings taken at the plurality of accessible two dimensional locations within the household are environmental sensor readings.

In some embodiments, or in an invention disclosed herein in preceding and following sections of this Summary, the network entity includes or is included within a humidifier or a humidifier control panel; an air purifier or air purifier control panel; or a thermostat or thermostat control panel connected via power, signal, or network line or other connection to a corresponding plant (i.e., that performs mechanical work to move fluids, including air, throughout the household to effect a change in an environmental condition) in a working location, e.g., in another room, in a basement, or in an attic.

In some embodiments, or in an invention disclosed herein or preceding, the sensor readings taken at the plurality of two dimensional locations within the household populate a two dimensional map of sensor readings within the household, the two dimensional map being stored within a memory accessible to network entities, and in particular displayed on a human machine interface device (e.g., a mobile handset smartphone, personal computer, smartwatch, mobile tablet, having a display and/or touchscreen as well as a wireless network interface, processor, and memory for executing routines) in communication with the mobile robot over the network. In some embodiments, or an invention disclosed herein or preceding, sensor readings taken at the plurality of two dimensional locations within the household populate a three-dimensional map of sensor readings within the household.

Nearly all network entities other than robots and mobile handsets/tablets/smartwatches, such as thermostats, air purifiers and humidifiers, are stationary appliances and typically located at one or more locations throughout a living space and the stationary sensors therein measure relatively localized characteristics (e.g., an environmental characteristic or an a sensed occupant characteristic like identity, occupancy or traffic) at that particular singular, unchanging location. A particular advantage of a mobile robot is accessing locations distant from the environmental sensor within the same room, or in another compartment or room not immediately adjacent such network entities. In some embodiments, or in an invention disclosed herein or preceding (on a spectrum between taking one or a few verification readings, through sampling throughout a living space, to mapping a topography of measurements throughout a living space), the mobile robot can determine whether, based on one or a few reading taken in a location relatively remote from the network entity or based on an aggregate of readings taken randomly or systematically throughout the living space, a stationary network entity should be activated to perform its environmental control function. Additionally or in the alternative, the robot can calculate a highest reading of measurements or aggregate reading of measurements to calculate a score (i.e., a representative or assessment value that can be compared to a threshold or thresholds) for the room. Based on a plurality of measurements taken throughout a living space, the mobile robot activates a network entity even when the environmental sensor reading of the network entity indicates otherwise at its singular, unchanging point of location. Alternatively, the network entity (e.g., environmental control panel) is provided with the samples from the mobile robot. The network entity's dedicated sensor typically measures only the immediate volume adjacent the network entity and fails to account for variations in a volume of air mass spread throughout a living space. Even when additional monitoring is provided, the additional sensors will typically be stationary. By monitoring and measuring temperature, air quality and humidity sampled at remote locations and/or throughout the living space, the mobile robot provides information otherwise inaccessible by the network entity and/or stationary appliance and/or environmental control panel having a local or dedicated environmental sensor. In addition or in the alternative, because the mobile robot may make multiple runs throughout a space and complete a same or similar room coverage mission more than once, covering one or more room or rooms in each run, the mobile robot is able to heuristically compare and aggregate readings over time, correct outlier readings, determine and improve confidence scores, e.g., "learn" how long it takes to clean each room on an individual sortie and how long it takes to clean multiple rooms in the space, including transition times therebetween and battery charging times between multi-sortie missions.

According to embodiments of the invention, or in an invention disclosed herein or preceding, a mobile robot includes a controller in communication with a drive system and a processor, the drive system configured to move the mobile robot about a space comprising a plurality of rooms. The mobile robot further includes a memory accessible by the controller, the memory retaining a unique room identifier associated with a room within the space traversed by the mobile robot and an associated score of at least one measurable characteristic associated with the room, the score being calculated by the processor following at least one traversal of the space, and the processor being capable of modifying the score based on changes to the at least one measurable characteristic between traversals of the space or one or more of the plurality of rooms.

According to embodiments of the invention, or in an invention disclosed herein or preceding, a unique room identifier is one or more data structures stored in the mobile robot's memory enabling the robot's processor, and/or a networked mobile handset or networked environmental control panel in communication with the mobile robot, to recognize a room and/or plan a path from an arbitrary position to a targeted room. If the robot includes a localizing circuit that builds a metric, range-based map of walls and obstacles (using, e.g., a laser range finder, sonar, radar, triangulation, time-of-flight, or phase difference calculatins) and/or an occupancy grid of free space, and can localize the robot on this map using techniques such as scan matching, ICP (iterative closest point), and/or RANSAC (RANdom Sample consensus), then the data structure may be a coordinate or set of coordinates (such as an area or boundary) on the map, in addition or in an alternative, if the robot includes a localizing circuit that builds a fingerprinted, feature-based constellation or topological map of features, landmarks, fiducials and/or beacons (using, e.g., a camera or point cloud generating 3D scanner, together with a feature transform to identif, store, and recognize natural or artificial keypoints, features, and/or landmarks), again with an occupancy grid of free space, and can localize the robot on this map using techniques such as VSLAM (vision based simultaneous localization and mapping), the data structure may be fingerprint or distinctive feature or landmark or feature or landmark cluster, again optionally with an area or boundary, on the map. In either case, a unique identity linked to unique rooms or area (e.g., Zone 1, Zone 2, Zone 3) may be associated by an end user with a household room-type or unique room label (e.g., "Living Room", "Emily's Room) via the user interface of any of the network entities.

In embodiments, or in an invention disclosed herein or preceding, the mobile robot further includes an onboard (i.e., carried by the mobile robot) robot sensor configured to measure the at least one measurable characteristic throughout the room or rooms traversed by the mobile robot. In embodiments, or in an invention disclosed herein, the unique room identifier is a two-dimensional coordinate (e.g., Cartesian or polar) locatable by the robot within the space. In embodiments, or in an invention disclosed herein, the score is stored in the memory of the mobile robot or in a remote memory storage medium accessible by the processor, such as a cloud storage server or a wirelessly accessible mobile device memory.

In embodiments, or in an invention disclosed herein or preceding, a plurality of scores are associated with a unique room identifier and a plurality of onboard robot sensors for measuring the plurality of measurable characteristics, e.g., environmental measurements or mission related measurements (dirt, floor type via optical or sonar measurement, odometry, area, location, boundaries and boundary types such as fabric, wall, stair, artificial barrier or virtual wall). As discussed herein, and in preceding and following paragraphs within the Summary, etc., a "score" may be a number, array, or quantitative tag or label, having the purpose of comparison to a threshold, boundary, range, band, or other similarly expressed score, in which one score may be higher, lower, equal or nearly equal, substantially similar, a peak, a maximum, a minimum, or an average such as a mean, mode, or median. In embodiments, or in an invention disclosed herein and preceding, the mobile robot receives one or more sensor measurements from a stationary sensor node with the space, the mobile robot and the sensor node being in wireless communication. A stationary sensor node may be a fixture in a household (i.e., a living space, including business, storage, facility and recreational spaces), or may be portable (but stationary during measurement and generally left in one place to measure that place), and may be connected as a network entity and/or by other wired or wireless communication with a network entity. In some embodiments, or in an invention disclosed herein and preceding, the mobile robot receives an input parameter related to the measurable characteristic (e.g., using a keyboard or touchscreen, a threshold or target) and determines an order (e.g., a full or partial sequence of rooms, optionally including room-to-room paths or room-to-room gateways, or a priority list in which rooms are addressed by availability—depending on, for example open or closed doors—and suitability—depending on, for example time available in a schedule to clean, or type of floor) of a portion or all of the plurality of rooms to traverse based on the input parameter and a score associated with the measurable characteristic of each room.

In some embodiments, or in an invention disclosed herein or preceding, the mobile robot further includes at least one localizing sensor that observes sensor readings from objects within the space, for determining a current pose (a "pose" includes an absolute or relative location and optionally an absolute or relative orientation) of the mobile robot with reference to the observed objects ("objects" not only including physical objects including observable features, as well as surface "objects" formed of optically or otherwise detectable surface characteristics such as corners, lines, patterns). Objects may themselves have a pose. The mobile robot associates a robot pose (or location) with a room identifier specifically associated with the observed objects or their poses stationed in the room or observable upon the room's components (walls, ceiling, lighting, doorway, furniture).

In some embodiments, or in an invention disclosed herein or preceding, the at least one measurable characteristic is time to complete cleaning of a room and the sensor is a clock or timer together with mission or sortie/excursion beginning and ending criteria. A time to complete" may be measured per sortie/excursion (bounded by starting and finishing one run, e.g., between charging and evacuation) or mission (bounded by starting and finishing a completion criteria, e.g., all targeted area covered once or twice or sufficiently). In some embodiments, or in an invention disclosed herein, the at least one measurable characteristic is mission and/or sortie/excursion completion and the sensor is a dirt detect sensor for determining dirtiness of the room (i.e., momentary rate of dirt sensed by an optical or piezoelectric sensor monitoring a cleaning airflow or collection bin, or integrated or accumulated dirt sensed by the same; or a rate or count of threshold crossings, in each case which may be correlated with a unique room identifier, room area and/or boundaries, room-to-room gateways recorded in memory, in order to define which momentary, peak, integrated, accumulated, or cumulative dirt corresponds to which unique room identifier, area, boundary, or gateways) relative to other rooms having unique room identifiers based on the dirt detection measurement in each room. In some embodiments, or in an invention disclosed herein, the at least one measurable characteristic is occupancy status (i.e., occupied, not occupied, and/or number and/or activity of occupants, together with or modified by indirect indicia of occupancy such as learned or accessed schedules and/or projection and/or stochastic models), and the sensor (carried by the robot, or on a stationary network entity, appliance, environmental control panel) is an occupancy sensor (e.g., in embodiments or in an invention disclosed herein and preceding, a passive or active transmissive or reflective infrared sensor, including an infrared remote control sensor; a time-of-flight or triangulating range sensor using light, sonar, or radio frequency; a microphone together with recognition of sounds or sound pressure typical of occupancy; an airflow sensor; a camera; a radio receiver or transceiver monitoring cell phone frequencies and/or wifi frequencies for sufficiently strong receive signal strength; an ambient light sensor observing ambient light according to natural lighting, artificial lighting, changes actively made by persons to the same, and fluctuations caused by persons in the same) emitted from a mobile device/handset or other RF source carried by a person).

In an embodiment of an invention, or in an invention disclosed herein or preceding, the mobile robot can access the room scores or measured environmental parameters to clean one or more rooms depending on an amount of time available for cleaning within a schedule (including a learned or predicted occupancy schedule or a planned occupancy schedule). The cleaning time can be received in a request to clean, stored in a cleaning schedule or accessed through native calendar integration (e.g., a user's own to-do list and appointment calendar in standard formats) over the network. The mobile robot therefore compares time available in a schedule and based on the available time, selects which room or rooms to clean from a set of those with an expected cleaning duration less than the time available, in some embodiments, or in an invention disclosed herein and preceding, based on a score of which room or rooms dirtier than others, including the dirtiest. In embodiments, or in an invention disclosed herein and preceding, the mobile robot measures a time to clean a room (including on more than one occasion, retaining a record of each sortie/excursion or mission duration and determining a representative maximum, minimum, average and the like per room, sortie/excursion type, or mission), an occupancy frequency and the dirtiness of the room as represented by a relative score among all or a subset of the rooms traversed by the robot. In embodiments, or in an invention disclosed herein and preceding, the mobile robot measures, estimates, and/or stochastically models the time or time(s) to clean a room, as well as the occupancy frequency or the dirtiness of the room as represented by a relative score among all the rooms traversed by the robot. By traversing the living space, the mobile robot leads the behaviors of the occupants and may tailors missions to the behavior, conduct, habits, schedule and patterns of the occupants. According to embodiments of an invention, or in an invention disclosed herein and preceding, the robot access its own occupancy sensor(s) as well as those of one or more network entities within the household to count occupants (i.e., detections near in time at more than one sensor considered representative of multiple occupants) and determines that it should launch a sortie/excursion or mission only when the number of occupants is lower than a threshold (e.g. fewer than two occupants) and/or terminate when the number of occupants exceeds a second threshold (e.g., more than two occupants), which may be a different threshold.

According to embodiments of an invention, or in an invention disclosed herein or preceding, a mobile robot includes a processor connected to a memory and a wireless network circuit, for executing routines stored in the memory and commands generated by the routines and received via the wireless network circuit. The mobile robot includes driven wheels commandable by the processor to reach a multiplicity of accessible two dimensional locations within a household (or array representing a household or rooms within the household). The mobile robot further includes a localizing circuit with at least one localizing sensor that observes sensor readings from objects within the household, for determining a current pose of the mobile robot with reference to the observed objects (e.g., coordinates, features, landmarks, fiducials, and/or beacons), the processor executing a plurality of routines. The plurality of routines include, a navigation routine (e.g., path planning as discussed herein, including one or more of coverage patterns such as boustrophedon rows, perimeter and area discovery patterns such as wall and/or obstacle following or skirting patterns, systematic error safeguards such as random bounce and other randomizations, and point-to-point or zone-to-zone trajectory sequences to travel quickly to/from or among origin/dock/evacuation station/starting position and sortie/excursion or mission destinations) which commands the driven wheels to move the robot about the household, a surface mapping routine that accumulates observations (e.g., range measurements from ranging sensors, occupancy and obstacle determinations from obstacle and proximity sensors, and feature and landmark determinations from cameras and other pattern/image/fiducial observation sensors) from the localizing circuit to record a two dimensional array representing possible locations/poses of the mobile robot, a mission time estimate routine that accumulates timed readings (e.g., timed from start to finish of sortie/excursions and/or missions, and/or collected as a whole-mission time and subsequently divided into time spans or durations according to room boundary or gateway transition or migration) from the localizing circuit and determines at least one estimated completion time span/duration for the mobile robot to substantially cover (i.e., completely pass over with a cleaning head, including but not limited to single-pass or more than one pass, optionally in non-parallel or different directions) a surface area corresponding to a contiguous set of possible locations within the two dimensional array (e.g., a contiguous set may determine a structural or arbitrary "room" determined by walls, doors, and/or arbitrary perimeter segments), and a mission pre-planning routine that compares a target completion time to the at least one estimated completion time span, and commands the driven wheels to begin covering a surface area sufficiently in advance of the target completion time for the at least one estimated completion time to pass, so that the surface area is substantially covered before the target completion time.

In embodiments of an invention, or in an invention disclosed herein or preceding, the mission pre-planning routine further comprising identifying a target completion time and launching the robot according to a launch/returning criteria based on recording and modifying an occupancy schedule of the household and/or individual residents. In some embodiments, or in an invention disclosed herein, the occupancy schedule is wirelessly transmitted to the mobile robot from a remote human machine interface in wireless communication (e.g., an environmental control panel having an occupancy sensor monitoring a zone near the environmental control panel, that is a network entity on the same network or network addressable by the robot) with the robot. In other embodiments, or in an invention disclosed herein, the occupancy schedule is wirelessly transmitted to the mobile robot through native calendar integration. In embodiments, or in an invention disclosed herein, the mobile robot monitors and learns one or more occupancy patterns or schedules over a period or periods of time and sets a target completion time based on a learned occupancy schedule, e.g., as described in U.S. Pat. No. 8,510,255 (incorporated by reference herein in its entirety), augmented by mobile-robot occupancy sensor data and/or other types of occupancy data, analysis, or decisions disclosed herein. In some embodiments, or in an invention disclosed herein or preceding, the mobile robot learns the occupancy schedule over a period of time and identifies one or more occupancy patterns and sets the target completion time based on the one or more learned occupancy patterns.

According to an embodiment, or in an invention disclosed herein or preceding, a mobile robot includes a processor connected to a memory and a wireless network circuit, for executing routines stored in the memory and commands generated by the routines and received via the wireless network circuit. The mobile robot further includes driven wheels commendable by the processor to reach a multiplicity of accessible two dimensional locations within a household, and an environmental sensor readable by the processor to take current readings of an environmental quality. The mobile robot additionally includes a localizing circuit, with at least one localizing sensor that observes sensor readings from objects within the household, for determining a current pose of the mobile robot with reference to the observed objects, the processor executing a plurality of routines. The plurality of routines include a navigation routine which commands the driven wheels to move the robot about the household, a surface mapping routine that accumulates observations from the localizing circuit to record a two dimensional array representing possible locations of the mobile robot, an environmental mapping routine that takes and accumulates readings from the environmental sensor at a plurality of the accessible two dimensional locations within the household and causes the memory to store a three dimensional array based on the readings and on the two dimensional array representing possible locations of the mobile robot; and a location-responsive environmental control routine. The location-responsive environmental control routine correlates the three dimensional array to locations of a plurality of home environmental control nodes, each home environmental control node having a dedicated environmental sensor and a control channel to actuate a motorized actuator to perform mechanical work within the household, and based on a proximity of at least one control node to an environmental mapping location represented in the three dimensional array, sends data to cause the at least one environmental control node to perform mechanical work in the household.

In embodiments of an invention, or in an invention disclosed herein or preceding, a "dedicated environmental sensor" is one that is collocated with the environmental control node, environmental control panel, or environmental control plant. A "control channel" is a wired or wireless connection through which an environmental control panel, a smartphone, tablet, or watch, a personal computer, and/or the mobile robot may send actuation commands. In embodiments of an invention, or in an invention disclosed herein and preceding, a three dimensional array may include two dimensions of location, and one dimension of magnitude, value, or quality corresponding to an environmental quality sensed by an environmental sensor as discussed herein. The "one dimension" of environmental quality may nonetheless store arrays of values, measurements, averages, estimates, taken or recorded over time or cumulatively, or of different kinds. The dimensions of location may correspond to locations within an occupancy grid and/or floor plan maintained on the robot or at a network entity a manner accessible to the robot over local or remote network. The measurements may be directly recorded at a plurality of locations within the dimensions of location, but in an alternative or additional approach, may be interpolated at locations within the occupancy grid and/or floor plan between adjacent or near measurements.

In embodiments of an invention, or in an invention disclosed herein or preceding, an environmental controller or control panel (e.g., a thermostat, humidifier controller with humidity sensing, or air purifier with air quality sensing) includes a housing within which are one or more environmental sensors (e.g., electronic thermometer, barometer, humidity or moisture sensor, gas detector such as VOC, CO or CO2, or airborne particulate counter) to provide environmental sensor measurements (e.g., temperature, air pressure, humidity, air quality), and a processor in operative communication with the sensor(s) to receive the environmental sensor measurements. The environmental controller panel is in operative communication with one or more input devices having a user interface (e.g., a local display and input, or a remote user application on a smartphone) for setting or otherwise determining a setpoint environmental quality (e.g., a setpoint temperature, air pressure, humidity, air quality) and an environmental control actuator that performs work (e.g., HVAC, humidity control, and air purifying systems systems which displace fluids, including air, to effect change in a respective environmental quality toward the setpoint).

In embodiments of an invention, or in an invention disclosed herein or preceding having the environmental control panel as preceding, based on a comparison of a determined ambient environmental measurement taken by the environmental sensor in or on the housing and the setpoint environmental quality, the processor is configured to sample remote environmental sensor measurements from roaming or otherwise traveling mobile robot within the household, also in operative communication with the processor, where the mobile robot bears a similar or same environmental sensor(s) of same or similar capabilities, determine that the measurement(s) from the housing's measurement site are displaced from an plurality of, average, selected, or representative measurement taken from a plurality of sites within the ambient environment by the mobile robot, and compensate for the displacement by commanding a respective environmental control actuator to perform work to effect a change in the respective environmental quality toward the setpoint at least in part in accordance with the measurement(s) by the mobile robot.

In embodiments of an invention, or in an invention disclosed herein or preceding, having the environmental control panel the environmental control panel includes a wireless network interface in operative communication with the processor, and an away-state feature in which the environmental control panel enters into an away-state mode of operation upon a determination by the processor based on remote readings acquired by at least sensor (e.g., active or passive infrared, audible sound and/or ultrasonic sound, camera, RF RSS, capable of sensing a person or a quality indicative of a person, such as clothing colors or local personal handset RF or network presence or traffic, or signals from household devices such as JR remote controls) installed in one or both of (i) a roaming or otherwise traveling mobile robot within the household, or (ii) a mobile handset scanned to be present on a local wireless network by the wireless network interface, that an away-state criterion indicative of a non-occupancy condition for an household in which the environmental control panel has been installed has been satisfied, the away-state mode of operation including an automated setpoint environmental quality setback mode; wherein the processor determines without requiring user input to activate the away-state feature, by receiving the remote readings during atrial period; comparing information derived from the trial period readings to a threshold criterion to establish whether sufficiently true indications of occupancy conditions are satisfied by the remote readings during the trial period; and enabling the away-state feature if it is determined that the sufficiently true indications were sensed during the trial period.

In embodiments of an invention, or in an invention disclosed herein or preceding including the environmental control panel and/or mobile robot with occupancy sensing as preceding, a model of occupancy is based in part on information of the household and/or the expected Occupants of the household derived from the remote readings, and an occupancy predictor predicts future occupancy of the household based at least in part on the model and the remote readings. Based on, in particular, mapped environmental, floor coverage, and area provided by the mobile robot readings, the model is an a priori stochastic model of human occupancy, such as a Bayesian Network or Markov Model variant, including one or more statistical profiles, based at least in part on geometrical and structural data about the household provided at least in part by the mobile robot readings taken in untethered free space within the living area (i.e., not in fixed positions along walls or in other stationary installations).

In embodiments of an invention, or in an invention disclosed herein or preceding, including the environmental control panel, mobile robot, or mobile handset having an environmental quality and/or occupancy sensor, the mobile robot readings and/or mobile handset remote readings are used to verify, validate, or check a decision made by the environmental control panel based on the stationary environmental quality or occupancy sensors attached to one or more environmental control panels.

In embodiments of an invention, or in an invention disclosed herein or preceding, a method of compensating for local errors caused by direct environmental influence on a control panel operating pursuant to feedback based on an attached environmental sensor includes, comparing a determined ambient environmental measurement taken by the environmental sensor in or on the panel and a setpoint environmental quality, sampling a remote environmental sensor measurement from a roaming or otherwise traveling mobile robot within the household, determining that the measurement(s) from the panel's measurement site are displaced from a similarly representative measurement taken from a plurality of sites within the ambient environment by the mobile robot, and compensating for the displacement by commanding a respective environmental control actuator to perform work to effect a change in the respective environmental quality toward the setpoint at least in part in accordance with the measurement(s) by the mobile robot.

In embodiments of an invention, or in an invention disclosed herein or preceding, a mobile robot in communication with a network includes a controller in communication with a drive system, the drive system configured to move the mobile robot about a living space; and a receiver for a receiving a command from mobile device located in the living space in communication with the network, the mobile device including an interactive application for controlling the state of the mobile robot based on the spatial location of the mobile device relative to the mobile robot and/or based on the operating state of the mobile device. The mobile robot controller alters the status of the drive system in response to the received command.

In embodiments of an invention, or in an invention disclosed herein or preceding, a mobile robot is in communication with a network. The mobile robot includes a controller in communication with a drive system, the drive system configured to move the mobile robot about a living space. The mobile robot further includes an onboard robot sensor for monitoring for the presence and/or state of a mobile device in the living space. The mobile robot controller alters the status of the drive system in response to the spatial location of the mobile device relative to the mobile robot and/or based on the operating state of the mobile device.

In embodiments of an invention, or in an invention disclosed herein or preceding, a mobile robot is in communication with a network. The mobile robot includes a drive system configured to move the mobile robot about a living space and an onboard robot sensor for taking sensor readings throughout the living space and monitoring an environmental condition along a plurality of untethered positions traveled through the living space. The condition is related to the selective activation of a node in communication with the network, and the mobile robot alters the activation status of the node when a measured numerical value of the sensed condition in a defined area adjacent the node falls below or above an activation threshold. In embodiments, or in an invention herein disclosed, the activation threshold is represented by range of numerical values bounded by a threshold high value and a threshold low value.

In embodiments of an invention, or in an invention disclosed herein or preceding, a method for automatically altering the activation status of a mobile robot includes receiving at an application operating on a mobile device, input parameters for notifying presence of the mobile device to the mobile robot, the application initiating a plurality of routines calling one or more sets of executable commands stored in the memory of the mobile robot, and executing the set of commands when the mobile device is in the presence of the mobile robot. In embodiments, or in an invention disclosed herein, the mobile device is present when the mobile device is in communication with the mobile robot over a local area network. The set of commands include a plurality of routines including a first routine which monitors a wireless local network by communicating with a wireless network circuit of the mobile robot, and detects a presence state of one or more mobile devices on the wireless local network, a second routine which receives a signal from a sensor, the sensor detecting an action state of one of the mobile device, the action state changeable between waiting and active, and a third routine which commands an end effector of the mobile robot to change state of performing mechanical work based on the presence of the mobile device and on the action state detected by the first and second routines.

In the preceding Summary of Embodiments of the Invention, certain paragraphs include mention to preceding or above embodiments and/or preceding or above inventions disclosed herein. This terminology signifies (non-necessary and optional) multiple dependency on previously discussed invention(s) and embodiments of an invention disclosed herein. The inventors contemplate combining two or more such optional features to achieve the advantages discussed herein, and one of skill in the art will understand how two or more features sequentially or non-sequentially discussed in this section are contemplated and disclosed to be combined to reach one or more advantages discussed herein; and/or any multiply dependent features that are not logically combinable.

DETAILED DESCRIPTION OF EMBODIMENTS OF THE INVENTION

Figure 1:
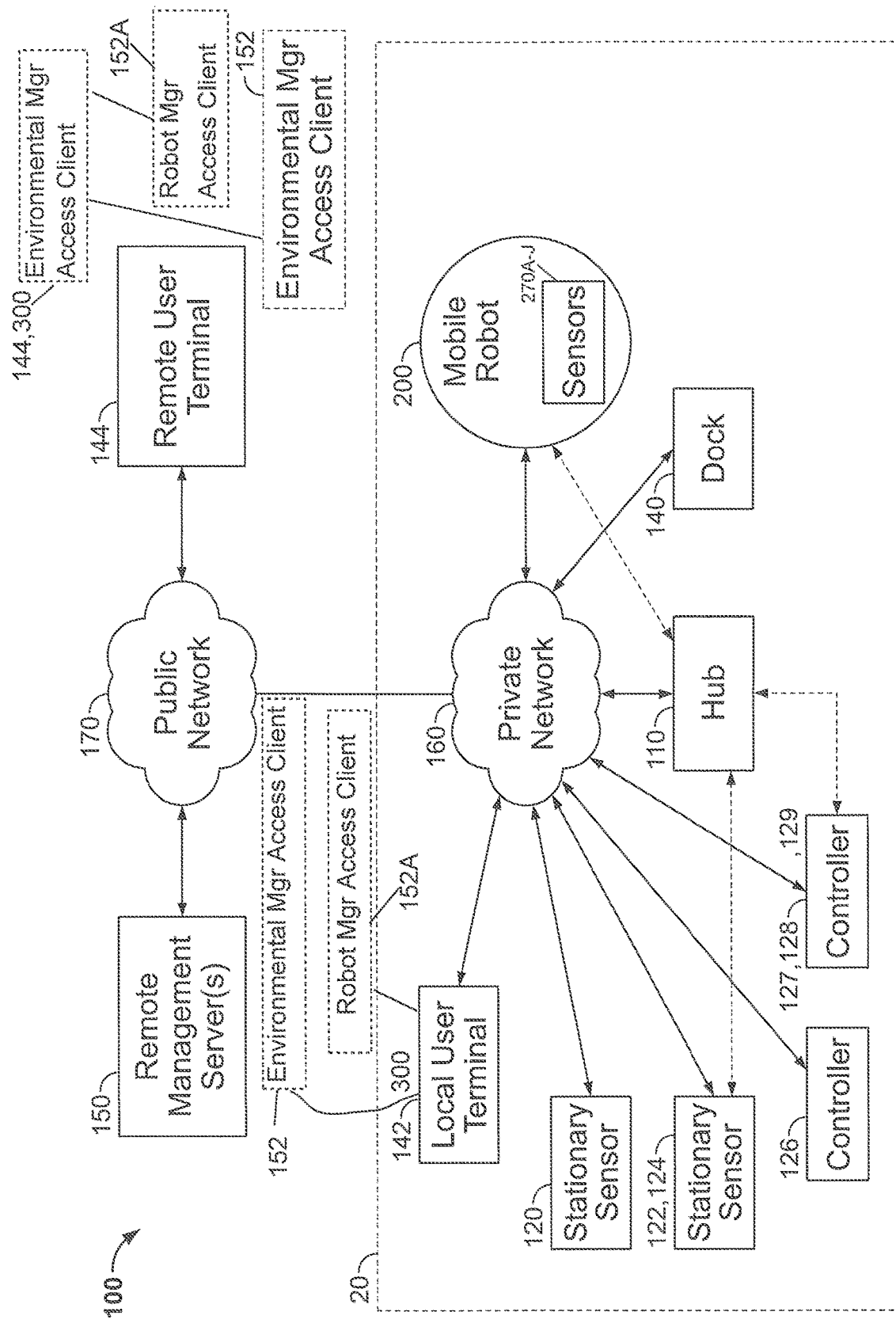
FIG. 1 is a schematic diagram representing an environmental management system according to embodiments of the present invention, or according to an invention disclosed herein.
Figure 2:
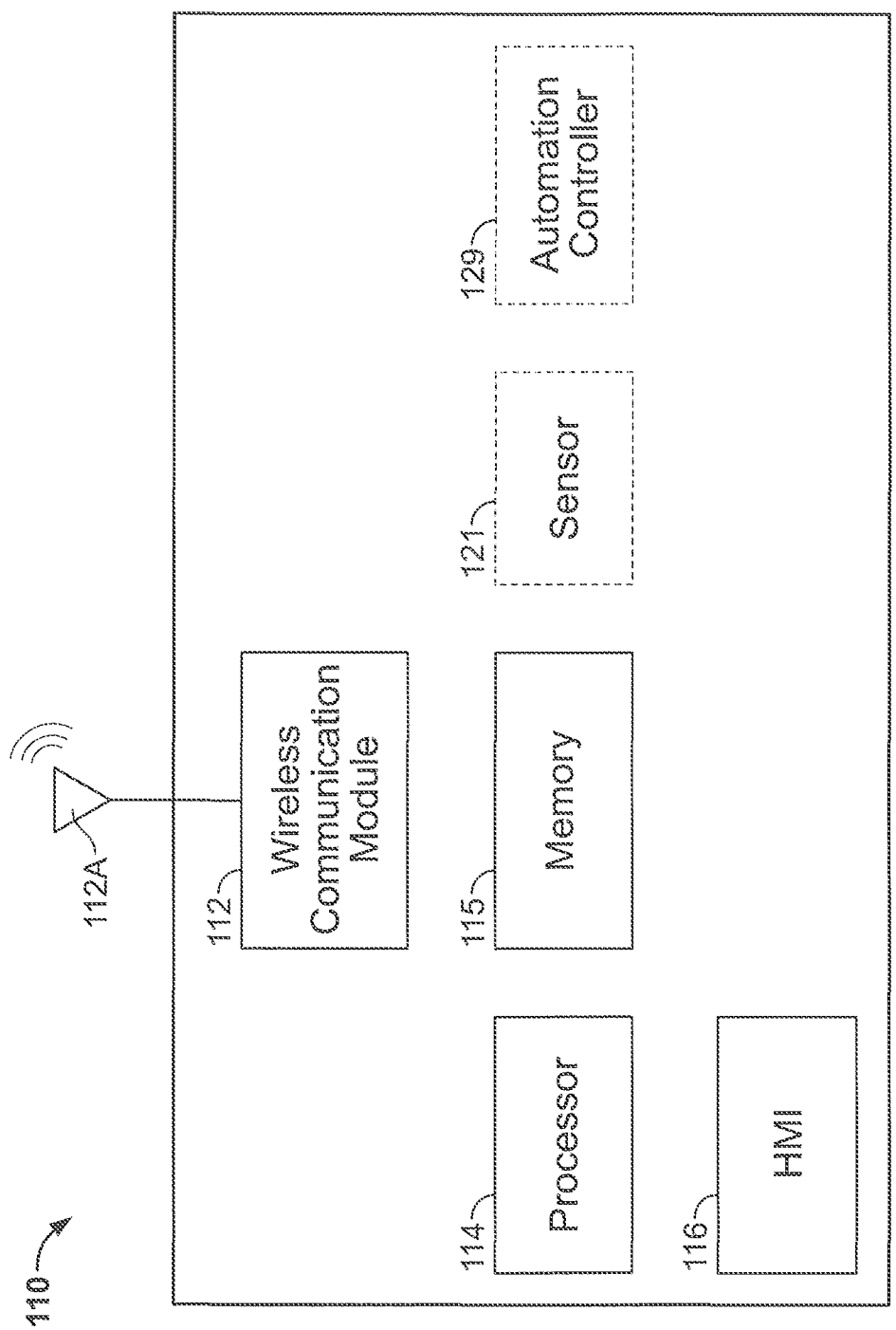
FIG. 2 is a schematic diagram representing a huh forming a part of the environmental management system of FIG. 1.

According to embodiments of the present invention, or according to an invention disclosed herein, an environmental management system including a mobile robot is provided for use in monitoring conditions in a living space. In some embodiments, or in an invention disclosed herein, the environmental management system is used for controlling conditions in the living space and/or evaluating and generating recommendations or plans for addressing conditions in the living space. In some embodiments, or in an invention disclosed herein, the mobile robot has one or more environmental sensors (e.g., electronic thermometer, barometer, humidity or moisture sensor, gas detector such as VOC, CO or CO2, or airborne particulate counter) to provide environmental sensor measurements (e.g., temperature, air pressure, humidity, air quality). In some embodiments, or in an invention disclosed herein, the environmental management system also includes one or more stationary sensors not mounted on the mobile robot and these stationary sensors are used to monitor the living space to collect data that is used in controlling operation of the mobile robot in the living space. In embodiments, or in the invention disclosed herein, the sensors are mounted in actuatable environmental control nodes, or devices, that operate to control environmental conditions. Such environmental control nodes include, for example, devices such as humidifiers, HVAC, thermostats, and air purifiers.

With reference to FIGS. 1-4, 21 and 26-27, an environmental management system 100 according to embodiments of an invention disclosed herein, or according to an invention disclosed herein, is shown therein installed in an associated living structure 10. The structure 10 may be a home or residential dwelling (e.g., a single family home, multi-family dwelling (e.g., a unit of a duplex, apartment, condominium, etc.), or mobile home) or a commercial living space (e.g., an office or studio). The structure 10 defines a living space 20, or interior space, which may be subdivided (physically, spatially and/or functionally) into one or more defined zones (e.g., zones A-C) and, in embodiments, or in an invention disclosed herein, the zones correspond to rooms in the living structure 10, such as Zone A being a kitchen, Zone B being a living room and Zone C being a bedroom. The defined zones A-C may be dived by walls or may be open concept areas that blend together without a wall division. The structure 10 has windows 30, a door 32, light fixtures 34 (having exhaustable lamps 344), a TV 36 (or other electronic equipment), and a heating, ventilation and air conditioning system (HVAC) 40. A person P may occupy the living space 20.

With reference to FIGS. 1-4 and 21, the environmental management system 100 includes nodes including a net-worked-enabled mobile robot 200, a networked-enabled environmental management system hub 110, networked-enabled stationary sensors 120, 122, 124, networked-enabled automation controller devices 126, 127, 128, 129, a robot dock 140 that is also a network-enabled automation controller device, a private network (e.g., a broadband LAN) 160, and a remote management server or servers (e.g., cloud server) 150. The private network 160 is enabled by a router 162 and a broadband wireless access point (WAP) 164 having a wireless local area network (WLAN) range 165 at or around the living space 20 bounded by the living structure 10. The private network 160 is connected to the remote server 150 by a WAN or public network 170 the Internet) through a gateway 1704 (e.g., a broadband modem) and an external connection. 17011 (e.g., an ISP). The router 162, the WAP 164 and/or the modem 1704 may be integrated in a single device. A local user terminal 142, 300 (e.g., a PC, smartphone, or tablet computer) may be connected (wired or wirelessly) to the private network 160. A remote user terminal 144, 300 may be connected to the remote server 150 and/or the private network 160 via the public network 170. The hub 110, the robot 200, the local user terminal 140, 300 and the remote user terminal 144, 300 may each be configured with an environmental manager access client 152 and a robot manager access client 152A, which may be the same as the environmental manager access client (e.g., downloadable or pre-installed application software app) enabling communications and control between the nodes 110, 200, 140, 142, 144, 300 and 150 as described herein. The access client 152, 1524 may provide a convenient interface for a user (also referred to herein as "Person P" or "Occupant P" of the living space 20). A network entity as discussed herein is a machine and/or controller that registers on a network, is assigned a unique address for sending and receiving messages, and is available to other network entity machines and/or controller s on the same network or a connected network.

In some embodiments, or in an invention disclosed herein and/or preceding, the "same network" signifies a set of private addresses on a private IP (Internet Protocol) subnet behind a routing or switching network entity that provides NAT hosting (network address translation from the interact at large to the private subnet, usually using one of the RFC 1918 private address spaces), and each network entity on the private subnet can scan the private IP addresses of the other network entities as well as MAC (media access control) addresses associated with each private IP address. In some embodiments, or in an invention disclosed herein, a routine running on the processor of a network entity (e.g., the mobile robot 200) can monitor the private subnet for the MAC address of another network entity (e.g., a mobile device 300) and execute some action, as discussed herein, when the MAC address watched for appears at an IP address on the private subnet. In some embodiments, or in an invention disclosed herein, a "presence" or "presence state" is the observed state of another network entity (i.e., a scan and detection of another network entity's IP and MAC addresses, signifying potential proximity to the scanning network entity, and/or a change in that detection from a previous scan, sign possible arrival and departure from a proximity). In general, this relates to the typical wireless range of a typical household wireless AP (access point 164), which extends for a limited range, with 10-20 meters being an upper limit consumer equipment. In other words, when a mobile handset 300 travels beyond a 10-20 meter limit from the nearest household wireless AP 164, the person P carrying it may have left the household 20. Depending on correlations with other factors (e.g., two or more of historical work-time hours, historical patterns of mobile handset movement, speed and pattern of signal decrease leading to departure status, and/or length of time missing from the network) reliability of an assessment of arrival or departure by the analyzing routines (being executed by the mobile robot processor, application resident on the mobile handset, or environmental control panel processor) may be increased.

Figure 22:
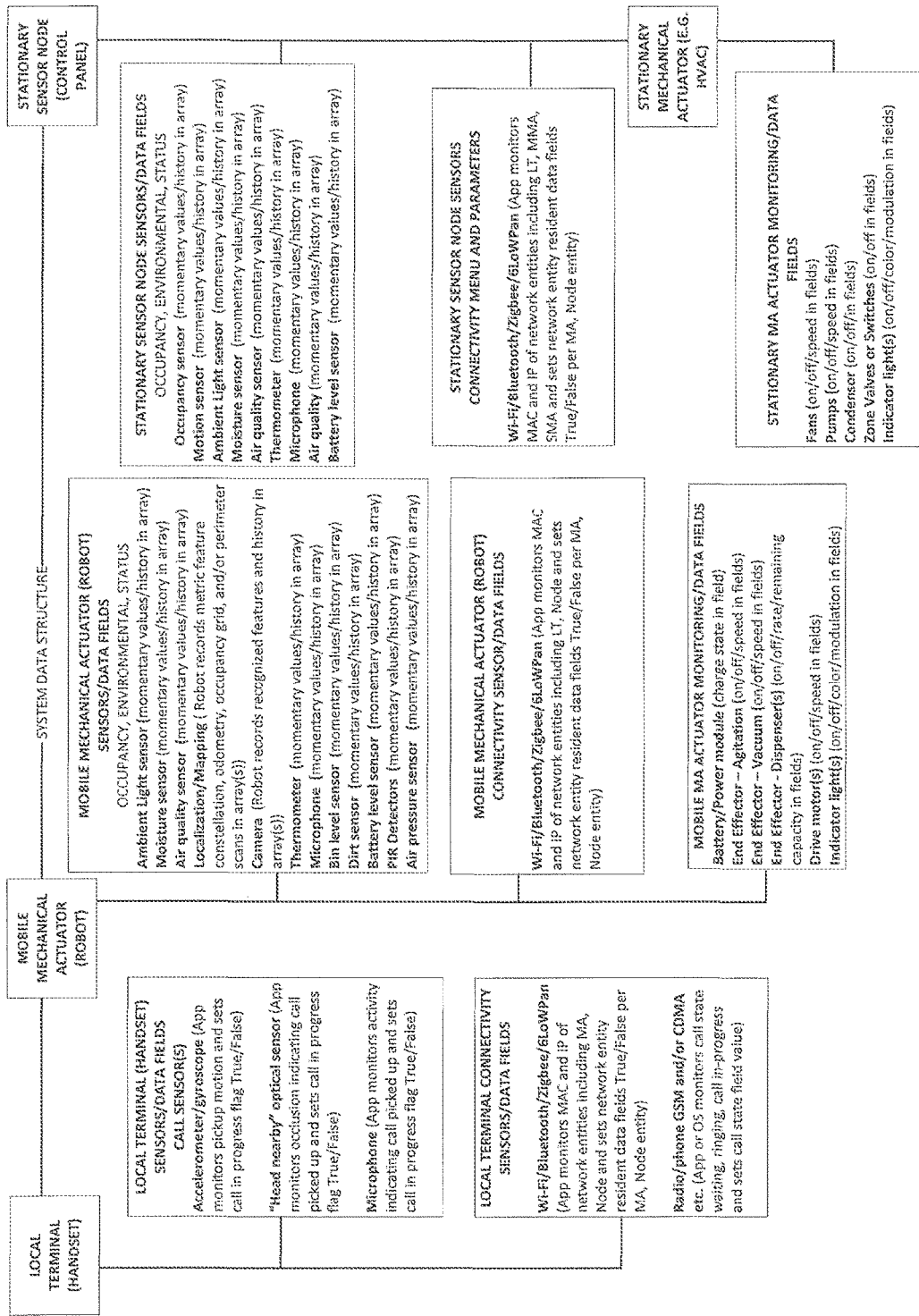
FIG. 22 is a schematic diagram illustrating menu and parameter selections according to some embodiments or according to an invention disclosed herein.
Figure 24:
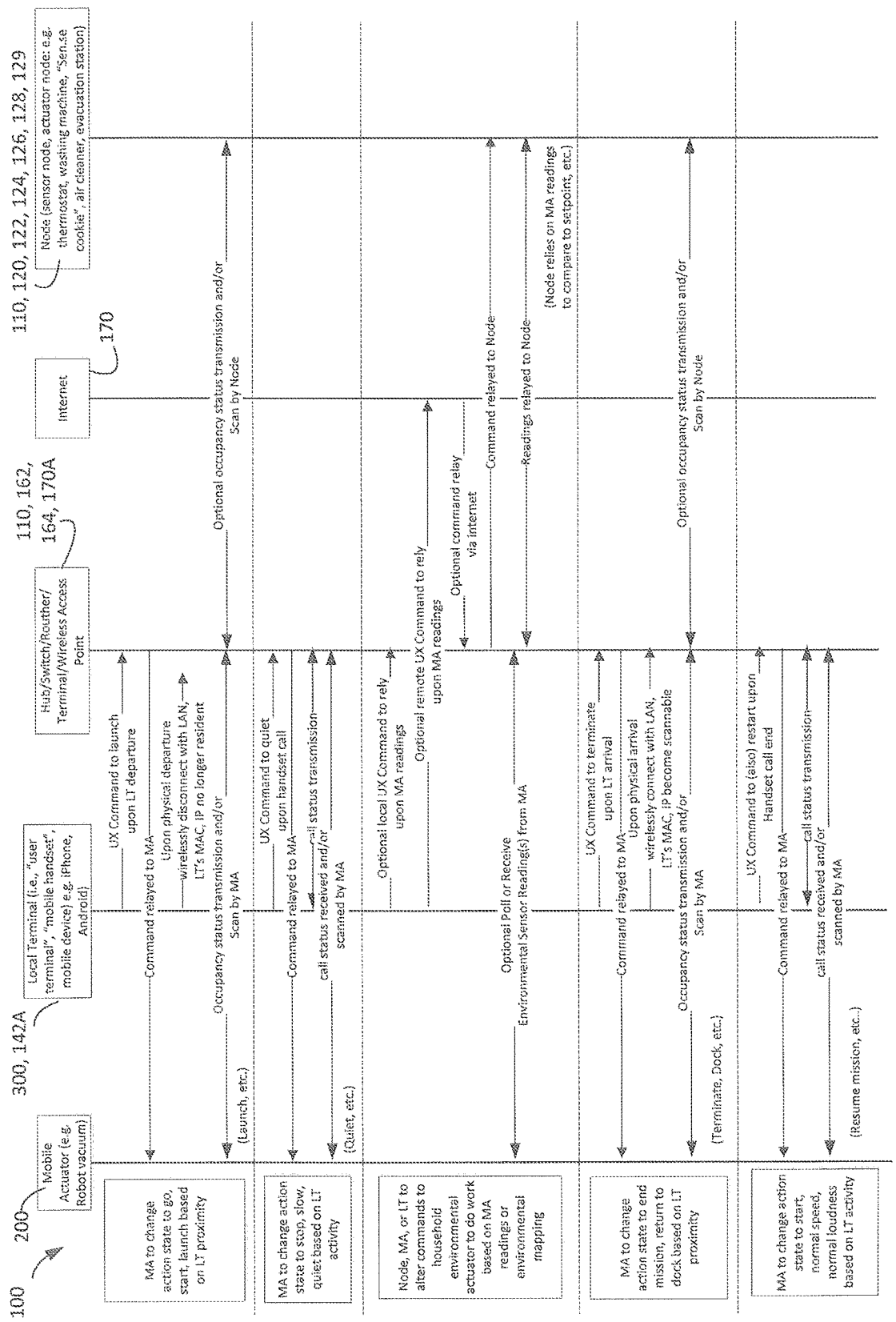
FIG. 24 is a schematic diagram illustrating call diagrams according to some embodiments or according to an invention disclosed herein.

FIGS. 22 and 24 depict the interoperability of nodes of the system 100 such as a mobile robot 200, a networked-enabled environmental management system hub 110, networked-enabled stationary sensors 120, 122, 124, networked-enabled automation controller devices 126, 127, 128, 129, a robot dock 140 that is also a network-enabled automation controller device, a private network (e.g., a broadband LAN) 160, and a remote management server or servers (e.g., cloud server) 150. The private network 160 is enabled by a router 162 and a broadband wireless access point (WAP) 164 having a wireless local area network (WLAN) range 165 at or around the living space 20 bounded by the living structure 10. FIG. 22 depicts an embodiment of the communication components, sensors and applications running on various nodes and exemplary data structures associated with menu items in a menu selection tree. FIG. 24 depicts embodiments of exemplary communications and data exchanges between nodes of the system according to embodiments of the invention or in an invention herein described.

The hub 110 (FIG. 2) be any suitable device configured to provide the functionality described herein. In some embodiments, or in an invention disclosed herein, the hub 110 includes a processor 114, memory 115, a Human Machine Interface (HMI) 116, a wireless communications module (e.g., a Wi-Fi module) 112, and an associated antenna 1124. The hub 110 may include connection hardware (e.g., an ethernet connector) for wired connection to the router 162. In some embodiments, or in an invention disclosed herein, the hub 110 includes an integral environmental sensor 121 and/or an integral automation controller device 129. For example, in some embodiments, or in an invention disclosed herein, the hub 110 is a networked, intelligent, processor controlled thermostat including an ambient temperature sensor and an HVAC controller integrated with a processor and, in some embodiments, a battery. Suitable hubs for the hub 110 may include the Iris Hub™ available from Lowe's Home improvement, NEST™ intelligent thermostats available from NEST Labs of Palo Alto, Calif., and devices as disclosed in U.S. Published Application No. 2012/0256009 and U.S. Published Application No. 2012/0066168, the disclosures of which are incorporated herein by reference.

As illustrated, the hub 110 can be connected to the private network 160 by wiring to the router 162. Alternatively, the hub 110 may be wirelessly connected to the router 162 via the wireless module 112 and the WAP 164.

As indicated in the non-exhaustive, exemplary list of FIG. 22 the stationary sensors 120, 122, 124 can be any suitable sensors operable to detect a physical condition or phenomena and convert the same to a corresponding data signal. For example, each sensor 120, 122, 124 may be a temperature sensor, contact sensor, acoustic sensor (e.g., microphone), motion sensor (e.g., passive IR motion sensor), pressure sensor, visible light sensor, moisture sensor, air quality sensor, ultrasonic sensor, or gas composition sensor. Each sensor 120, 122, 124 may include a wireless transmitter (narrowband or broadband/Wi-Fi) to communicate with the hub 110 and/or the private network 160 via the WAP 164. The sensors 120, 122, 124 are stationary in that they remain in one location (e.g., affixed to a wall of the structure 10) throughout the process of monitoring and controlling the environment of the living space 20. In contrast to the mobile robot 200, the stationary sensors 120, 122, 124 must be picked up and transported to relocate and typically will not be relocated at all (i.e., they will typically be permanently installed in a given coordinate location relative to the full coordinate grid mapped to the space 20). While three stationary sensors 120, 122, 124 are shown, the system 100 may include more or fewer.

As indicated in the non-exhaustive, exemplary list of FIG. 22 the automation controller devices 126, 127, 128, 129, 140 may be any suitable devices operable to control operation of a device or system associated with the structure 10. In embodiments, or in an invention disclosed herein, the stationary automation controller devices 126, 127, 128, 129, 140 stationary sensors 120, 122, 124 that can be any suitable sensors operable to detect a environmental condition, physical condition or phenomena and convert the same to a corresponding data signal. For example, each sensor 120, 122, 124 may be a temperature sensor, contact sensor, acoustic sensor (e.g., microphone), motion sensor (e.g., passive IR motion sensor), pressure sensor, visible light sensor, moisture sensor, air quality sensor, ultrasonic sensor, or gas composition sensor. Each sensor 120, 122, 124 may include a wireless transmitter (narrowband or broadband/Wi-Fi) to communicate with the hub 110 and/or the private network 160 via the WAP 164. Examples of automation controller devices include a thermostat to actuate/deactuate/adjust the HVAC system 40 (as illustrated, controller 127), a switch device to actuate/deactuate a light (as illustrated, controller 128), an audible alarm, a device operative to open and close a window covering (e.g., automatic shades) (as illustrated, controller 126), an air quality control device 129, such as an air purifier, humidifier, or de-humidifier, a network enabled mobile robot evacuation station dock 140, and an automatic latch or lock device. Each automation controller device 126, 127, 128, 129, 140 may include a wireless transmitter (narrowband or broadband Wi-Fi) to communicate with the hub 110 and/or private network 160 via the WAP 164. While five automation controller devices 126, 127, 128, 129 140 are shown, more or fewer may be provided through out one or more Zones (A-C) in the living structure.

The robot dock 140 may include or be connected to a power supply and include a charger operative to charge a battery of the mobile robot 200 when the robot 200 is effectively docked at the robot dock 140. The dock 140 may be an evacuation station including a motorized receptacle actuatable to empty debris from the robot 200. In some embodiments, or in an invention disclosed herein, the dock 140 is connected (wired or wirelessly) to the private network 160 to enable or facilitate transmission of data from the robot 200 to the private network 160 and/or from the private network 160 to the robot 200. The robot dock 140, therefore, is an example another automation controller device. In embodiments, the robot dock 140 communicates wirelessly directly with the mobile robot 200 through blue tooth, nearfield induction, IR signals or radio.

Figure 3:
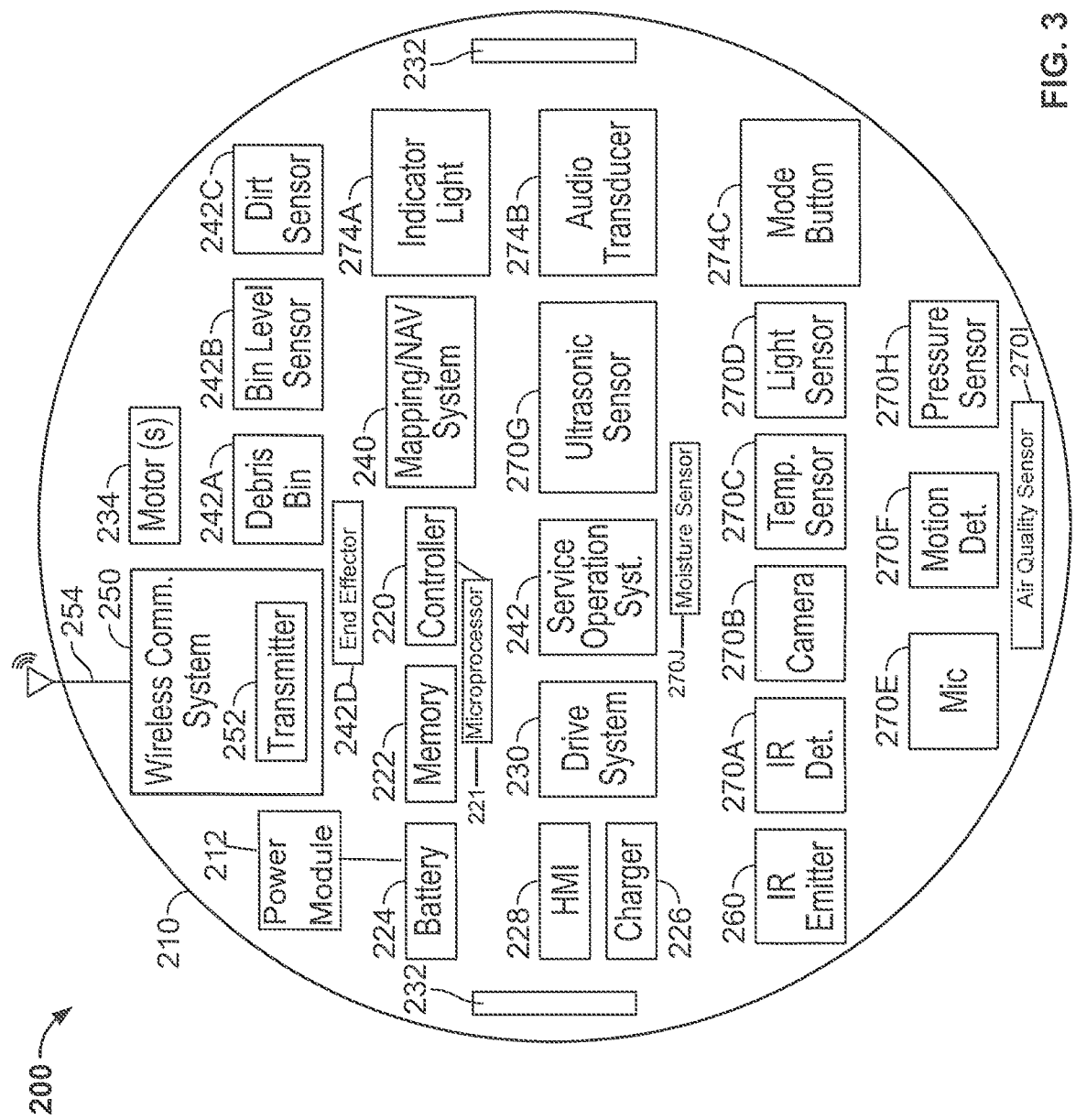
FIG. 3 is a schematic diagram representing a network-enabled mobile robot forming a part of the environmental management system of FIG. 1.

The mobile robot 200 may be any suitable robot and it will be appreciated that not all of the components, features and functionality described herein are required in all embodiments of an invention disclosed herein, or in an invention disclosed herein. With reference to FIG. 3 and the non-exhaustive list of FIG. 22, the exemplary mobile robot 200 includes a chassis 210, a controller 220, memory 222, a battery 224, a battery charger 226, a human-machine interface (HMI) 228, a drive system 230, a mapping/navigation system 240, a service operation system 242 (also referred to herein as "the cleaning system" and the "cleaning head"), a wireless communication system 250, an IR emitter 260, and environmental sensors 270A-J, a debris bin 242A (to store debris collected by a cleaning operation), a bin level sensor 242B, a dirt extraction sensor 242C (to detect the density of characteristics of the debris collected by the cleaning operation), an end effector, 242D an indicator light 274A, an audio transducer 274B, and a cleaning mode selection switch (e.g., button) 274C. The mobile robot 200 may be generally configured in the manner of or include features from the Roomba™ floor cleaning robot and/or robots as described in U.S. Pat. No. 7,024,278 and U.S. Published Application No. 2007/0250212, the disclosures of which are incorporated herein by reference, with suitable modifications.

The controller no may include any suitably configured processor 211 (e.g., microprocessor) or processors. The processor 221 is in communication with the controller 200, memory 22, the cleaning system 242 and drive system 230

The drive system 230 may include any suitable mechanism or system for actively and controllably transiting the robot 200 through the living space 20. According to some embodiments, or according to an invention disclosed herein, the drive system 230 includes a roller, rollers, track or tracks 232 and one or more onboard (i.e., carried by the mobile robot 200) electric motors 234 (also referred to herein as "motorized actuator") operable by the controller 220 to convey the robot 200 across the floor of the living space 20.

The service operation system 242 may be optional in some embodiments, or in an invention disclosed herein, and is operable to execute a service operation in the living space 20. According to some embodiments, or according to an invention disclosed herein, the service operation system 242 includes a floor cleaning system that cleans a floor surface of the living space 20 as the robot 200 transits through the space 20. In some embodiments, or in an invention disclosed herein, the service operation system 242 includes a suction head and an onboard (i.e., carried by the mobile robot 200) vacuum generator to vacuum clean the floor. In some embodiments, of in an invention disclosed herein, the service operation system 242 includes an end effector 242D such as a sweeping or mopping mechanism, such as one or more rotating brushes, rollers, wet or dry stationary or oscillating and/or vibrating cloths or multilayer pad assemblies.

In some embodiments, or in an invention disclosed herein or preceding, the term "end effector 242D" includes the working payload of a mobile or articulated autonomous or remotely controlled robot, including the customary meaning of manipulators and tools, as well as cleaning head ends. An end effector as recited herein need not be at the end of an arm or mast, but may be directly attached to a mobile robot 200 or via a suspension or other linkage. A working payload performs mechanical work using a powered actuator that moves a tool. One example of a working payload would be a cleaning head (such as a rotating or reciprocating brush or pad and/or a vacuuming tool).

The wireless communication system 250 includes a wireless communication transmitter or module 252 (e.g., a Wi-Fi module) and an associated antenna 254 to enable wireless communication between the robot 200 and the hub 110 and/or the private network 160 (i.e., via the WAP 164). Various different network configurations may be employed for the private network 160, of which the mobile robot 200 constitutes a node. In some embodiments, or in an invention disclosed herein, the robot 200 communicates wirelessly with the hub 110 through the router 162 via the WAP 164. In some embodiments, or in an invention disclosed herein, the mobile robot 200 communicates with the remote management server 150 via the router 162 and the WAP 164, bypassing the hub 110.

In some embodiments, or in an invention disclosed herein, the robot 200 may communicate wirelessly directly with the hub 110 using narrowband or broadband (e.g., Wi-Fi) RF communication. For example, if the robot 200 is not equipped with a transmitter compatible with the WAP 164, the robot 200 may communicate with the hub 110, which may in turn relay data from the robot 200 to the private network 160 or the remote management server 150. In some embodiments, or in an invention disclosed herein, the system 100 includes a network bridge device that receives and converts RF signals from the robot 200 and relays them to the router 162 in a format supported by the router for delivery to the remote management server 150 or another device in the private network 160. In some embodiments, or in an invention disclosed herein, the system 100 includes a low power mesh data network employing a mesh topology wherein RF communications signals are relayed from node to node between the mobile robot 200 and the hub 110. In this case, the stationary sensors 120, 122, 124, the controllers 124, 126, 127, 128, 129, 140 and range extender modules (if any; not shown) may serve as mesh nodes. Likewise, the mobile robot 200 may serve as a node to relay signals between the huh 110 and the other nodes (e.g., network enabled sensor devices 120, 122, 124, 126, 127, 128, 129, 140 and range extenders).

As indicated above, FIG. 22 depicts an embodiment of the communication components, sensors and applications running on various nodes and exemplary data structures associated with menu items in a menu selection tree. For example, the mobile mechanical actuator (MA), which is a mobile robot 200 in embodiments or in an invention disclosed herein, includes sensors and data fields such as: Ambient Light sensor (momentary values/history in array). Moisture sensor (momentary values history in array), Air quality sensor (momentary values/history in array), Localization/Mapping (Robot records metric feature constellation, odometry, occupancy grid, and/or perimeter scans in array(s)), Camera (Robot records recognized features and history in array(s), Thermometer (momentary values/history in array), Microphone (momentary values/history in array), Bin level sensor (momentary values/history in array), Dirt sensor (momentary values/history in array), Battery level sensor (momentary values/history in array), PIR Detectors (momentary values/history in array), Air pressure sensor (momentary values/history in array). The mobile mechanical actuator (MA), which is a mobile robot 200 in embodiments or in an invention disclosed herein, includes connectivity sensors and data fields such as Wi-Fi, Bluetooth, Zigbee, and 6LoWPan (application running on the local terminal monitors MAC and IP of network entities including local terminal, Node and sets network entity resident data fields True/False per MA, Node entity). The mobile mechanical actuator (MA), which is a mobile robot 200 in embodiments or in an invention disclosed herein, includes monitoring elements of the MA and associated data fields such as, for example: Battery 224/Power module 212 (charge state in field), End Effector 242D—Agitation (on/off/speed in fields), End Effector 242D—Vacuum (on/off/speed in fields), End Effector 242D—Dispenser(s) (on/off/rate/remaining capacity in fields), Drive motor(s) 230 (on/off/speed in fields), and Indicator light(s) 274A (on/off/color/modulation in fields).

Similarly, a stationary sensor node 110, 120, 122, 124 (also referred to herein as "stationary sensors" and "networked-enabled stationary sensors"), or stationary mechanical actuator 126, 127, 128, 129, 140 (e.g. HVAC, humidifier, air purifier, and also referred to herein as "automation controller device" and "networked-enabled automation controller devices") sensors monitor conditions with its sensors and stores associated data such as, for example: Occupancy sensor (momentary values/history in array), Motion sensor (momentary values/history in array), Ambient Light sensor (momentary values/history in array), Moisture sensor (momentary values/history in array), Air quality sensor (momentary values/history in array), Thermometer (momentary values/history in array), Microphone (momentary values/history in array), Air quality (momentary values/history in array), and Battery level sensor (momentary values/history in array). A stationary sensor node 110, 120, 122, 124 or stationary mechanical actuator 126, 127, 128, 129, 140 (e.g. HVAC, humidifier, air purifier) include connectivity sensors and data fields such as Wi-Fi, Bluetooth, Zigbee, and 6LoW-Pan (hosted application monitors MAC and IP of network entities including local terminal (LT) hosting the application, mobile mechanical actuator (e.g. mobile robot 200), stationary sensor node 110, 120, 122, 124, stationary mechanical actuator 126, 127, 128, 129, 140 and sets network entity resident data fields True/False per MA, Node entity). In embodiments, or in an invention disclosed herein, the stationary mechanical actuator 126, 127, 128, 129, 140 monitors the states of its actuators and stores data associated with the monitored actuators in fields such as, for example: Fans (on/off/speed in fields), Pumps (on/off/speed in fields), Condensor (on/off/in fields), Zone Valves or Switches (on/off in fields), and indicator light(s) (on/off/color/modulation in fields).

Similarly, a local terminal 142, 300 (also referred to herein as "mobile device" and "smartphone" and "LT") monitors conditions with its sensors and stores associated data such as, for example: Accelerometer/gyroscope (an application running on the LT monitors pickup motion and sets call in progress flag True/False), "Head nearby" optical sensor (application monitors occlusion indicating call picked up and sets call in progress flag True/False), Microphone (application monitors activity indicating call picked up and sets call in progress flag True/False). In embodiments, or in an invention herein disclosed, the local terminal includes connectivity sensors and data fields such as Wi-Fi, Bluetooth, Zigbee, and 6LoWPan (application monitors MAC and IP of network entities including a local terminal (LT) running the application, mobile mechanical actuator (e.g. mobile robot 200), stationary sensor node 110, 120, 122, 124, stationary mechanical actuator 126, 127, 128, 129, 140 and sets network entity resident data fields True/False per MA, Node entity). In embodiments, or in an invention herein disclosed, the local terminal includes connectivity sensors and data fields such as: Radio/phone GSM and/or CDMA etc. (application or operating system monitors call state waiting, ringing, call in-progress and sets call state field value).

As indicated in FIGS. 3 and 22, the exemplary robot 200 includes the following environmental sensors: an IR radiation detector 270A, a camera 270B, an ambient temperature sensor 270C, an ambient light sensor 270D, an acoustic sensor 270E (e.g., microphone), a motion detector 270F (e.g., a passive IR photodiode), an ultrasonic sensor 270G, a pressure sensor 270H, an air quality sensor 270I, and a moisture sensor 270J. These sensors are not exhaustive of the types of sensors that may be provided on the robot 200 and certain of the sensors may be omitted depending on the environmental parameters to be detected by the robot 200.

The mapping/navigation system 240 can be used by the mobile robot 200 to map the living space 20 and to determine or register the position of the robot 200 relative to the space 20 (i.e., to localize the robot 200 in the space 20). The robot 200 can thus also localize the locations of its onboard (i.e., carried by the mobile robot 200) sensors 270A-J. Any suitable technique and components may be used to localize and register the robot 200, such as machine vision (e.g., using the camera 270B and Feature Recognition or Class Recognition software), light beacons, or radiofrequency received signal strength indicator (RSSI) technology.

According to some embodiments, or in according to an invention disclosed herein, the mobile robot 200 or system 100 can uniquely identify rooms (e.g., Zone A, Zone B, Zone C) by combining (1) identity information (e.g., the IPv6 identity of an "Internet of Things" 6LowPan light bulb or socket transceiver, plug unit, or the like), (2) RSSI (e.g., the signal strength/amplitude of the same nearby IPv6 RF transceiver) and (3) remote control (e.g., the ability to modulate that RF transceiver via the local network or Internet). For example, the autonomous robot 200 (e.g., a Roornha® robot) can navigate a room (e.g., Zone A, Zone B, or Zone C) until it finds a peak signal strength of an IPv6 transceiver, in which case it can be expected to be nearest this transceiver. It can then tag this transceiver with a topological or Cartesian location. Should the transceiver be associated with a room identity by an end user or automatically via any means (e.g., "living room light bulb No. 3"), the robot 200 can use this information in various ways. For example, the robot 200 may be commanded to clean the living room, in which case it can use its mobility and distance-dependent variation in signal strength to home on this room (even without a map). As another example, a robot 200 can be commanded to clean only the living room, in which case one or more transceivers known to be in the living room "anchor" the robot 200 to that room. The robot 200 sets a threshold for signal strength and/or rough localization using multiple signal sources and/or identifiable walls and doorways, and covers the room such that the signal strength of the living room IPv6 6LowPAN light bulb is high.

The mobile robot 200 can identify a room or Zone (A-C) in a number of different ways, independent of output from other sensor nodes 110, 120, 122, 124, 126, 127, 128, 129 140 of the system 100. In an embodiment, or in an invention disclosed herein, the mobile robot 200 may visually recognize one or more features located in one room using its camera 270B mounted to the body 210 of the mobile robot 200. In an embodiment, or in an invention disclosed herein, the mobile robot 200 can identify a room or Zone (A-C) using its mapping and navigation system 240 to identify coordinates within a defined room as defined on a stored map of the living structure 20.

Further methods and operations in accordance with embodiments of an invention disclosed herein, or in accordance with an invention disclosed herein, and utilizing the environmental management system 100 will now be described.

According to some methods, the system 100 uses data from one or more of the networked stationary sensors 120, 122, 124 to control or enhance operation of the mobile robot 200. In some embodiments, or in an invention disclosed herein, the sensors 120, 122, 124, are occupancy sensors (e.g., passive IR motion detectors). When the sensors 122 detect a person P in a given zone A-C, the system 100 will cause the robot 200 to alter its operation to adapt to the occupancy. In embodiments, or in an invention disclosed herein, the mobile robot 200 detects a person P based on a signal from an occupancy sensor, heat sensor, RSSI sensor, or a signal indicating the presence of the person's local user terminal 142 (also herein referred to as "mobile device 300"). For example, the robot 200 may be executing a floor cleaning operation and the system 100 (e.g., via instructions from the hub 110 to the robot 200) may instruct the robot 200 to return to the dock 140, move to a different, unoccupied zone, avoid the occupied zone, or assume a quieter mode of operation. Similarly, before deploying the robot 200, the system 100 can use the stationary sensors 122 to determine whether an occupant is detectable and, if not, clear the robot 200 to proceed with a mission (e.g., a floor cleaning excursion).

Figure 21:
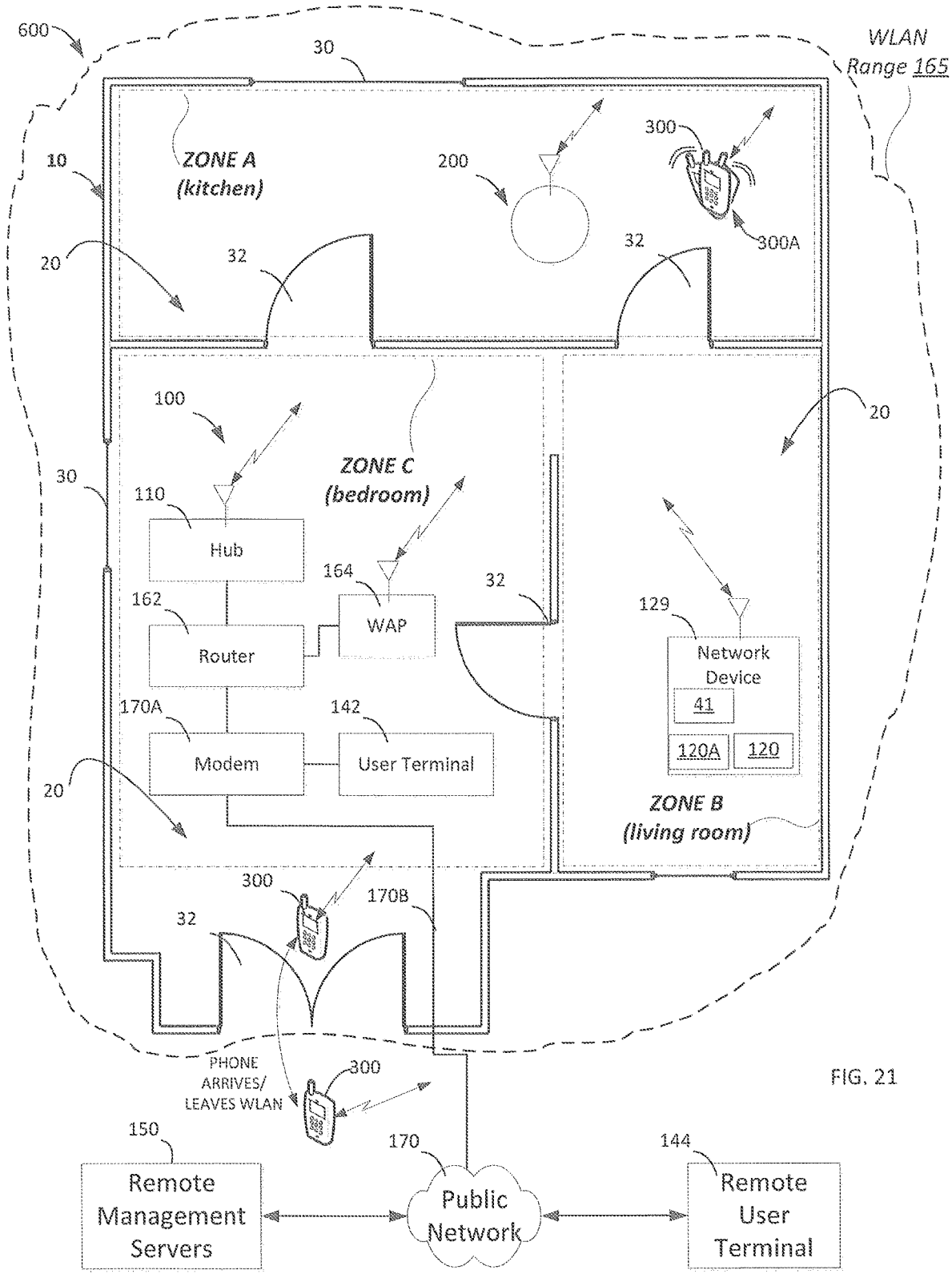
FIG. 21 is a schematic diagram illustrating a living structure with the environmental management system and automation controller system installed therein.

Alternatively, one or more of the onboard sensors 270A-J may detect occupancy and the robot 200 may communicate this information to the hub 110 for further instruction regarding mission completion or truncation. As depicted in FIG. 21 and the finite state machine of FIG. 22, in embodiments, or in the invention, when an away mode is on and the occupancy count is less than a threshold amount, the mobile robot 200 moves from a docked or idle state S10 to a launch state S14. The robot 200 enters a state of designating the next room to cover in the mission with a stored location S18, and enters a state of cleaning the current room S22. When the current room is completed (e.g. completely traversed and cleaned as determined by routines running on the robot processor and controller), the robot enters the designate next room state S18 until the emission is completed or until a mobile device 300 identity is detected on the wireless network or occupancy of a person P is detected.

When a mobile device 300 enters the network, the mobile robot 200 receives a signal indicating the presence of the person's mobile device on the WAP 164. The may be detected by the mobile robot 200 monitoring the wireless local network 160 or a robot manager access client 152A operating on the mobile device 300 may execute a routine that sends a signal to the mobile robot 200 indicating that the mobile device 300 is on the WLAN 160 and accessing the WAP 164. In embodiments, or an invention disclosed herein, the mobile robot 200 may include a radio receiver capable of detecting a call state of the mobile device 300, the active call putting the mobile device 300 in an active call state 300A. In embodiments, or in an invention disclosed herein, the mobile robot 200 may detect the strength of the call signal with an RSSI sensor, thereby determining proximity to the mobile device 300. In embodiments, or in the invention, in response to a mobile device call state changing to an active call state, the mobile robot controller 120 alters the mobile robot cleaning state by returning the mobile robot 200 to the dock 140, moving the mobile robot 200 to a different, unoccupied zone (A-C), by having the mobile robot 200 avoid the occupied zone (A-C) or assume a quieter mode of operation, which includes turning off all motorized actuators on the mobile robot 200 so that the mobile robot 200 stops in place and goes silent. In embodiments, or an invention disclosed herein, an occupied zone (A-C) is a zone in which a person P or mobile device 300 is present. In embodiments, or an invention disclosed herein, an occupied zone is a zone in which a mobile device 300 is in an active call state 300A. In one embodiment, or in the invention herein disclosed, when the mobile device 300 is in an active call state 300A, the action state goes from waiting to active, and the mobile robot controller 120 will alters a cleaning state of the mobile robot 200 to respond to the call signal by entering a state of storing the robot location S36 (i.e. coordinates) in the household 20 and then changing state to a return to dock or evacuate state S20 that precedes arriving at the dock and entering a docked or idle state S10.

Figure 23:
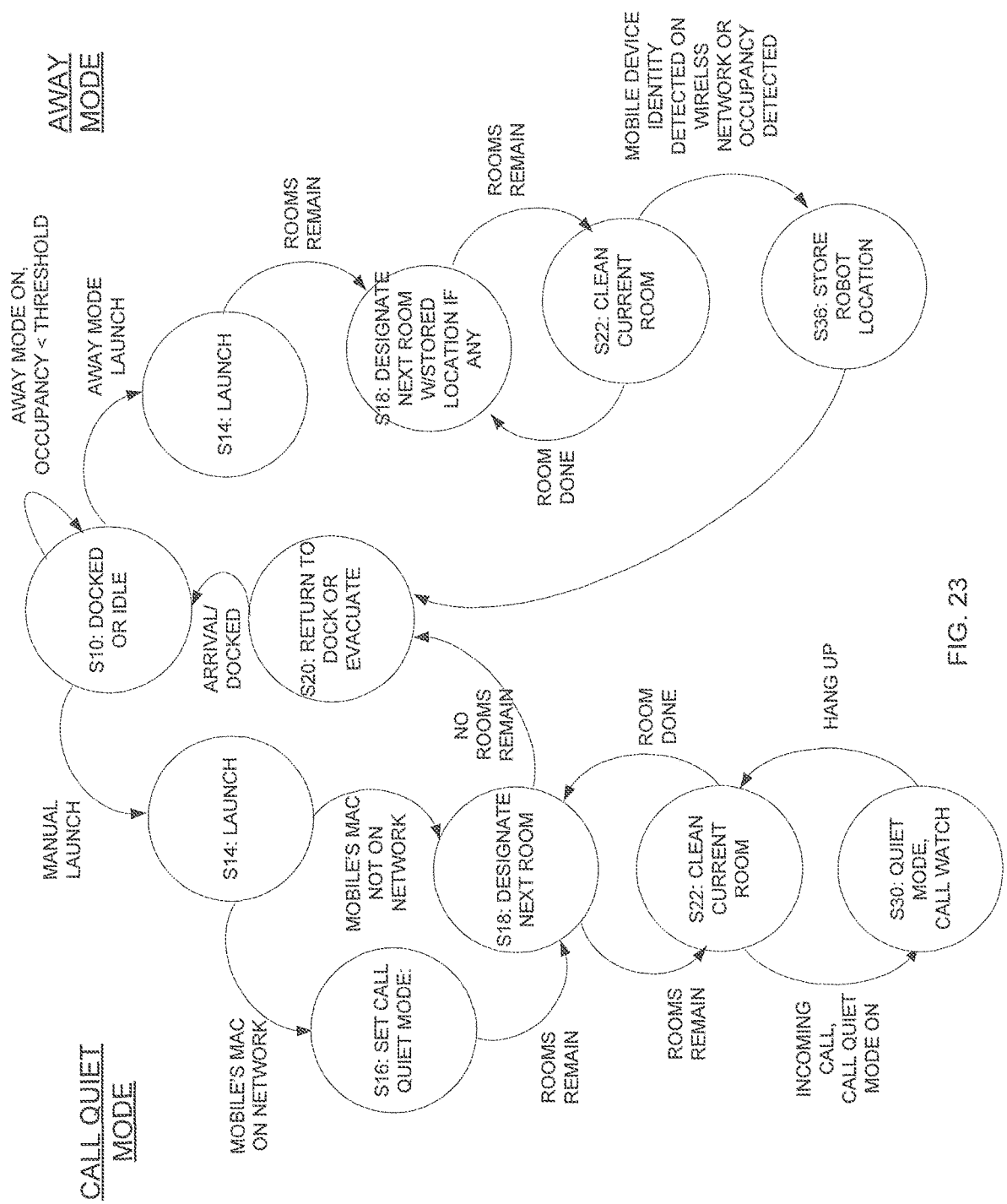
FIG. 23 is a schematic finite state machine diagram illustrating the state of a mobile robot according to some embodiments or according to an invention disclosed herein.

Similarly, as indicated in FIG. 23, in a manual launch scenario, the robot 200 will go from a docked or idle state S10 to a launch state S14, where the mobile robot 200 launches (i.e. drives) off the dock to start a coverage mission. If the mobile device 300 is not on the network (i.e. its MAC is not on the network), the mobile robot will change state between designate next room state S18 and clean current room state S22, moving room by room through a household to complete a mission. When no rooms remain for cleaning, the robot state changes to a returned to dock or evacuate state S20 and when the mobile robot 200 arrives at the dock 140, the robot state changes to docked or idle state S10. If the mobile device MAC is on the network and the robot 200 enters a set call quiet mode state S16 after launching, the mobile robot 200 will alter state between designate next room state S18 and clean current room state S22 until the mission is complete and no rooms remain or until a call state change alters the mobile robot cleaning state. When the mobile device receives an incoming call, the mobile robot state changes to quiet mode, call watch S30. In the quiet mode, call watch S30 state, the mobile robot 200 remains in a quite mode S30 (i.e. turn off motorized actuators, stop in place and go silent) and watches for the call to end before returning to the clean current room state S22.

In some embodiments, or in an invention disclosed herein or preceding, the term "action state" includes one or more states reflecting transitions between idle and active for an actuator or control system. The action state is a logic or data state applied to actuated mechanical, electrical, signal, or other actuator, and may be stored in a database and/or directly and reactively monitored by a sensor. In addition, there may be an intermediate state during which a decision to act is made by logic in the system. For example, for a call state or call "action state" (e.g., whether a telephone is active for a call), a telephone may be ready for a call, may be ringing a call yet not yet answered, and a call may be in progress. Further, the action state need not be "on" versus "off", it may be "lower" versus "higher", or expressed with variable ranges. For example, a state of cleaning or cleaning "action state" (e.g., whether a cleaning head powered by an actuator is active for cleaning), a cleaning head may be idle, may be in a low-power or low-speed mode, and may be in a high-power or high-speed mode.

In some embodiments, or in an invention disclosed herein, the system 100 can automatically control devices 120, 122, 124, 126, 128, 129, 140 of the structure 10 to facilitate operation of the, robot 200. For example, the system 100 via instructions from the hub 110) can automatically turn on a light fixture 34 using a controller 128 to illuminate a region viewed by the camera 270B of the robot 200. The robot manager access client 1524 may instruct the mobile robot 100 to return S20 to the dock 140 when a person P returns to the living structure 10 after being outside of the WLAN range 165. The robot manager access client 1524 may instruct the mobile robot 100 to operate in a quiet mode 530 when a person P returns to the living structure 10 after being outside of the WLAN range 165 and the mobile device 300 on the WLAN 164 receives a call and is in an active call state 300A (also referred to herein as a "call" or "ring"). The active call state 300A refers to a call ringing on a mobile device 300A and also to an occupant answering the call 300A.

Figure 4:
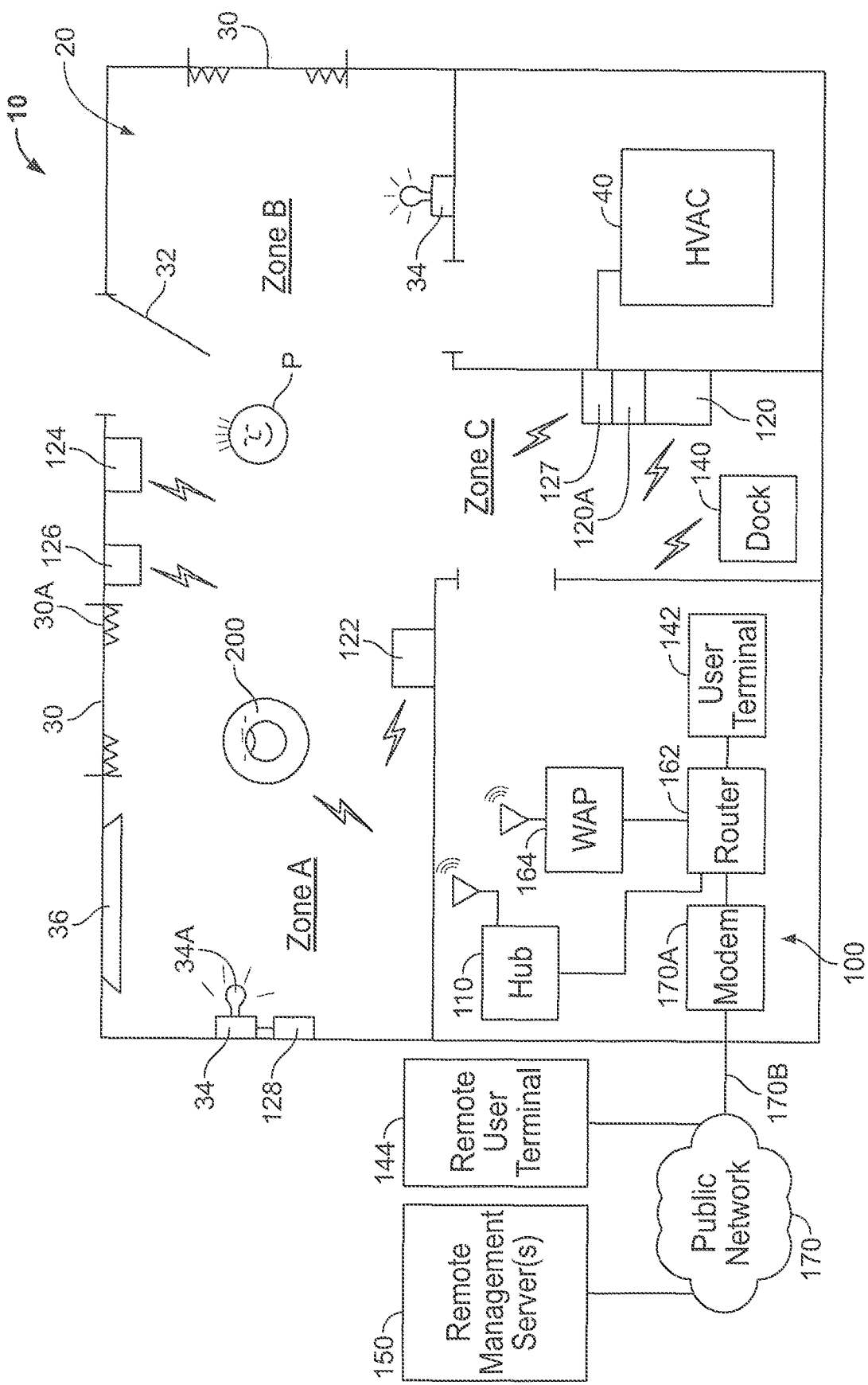
FIG. 4 is a schematic diagram illustrating a living structure with the environmental management system of FIG. 1 installed therein.

As indicated in FIGS. 3, 4 and 21, in one embodiment, or in an invention disclosed herein, the processor 221 of the mobile robot 200 executes a plurality of routines. The plurality of routines include a first routine which monitors the wireless access point (WAP) 164 by communicating with the wireless network circuit 250, and detects a presence state of one or more mobile devices 300 within the WLAN range 165. A second routine receives a signal from a sensor, the sensor detecting a call state of the mobile device 300, the action state changeable between call readiness and call received. A third routine commands a motorized actuator of the service operation system 242 of the mobile robot 200 to change state of performing mechanical work based on the presence of the mobile device 300 on the WLAN and on the call state detected by the first and second routines.

In some embodiments, or in an invention disclosed herein, decisions that are rendered by routines executed by a mobile robot processor 221 are instead or in the alternative executed by routines executed by a compartmentalized or other application hosted by an operating system running via the smart phone 300 processor, so long as the mobile robot processor 221 and the smart phone 300 are network entities that may communicate with one another. The present disclosure contemplates that such routines may be executed by the partner application on a smart phone 300, and resulting data, commands, or information used by the mobile robot processor to cause the mobile robot 200 to activate actuators may be transported over a shared network.

As described above, in some embodiments, or in an invention disclosed herein, the state of cleaning is changed from one or more motorized actuators of the service operation system 242 being powered to on or off, and in other embodiments, or in an invention disclosed herein, the state of cleaning is changed from the motorized actuator operating at trial power to operating at a low power, low decibel state. In embodiments, or in an invention herein disclosed, a full power state represents the motorized actuator operating a vacuum fan or a roller element of the service operation system 242 at full speed and a lower power state represents the motorized actuator operating the vacuum fan or roller element of the service operation system 242 a lower speed.

In other embodiments, or in an invention disclosed herein, the signal received by the second routine is sent from a sensor 270A-J on the mobile robot 200. In some examples, the sensor 270A-J on the mobile robot 200 is an audio sensor 270E for hearing the call ring or vibrate 300A. In other examples, the sensor 270A-J on the mobile robot 200 is a radio receiver of the wireless communication system 250 for detecting a radio frequency signal indicative of a phone call 300A, such as, for example, 915 MHz in North America or 868 MHz in Europe. In some embodiments, or in an invention disclosed herein, the sensor signaling receipt of a call 300A is a single sensor or a combination of sensors on the mobile device 300, such as an accelerometer measuring the motion associated with raising a telephonic device to an ear, a proximity sensor for measuring the proximity of the telephonic device to a person's P face or head, a vibration actuator or sensor for causing or detecting a vibration indicative of a ring 300A, and a microphone on the phone for audibly detecting a ring 300A.

In some embodiments, or in an invention disclosed herein, the first routine detects the presence state of a mobile device 300 on the wireless local network, and the second routine receives a signal from a cleaning readiness sensor in the mobile robot 200, the sensor detecting the cleaning readiness state of the mobile robot 200, the cleaning readiness state changeable between cleaning readiness and cleaning active, in embodiments, or in an invention disclosed herein, the mobile robot 200 executes a monitoring behavior for monitoring the cleaning readiness. In some embodiments, cleaning readiness is a battery charge of the mobile robot 200, the corresponding cleaning readiness sensor relying on electronic coulometry and/or other battery charge state sensor, for example. In other embodiments, the cleaning readiness is a stasis state of the mobile robot 200, and the corresponding cleaning readiness sensor is a "stasis" sensor relying on one or more odometers, accelerometers, or actuator current measurements to determine whether the mobile robot 200 is able to freely move or is stuck or restricted in movement. In embodiments, or in an invention disclosed herein, the end effector 242D is the cleaning head of the service operation system 242 of the mobile robot 200, the cleaning readiness is a stasis state, and the motorized actuator is stationary in a stasis state.

In some embodiments, or in an invention disclosed herein, the third routine which commands the cleaning head or end effector 242D of the mobile robot 200 to change state of cleaning based on the presence of the mobile device 300 on the wireless local network and on the cleaning readiness state of the mobile robot 200. If the mobile robot does not have enough battery charge to power a mission, the mobile robot 200 will not launch even when the occupancy schedule indicates a time interval during which the occupant(s) are away from the living structure 10.

In some embodiments, or in an invention disclosed herein, the network-enabled mobile device that enables the mobile robot 200 to detect occupancy presences is a wireless transmission enabled sensor tag, such as the Sensed motion cookie. In other embodiments, or in an invention disclosed herein, the mobile device is a smartphone 300. In some embodiments, the mobile device is a wireless transmission enabled device, such as a portable activity tracker, baby monitor, scale or air quality monitor. Examples of such wired mobile devices are the Withings™ activity monitor, baby monitor, and scale. In some embodiments, or in an invention disclosed herein, the mobile robot 200 uses an onboard camera 270B or passive IR sensor 260 to detect the presence of one or more occupants P in one or more rooms (Zones (A-C)) in the living space 20.

One advantage of a mobile robot 200 receiving a signal indicative of the presence of an occupant P, as determined by their mobile device 300 appearing on the WAP 164, is that the mobile robot 200 executes a monitoring routine, and in response to conditions set in the monitoring routine, reactively responds to presence. In some embodiments, the mobile robot independently monitors the local network 160 for the presence of one or more mobile devices 300, and in other embodiments, the mobile device 300 enters the network and notifies the mobile robot 200 of its presence through an application, such as the robot manager access client 152 or the environmental manager access client 152 running on the mobile device processor for wirelessly communicating instructions to the mobile robot 200.

In some embodiments or in an invention disclosed herein or preceding, a mobile robot's processor 221 may execute routine(s) that, in response to an initiating signal or measurement being monitored that together signify both that the mobile robot 200 is ready and the household occupant P is absent, launch and execute a mission, for example, a cleaning mission, if the mobile device 300 leaves the network and the mobile robot 200 is ready, for example if a mobile robot battery 244 is charged. A "mission" includes a start-to-finish set of mechanical work tasks performed while traveling (where the robot navigates through space 20) having an initiating criteria (e.g., a user command, a schedule, threshold, setpoint based command or decision) and a terminating and/or completing criteria (e.g., a time limit, an area limit, a remaining battery charge limit, a number of times for an area to be covered, and/or a cleanliness score from dirt detection) Missions may be completed in more than one sortie. The mobile robot's processor 221 will execute routine (s) that, in response to a initiating signal or measurement being monitored that together signify both that the mobile robot 200 is operating normally (and possibly loudly) and the household occupant P has requested less noise in their proximity or has a sudden need for additional quietness, drive away from an occupant P, quiet itself, or turn off its power supply to quiet the robot when an occupant takes a phone call 300A. The mobile robot 200 therefore behaves in a situationally responsive way by interrupting its mission so that the occupant P can hear a caller on the mobile device 300 without background noise interference.

In embodiments, the mobile robot retreats from an occupant P holding a mobile device 300 that is in an active call state 300A or the mobile robot quiets its motorized actuators, such as those for actuating the vacuum fan, the motor or motors of the drive system 230 for actuating the drive wheels 232 and those for actuating one or more end effectors 242D, or cleaning head members (e.g. rollers, cloths, sprayers), of the service operation system 242. The mobile robot 200 monitors the call state and, in embodiments, monitors for the radio frequency indicative of and active call state 300A, in embodiments, or in an invention disclosed herein, when a call has ended, the mobile robot 200 returns to where it discontinued its mission and returns to an active mission state. The mobile robot 200, therefore, completes its mission throughout the living space 20 while accommodating for the presence of an occupant P and for the answering of a call 300A on a mobile device 300. According to some embodiments, or in according to an invention disclosed herein, the system 100 uses data collected by the environmental sensors of the mobile robot 200 to enable or enhance the monitoring and/or control functions and processes of the system 100. The robot environmental sensors 270A-J (which are networked to the hub 110 and/or the remote management server 150) can thereby be used in place of or in addition to the stationary sensors 120, 122, 124 to provide input data and instructions to the hub 110, the mobile device 300, the networked-enabled stationary sensors 120, 122, 124, the networked-enabled automation controller devices 126, 127, 128, 129, 140 and/or the remote management server 1150. As discussed above, the locations of the robot environmental sensors 270A-I in the living space 20 can be determined and registered so that the readings from the robot environmental sensors 270A-J can be correspondingly registered with respect to the space 20.

The ambient light sensor 270D or camera 270B, for example, can be used to detect the light level in a zone and/or entering through a window 30. Based on the data from this sensor robot or sensors, the system 100 may use a controller 126 to close a shade 30A on the window or notify a user that the shade should be closed.

Similarly, the camera 270B or other sensors on the robot 200 can be used to detect open windows 30 or doors 32. In this manner, the robot 200 can monitor portals to and zones of the living space for security or other purposes.

Figure 25:
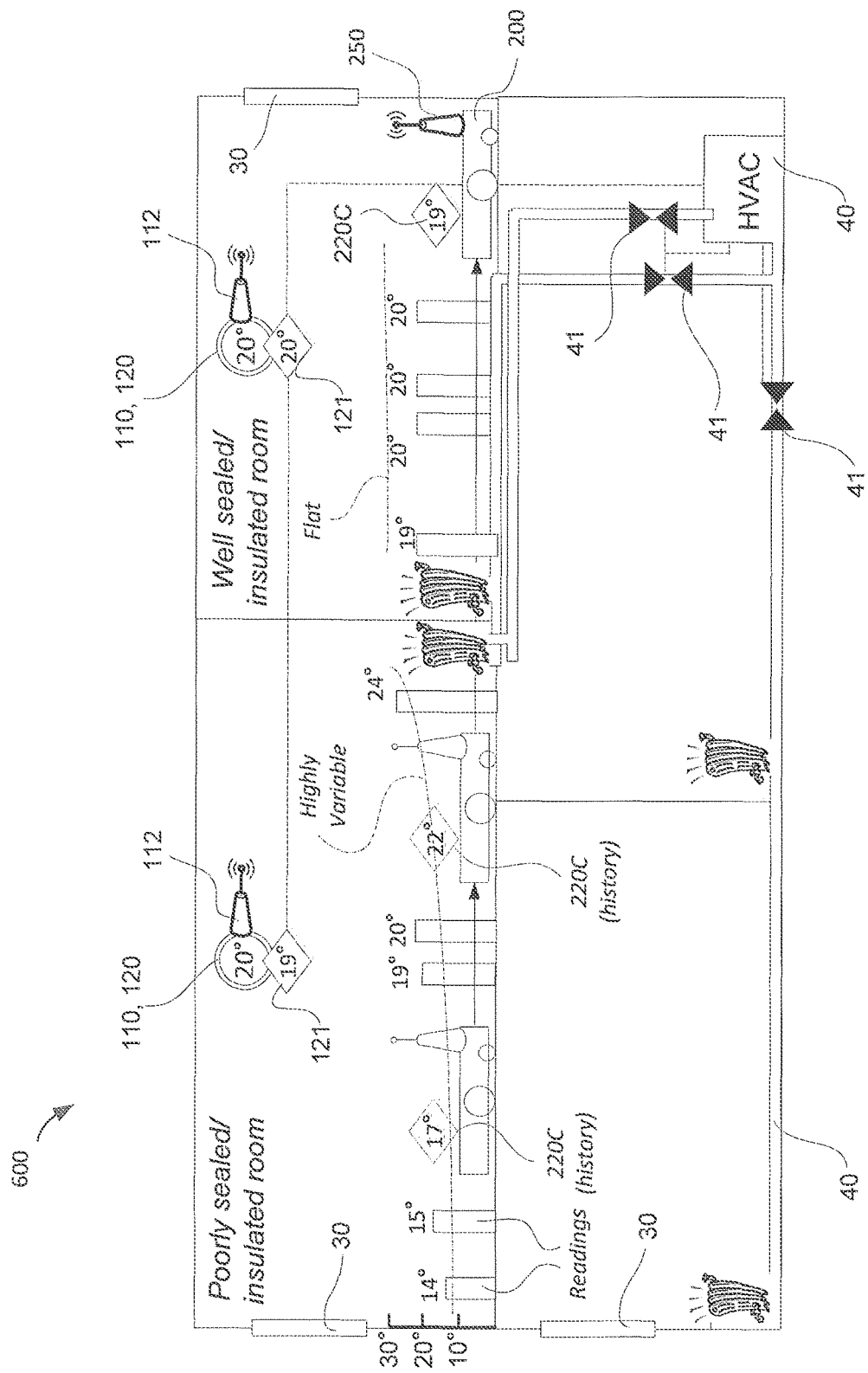
FIG. 25 is a schematic diagram illustrating a map of environmental sensor readings taken throughout in a living structure according to some embodiments or according to an invention disclosed herein.
Figure 26:
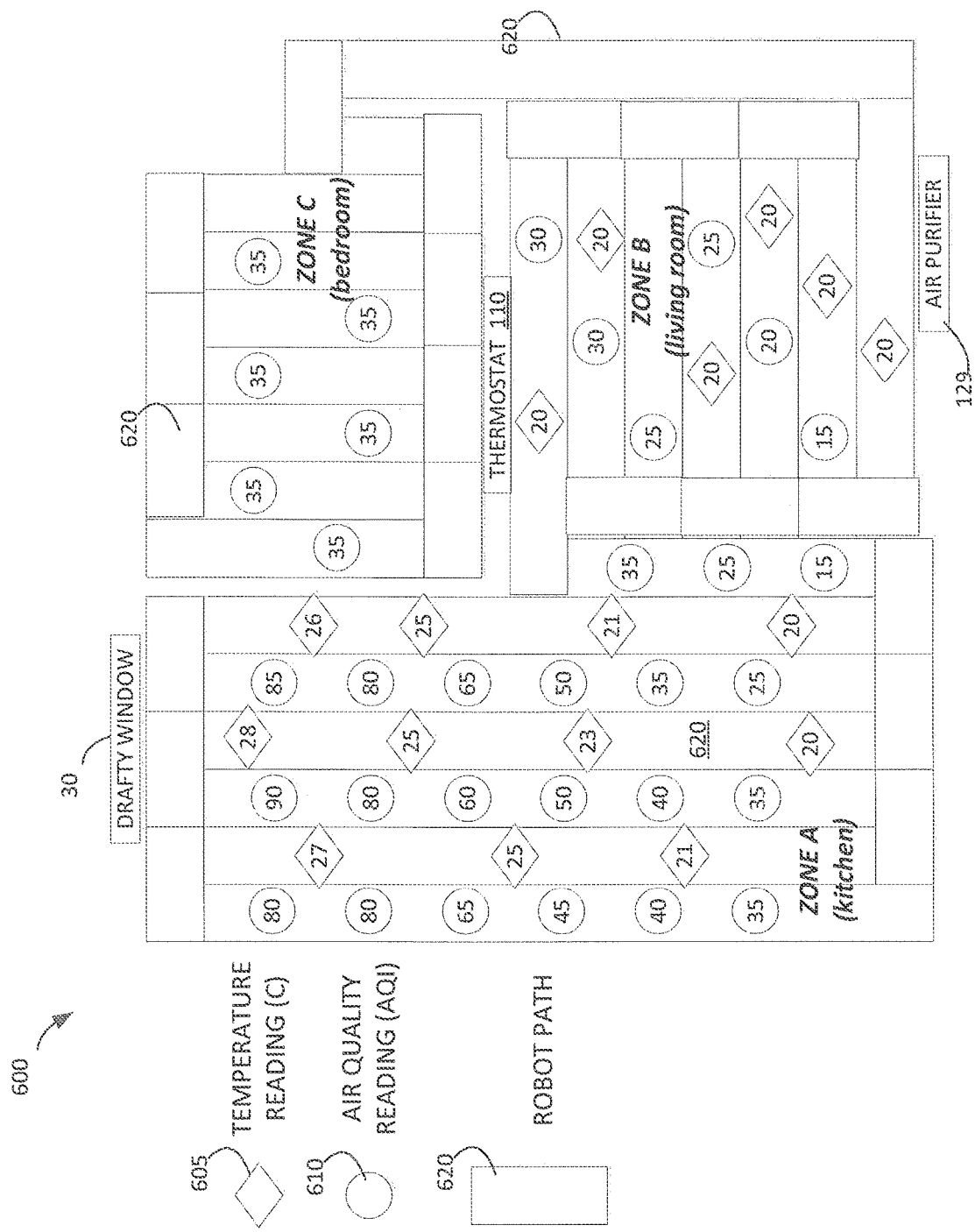
FIG. 26 is a schematic diagram illustrating a map of environmental sensor readings taken throughout in a living structure according to some embodiments or according to an invention disclosed herein.
Figure 27:
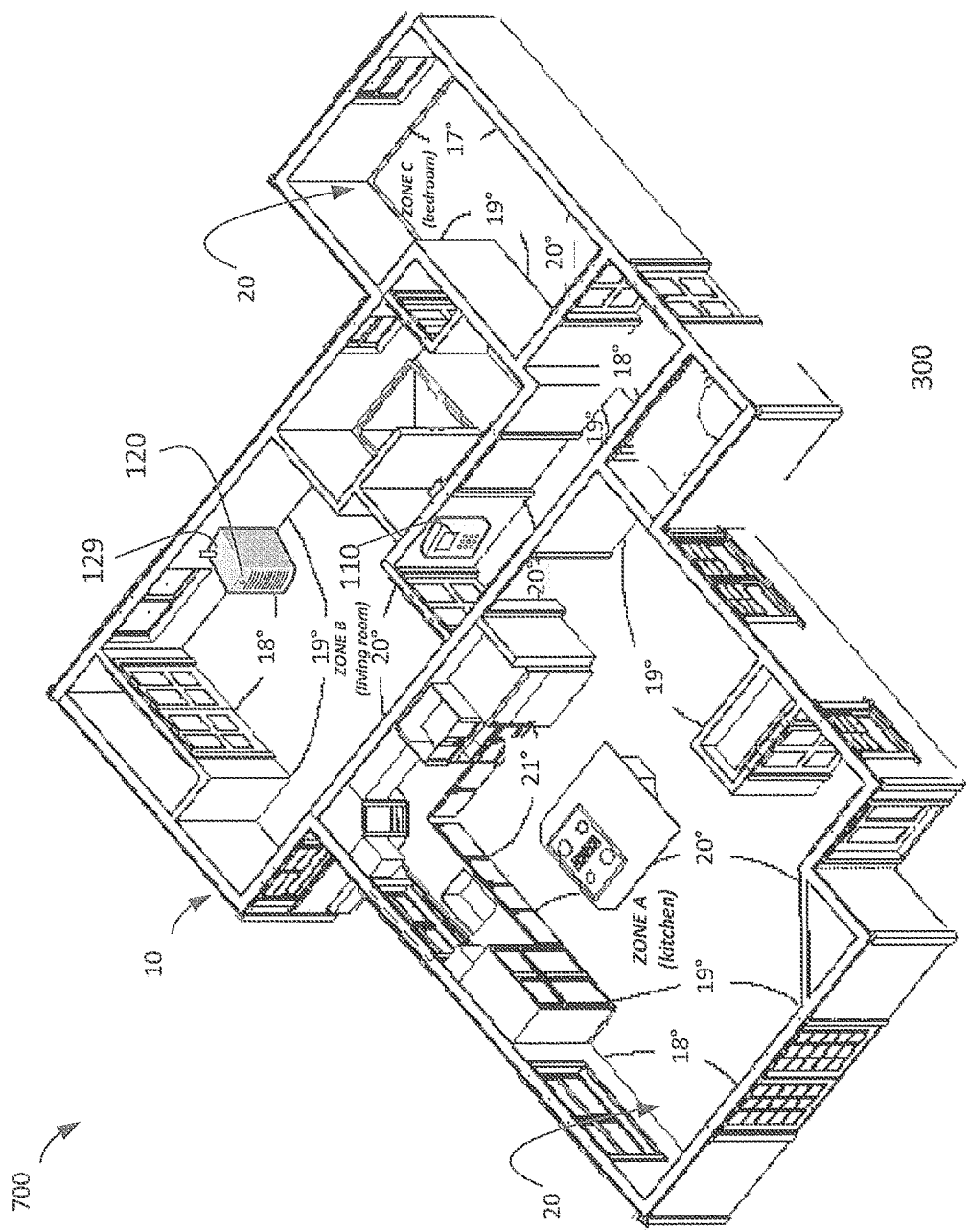
FIG. 27 is a schematic diagram illustrating a map of environmental sensor readings in a living structure according to some embodiments or according to an invention disclosed herein.

As indicated in FIGS. 3, 22, 25, 26 and 27 the temperature sensor 270C can be used to detect an ambient temperature at a location in the space 20 other than the location(s) of the stationary temperature sensor(s) 110. In this way, the mobile robot 200 obtains a temperature data set that more accurately reflects the temperature distribution in the space 20. The system 100 may respond by modifying operation of the HVAC system 40 or other devices (e.g., automatically opening or closing thermal shades) or reporting the temperature distribution to a user. As indicated in FIGS. 25 and 26, the mapping and navigation routine enables the mobile robot 200 to measure and store sensor temperature readings 605 throughout the living space 20 to create 2 dimensional or 3 dimensional map of temperature readings 605 throughout the living space 20. As indicated in FIG. 25, the temperature readings 605 taken by the mobile robot 200 may be mapped to rooms in a household 20 and across individual rooms in household 20 to yield a mapped temperature gradient comparable to a stationary temperature reading 121 of a stationary node 110, 120. The robot generated map of temperature readings indicates variability undetected by the stationary sensor 110, 120 which captures only a single output. Similarly, in embodiments, or in an invention disclosed herein, the mobile robot 200 measures and stores air quality readings 610 with its onboard air quality sensor 270I as the mobile robot 200 drives along a robot path 620 throughout the living space 20. The air quality readings 610 are mapped to a 2 dimensional or 3 dimensional map of air quality readings throughout the living space 20. In embodiments, or in an invention disclosed herein, the air quality readings 610 may measure commonly detected air quality values, such as those for Common air pollutants, particulate matter (PM), sulphur oxides (SOx), nitrogen oxides (NOx), volatile organic compounds (VOCs), carbon monoxide (CO) and ammonia (NH3), ground-level ozone (O3), pollen, dust, or other particulate matter. In embodiments, or in an invention disclosed herein, the air quality readings measure humidity. As indicated in FIGS. 25 and 26, in embodiments, or in an invention disclosed herein, the map 600 of sensor readings 121, 605, 610 displays to the HMI of a local user terminal 142, 300 or a remote user terminal 144, 300 for active management of the networked-enabled stationary sensors 120, 122, 124 and the networked-enabled automation controller devices 40, 126, 127, 128, 129, 140. In embodiments, or in an invention disclosed herein, the mobile robot 200 processes the mapped sensor readings 605, 610 to send operational instructions the networked-enabled stationary sensors 120, 122, 124 and the networked-enabled automation controller devices 126, 127, 128, 129, 140. As indicated in FIGS. 25, 26 and 27, the system 100 therefore uses a mapping mobile robot 200 to collect thermal/humidity/air quality data and assemble a dynamically updated two dimensional map 600 or three dimensional map 700 which can be used for home environmental control. In some embodiments, or in an invention disclosed herein or preceding, such as those shown in FIGS. 25 and 26, the sensor readings taken at the plurality of two dimensional locations within the household 20 populate a two dimensional map of sensor readings within the household 20, the two dimensional map being stored within a memory accessible to network entities, and in particular displayed on a human machine interface device (e.g., a mobile handset smartphone 300, personal computer, smartwatch, mobile tablet, having a display and/or touchscreen as well as a wireless network interface, processor, and memory for executing routines) in communication with the mobile robot 200 over the network.

In some embodiments and according to a first aspect, or according to an invention disclosed herein, a household mobile robot 200 for "coverage" missions (sweeping, vacuuming, mopping, spreading fluid, and/or any combination of these) uses a suitable technique or techniques, in some embodiments, or in an invention disclosed herein, "Simultaneous Localization and Mapping" (SLAM) techniques, to generate a map of the surface being, for example, vacuumed. There are various techniques, and various maps that may be generated. Maps may be topological, Cartesian, polar, representational, probabilistic, or other; and/or may track Avails, obstacles, open spaces, fiducials, natural features, "occupancy", or other map features. In some techniques, many maps, each of some degree of probable correctness, are recorded.

According to some embodiments, or according to an invention disclosed herein, substantive processing of the environmental sensor data collected by the robot 200 as described herein is conducted entirely or primarily by the processor 221 of the robot 200. According to some embodiments, or according to an invention disclosed herein, substantive processing of the environmental sensor data collected by the robot 200 as described herein is conducted entirely or primarily remotely from the robot 200. In some embodiments, or in an invention disclosed herein, said processing is conducted entirely or primarily at the cloud or remote management server 150. In some embodiments, or in an invention disclosed herein, said processing is conducted entirely or primarily at the remote user terminal 144, 300 or local user terminal 142, 300. However, in other embodiments, or in an invention disclosed herein, all or a portion of the processing of the robot sensor data may occur in the hub 110.

As indicated in FIGS. 3, and 21 through 27 according to embodiments, or in an invention disclosed herein, the mobile robot 200 includes a processor 221 connected to a memory 222 and a wireless network circuit 160, for executing routines stored in the memory 222 and commands generated by the routines and received via the wireless network circuit 160. The mobile robot 200 further includes driven wheels 232 commandable by the processor 221 to reach a multiplicity of accessible two dimensional locations within an living space, 20, or household, and an environmental sensor 270C, 270I, 270J readable by the processor 221, the processor 221 executing a plurality of routines. The plurality of routines include a first routine which commands the driven wheels 232 to move the mobile robot 200 about the household 20, a second routine which takes sensor readings 605, 610 at a plurality of the accessible two dimensional locations within the household 20, as indicated in the exemplary map 600 of FIG. 25, and a third routine which, based on the sensor readings 605, 610 throughout the household 20, sends data to a the networked-enabled automation controller devices 126, 127, 128, 129, 140 having a dedicated environmental sensor 120 resulting in the activation of a motorized actuator 41 on the networked-enabled automation controller devices 126, 127, 128, 129, 140 to perform mechanical work in the household 20, despite the dedicated environmental sensor alone determining otherwise.

In some embodiments, or in an invention disclosed herein or preceding, the multiplicity of accessible two dimensional locations is a set of X, Y co-ordinates (a localization or "location") or X, Y, theta co-ordinates (a "pose") reflecting a location on the floor of a household 20 not occupied by some obstacle, and/or a set of the accessible locations or poses or location cells recorded in an occupancy grid. In this case, the occupancy grid or free floor space can optionally be used by the processor 221 to conduct path planning, i.e., sequencing different trajectories to avoid obstacles, and command the driven wheels 232 to move about the free floor space. Path planning may be substantially direct (e.g., the shortest or fastest path, optionally using path planning algorithms such as variants of Dijkstra's, A* or D* algorithms); sampling oriented (e.g., taking some number of samples—e.g., 5-20—on a path over a number of minutes, optionally using path planning algorithms where the constraint is a distributed sample set and not the shortest of fastest path, or roaming and/or random); or area coverage oriented (e.g., taking a larger number of samples—e.g. 20-100—in a manner that assigns each sample to a location, optionally topologically or metrically related to one another, or kept as a 3D matrix).

In embodiments, or in an invention disclosed herein, the mobile robot moves about the household 20 on a primary mission and simultaneously collects environmental sensor readings 605, 610 as a secondary mission. In some embodiments, the mobile robot 200 is a vacuum and the primary mission is a cleaning mission. While the mobile robot 200 moves about the household 20 vacuuming, it also measures and maps environmental sensor readings 605, 610. The environmental sensor readings are mapped to a 2-Dimensional or 3-dimensional layout map of the household 20.

In embodiments, or in an invention disclosed herein, the sensor readings 605, 610 taken at the plurality of accessible two dimensional locations within the household 20 are environmental sensor readings. In some embodiments, the environmental sensor is an air quality sensor 270I, and in other embodiments, the environmental sensor is a humidity sensor 270J. In some embodiments, the environmental senor is a temperature sensor 270C.

In some embodiments, or in an invention disclosed herein, the networked-enabled automation controller device 129 is a humidifier with a dedicated humidity sensor 120. In some embodiments, or in an invention disclosed herein, the networked-enabled automation controller device 129 is an air purifier with a dedicated air quality control sensor 120. In some embodiments, or in an invention disclosed herein, the networked-enabled automation controller device 129 is a thermostat 110 for controlling automation elements such as HVAC 40 and automated window shades 30A.

Networked-enabled automation controller devices 110, 126, 127, 128,129, 140 such as thermostats, air purifiers and humidifiers, are stationary and typically located at One or two locations throughout an living space 20, and the stationary sensors therein measure relatively localized air currents at that particular singular, unchanging location. The primary advantage of the mobile robot 200 is accessing locations distant from or in another room or Zone (A-C) not immediately adjacent the stationary networked-enabled automation controller devices 110, 126, 127, 128, 129, 140 By mapping measurements throughout an living space 20, the mobile robot 200 determines whether, based on a single reading 605, 610 taken in a location remote from the stationary networked-enabled automation controller devices 110, 126, 127,128, 129, 140 or based on an aggregate of readings taken randomly or systematically throughout the living space 20, a stationary networked-enabled automation controller device 110, 126, 127,128, 129, 140 should be activated.

Based on a plurality of measurements taken throughout an living space 20, the mobile robot 200 activates a networked-enabled automation controller device 110, 126, 127, 128, 129, 140 even when the environmental sensor 120 reading of the networked-enabled automation controller device 110, 126, 127, 128, 129, 140 indicates otherwise at its singular, unchanging point of location on the map 600. The network entity's dedicated senor 120 measures only the immediate volume adjacent the networked-enabled automation controller device HO, 126, 127, 128, 129, 140 and fails to account for variations in a volume of air mass spread throughout an living space 20. By monitoring and measuring temperature, air quality and humidity throughout the living space 20, the mobile robot 200 provides information otherwise inaccessible by the stationary networked-enabled automation controller device 110, 126, 127, 128, 129, 140. As shown in the exemplary maps 600 of FIGS. 25 and 26, the mobile robot 200 can measure temperature variations in different zones (A-C) of an living space 20, identifying on the map 600 hot spots and high pollen readings (i.e. low air quality) near a drafty window, for example. As shown in the exemplary map 700 of FIG. 27, the mobile robot 200 can measure temperature variations in different zones (A-C) of an living space 20, identifying on the map 700 temperature ranges in a topographical presentation.

If the mobile robot 200 is on a sensor reading mission as the primary mission and is not conducting a secondary mission, such as a cleaning mission, the mobile robot 200 may send a command signal to a stationary networked-enabled automation controller device 110, 126, 127, 128,

129, 140 at different stages of the robot mission. In one embodiment, or in an invention disclosed herein, once the mobile robot 200 takes a single sensor reading falling above or below an acceptable threshold level or range for temperature, humidity or air quality, the mobile robot 200 instructs the corresponding stationary networked-enabled thermostat 110 or air purifier or humidifier 129 to operate even if the dedicated sensor 120 on the stationary networked-enabled automation controller device 110, 126, 127, 128, 129, 140 falls within the acceptable threshold measurement or range of measurements. In one embodiment, or in an invention disclosed herein, once the mobile robot 200 finishes its mission, it averages its sensor readings. If the average sensor reading for a room or Zone (A-C) falls above or below an acceptable threshold level or range for temperature, humidity or air quality, the mobile robot 200 instructs the corresponding stationary networked-enabled thermostat 110 or air purifier or humidifier 129 to operate even if the dedicated sensor 120 on the stationary networked-enabled automation controller device 110, 126, 127, 128, 129, 140 falls within the acceptable threshold measurement or range of measurements. In one embodiment, or in an invention disclosed herein, once the mobile robot 200 takes a single sensor reading falling above or below an acceptable threshold level or range for temperature, humidity or air quality, the mobile robot 200 finishes its mission (e.g. cleaning mission) and then instructs the corresponding stationary networked-enabled thermostat 110 or air purifier or humidifier 129 to operate even if the dedicated sensor 120 on the stationary networked-enabled automation controller device 110, 126, 127, 128, 129, 140 falls within the acceptable threshold measurement or range of measurements.

As indicated in FIGS. 25, 26 and 27, according to an embodiment, or in an invention disclosed herein, a mobile robot 200 includes an environmental sensor readable by the processor 221 to take current readings of an environmental quality. The mobile robot 200 additionally includes a localizing circuit, with at least one localizing sensor, such as a camera 2709, laser scanner, or time of flight sensor, that observes sensor readings from objects within the household 200, for determining a current pose of the mobile robot 200 with reference to the observed objects. The processor executes a plurality of routines including a navigation routine which commands the driven wheels 232 to move the robot 200 about the household 20, a surface mapping routine that accumulates observations from the localizing circuit to record a two dimensional array representing possible locations of the mobile robot 200, an environmental mapping routine that takes and accumulates readings from the environmental sensor at a plurality of the accessible two dimensional locations within the household and causes the memory 222 to store a three dimensional array based on the readings and on the two dimensional array representing possible locations of the mobile robot and a location-responsive environmental control routine. The location-responsive environmental control routine correlates the three dimensional array to locations of a plurality of control nodes, such as the networked-enabled automation controller devices 110, 126, 127, 128, 129, 140. Each control node, or networked-enabled automation controller device 110, 126, 127, 128, 129, 140, has a dedicated environmental sensor 120 and a control channel to actuate a motorized actuator 41 to perform mechanical work within the household 20. Based on a proximity of at least one control node, or networked-enabled automation controller device 110, 126, 127, 128, 129, 140, to an environmental mapping location represented in the three dimensional array, the mobile robot 200 sends data to cause the at least one environmental control node, or networked-enabled automation controller device 110, 126, 127, 128, 129, 140, to perform mechanical work in the household 20.

One or more of the robot sensors 270A-J may be used to sense an occupant in the living space 20. The mobile robot 200 can significantly improve the occupancy detection capability of the system 100 by providing occupancy data at a location or locations that are not available to the stationary sensors 110, 120, 122, 124. The occupancy information collected by the robot 200 may be used alone or to supplement occupancy information collected by one or more of the stationary sensors 110, 120, 122, 124. Sensors on the robot 200 can be used to detect environmental conditions and collect occupancy data. In support of occupancy sensing systems as disclosed in US. Published Application No. 2012/0066168 (the disclosure of which is incorporated herein by reference), for example.

According to some embodiments, or according to an invention disclosed herein, the mobile robot 200 determines whether an electronic device is turned on and, if so, automatically turns off the electronic device. In some embodiments, or in an invention disclosed herein, the robot 200 detects that the TV 36 is on using the camera 270B or a radiation sensor 270A, 270D) and responds thereto by turning the TV 36 off (e.g., using the IR modulator 260) or notifying the hub 110, which turns the TV 36 off (e.g., using controller 126).

According to some embodiments, or according to an invention disclosed herein, the system 100 uses environmental information collected by the robot sensors 270A-J for energy management execution, planning and/or reporting. The system 100, using sensor data from the robot 200, can determine that an automated control response is needed and initiate the response. The system 100 using sensor data from the robot 200 therefore monitors human occupancy behaviors and make suggestions for improving energy efficiency.

For example, the system 100 may determine from data acquired by the camera 270B that the window shade 30A should be closed to block out light and actuate the controller 126 to close the shade 30A. By way of further example, the robot 200 can detect that a light 34 is on at a time or under conditions when it should not be and the system 100 can respond thereto by actuating a controller 126 to turn off the light 34. In some configurations, the system 100 may notify the user (e.g., via the terminal 142 or the terminal 144) that action may be needed (e.g., close the shade or turn off the light) rather than automatically executing the action. In this case, the system 100 may be configured to enable the user (e.g., via the terminal 142, 144) to instruct the system 100 to execute the desired action. Regardless of how the action is executed, directly by a user or indirectly via the system 100, the robot 200 uses the sensors 270A-J to confirm (e.g. visual confirmation with an onboard camera) that a desired action is completed (e.g. light turned off, shades drawn, door shut, storm window lowered, etc.).

According to some embodiments, or according to an invention disclosed herein, the system 100 is configured to evaluate the data from the environmental sensors (including the robot sensors), generate a usage report, energy management plan, proposal or recommendation based on the data, and report the report, plan, proposal or recommendation to a user (e.g., at the terminal 142, the remote terminal 144, the hub 110, the robot 200 or otherwise).

In some embodiments, or in an invention disclosed herein, the system 100 collects device usage data, determines a pattern of device usage, generates a recommendation plan for operating or deploying energy management equipment, and reports the recommendation or plan to the user. For example, the system 100 may monitor the statuses (on or off) of the light bulbs and recommend to the user that the user program the system 100 or purchase and install certain home automation equipment (e.g., light controllers or IP addressed light bulbs (e.g., IPv6 addressed LED light bulbs available from Greenwave Reality) to automatically turn certain of the lights on and off. The system 100 may plan a deployment strategy for networked energy management equipment. The system 100 can report the user's behavior patterns and suggest priority for adding different automated elements to the network.

The system 100 may provide the user with Internet URL links to webpages describing equipment recommended for addition to the system and/or to webpages for purchasing such equipment.

The robot 200 can use an onboard sensor (e.g., the IR detector 270A or a photodiode) to assess whether a lamp (e.g., an incandescent light bulb) has burned out or is near its end of life and will soon burn out and, if so, the system 100 can send the user a message reporting the same. The message may include an Internet link to a webpage where a replacement lamp can be purchased. For example, in one embodiment, or in an invention disclosed herein, the robot 200 includes a photodiode for sensing the frequency component of light.

The mobile robot 200 may be used to charge (in some embodiments, or in an invention disclosed herein, wirelessly (inductively)) a battery 120A of one or more of the stationary sensors 120, 122, 124, the controllers 126 and the hub 110 using the charger 226. One or more of the components 120, 122, 124, 126, 110 may be configured and used to charge (e.g., wirelessly) the battery 224 of the robot 200 and/or the robot 200 may be charged by the dock 140.

In embodiments, or in an invention disclosed herein, the mobile robot 200 monitors human occupancy behaviors and autonomously makes decisions about operating such as when to operate and for how long, which may depend on user preferences. The mobile robot 200 can leant the layout of an living space 200 and the amount of time it takes to complete coverage of each room or Zone (A-C) in the living space 20 and use that stored information to plan full coverage missions or mini missions of one or more rooms whose coverage times, alone or in combination, fall within a scheduled run time. In embodiments, or in an invention disclosed herein, the mobile robot 200 can access an occupancy schedule to determine a launch time. In embodiments, or in an invention disclosed herein, the occupancy schedule may be directly input to the mobile robot 200 thought an HMI 228 on the mobile robot 200 or wirelessly accessed through the LAN 160. In embodiments, or in an invention disclosed herein, the occupancy scheduled may be wirelessly downloaded to the memory 222 of the mobile robot 200 through native calendar integration (e.g., a user's/ occupant's P own to-do list and appointment calendar in standard formats). In embodiments, or in an invention disclosed herein, the mobile robot 222 therefore plans a complete mission or mini mission that ends before occupants arrive. In embodiments, or in an invention disclosed herein, the mobile robot 22 therefore plans when to preheat an oven or turn the thermostat up or down to achieve even heating or cooling throughout the living space when occupants are away or by the time they are scheduled to return.

In one embodiment, or in an invention disclosed herein, the mobile robot 200 moves about the living space 20 through a multiplicity of accessible two dimensional locations within a the living space 20 (also referred to herein as "household"). The mobile robot 200 includes a localizing circuit, with at least one localizing sensor that observes sensor readings from objects within the household 20, for determining a current pose of the mobile robot 200 with reference to the observed objects, the processor 221 executing a plurality of routines. The plurality of routines include, a navigation routine which commands the driven wheels 232 to move the mobile robot 200 about the household 20, a surface mapping routine that accumulates observations from the localizing circuit to record a two dimensional array representing possible locations of the mobile robot 200, a mission time estimate routine that accumulates timed readings from the localizing circuit and determines at least one estimated completion time span for the mobile robot 200 to substantially cover a surface area of the household 20 corresponding to a contiguous set of possible locations within the two dimensional array, and a mission pre-planning routine that compares a target completion time to the at least one estimate completion time span, and commands the driven wheels 232 to begin covering a the surface area sufficiently in advance of the target completion time for the at least one estimated completion time to pass, so that the surface area is substantially covered before the target completion time.

In embodiments, or in an invention disclosed herein, the mission pre-planning routine further comprising identifying a target completion time and launching the robot 200 based on knowing an occupancy schedule of the household 20. In embodiments, or in an invention disclosed herein, the mobile robot 200 monitors and learns the occupancy schedule over a period or periods of time and sets the target completion time based on the learned occupancy schedule. In some embodiments, the mobile robot learns the occupancy schedule over a period of time and identifies one or more occupancy patterns and sets the target completion time based on the one or more learned occupancy patterns.

In some embodiments and according to a first aspect, or according to an invention disclosed herein, the mobile robot 200 for "coverage" missions (sweeping, vacuuming, mopping, spreading fluid, and/or any combination of these) uses a suitable technique or techniques, in some embodiments, or in an invention disclosed herein, "Simultaneous Localization and Mapping" (SLAM) techniques, to generate a map of the surface being, for example, vacuumed. There are various techniques, and various maps that may be generated. Maps may be topological, Cartesian, polar, representational, probabilistic, or other; and/or may track walls, obstacles, open spaces, fiducials, natural features, "occupancy", or other map features. In some techniques, many maps, each of some degree of probable correctness, are recorded.

In some embodiments, or in an invention disclosed herein, the environmental sensor data from the robot sensors 270A-J is sent to the hub 110, which in turn forwards the robot sensor information, or information derived from the robot sensor information, to the remote management server 150 for computation. The remote management server 150 will then send a report or recommendation to the user (e.g., at a terminal 142, 144, 300) based on the computation.

In some embodiments, or in an invention disclosed herein, different types or modes of processing are executed on different components of the system. For example, 1) the robot 200 may detect that the TV 36 is turned on and determine that it should be turned off, 2) while the hub 110 may assess and process the sensor data from the stationary sensors 120, 122, 124 and the robot sensors to determine whether a zone is occupied, 3) while the remote management server 150 is used to evaluate usage pattern data to generate an energy management strategy. It will be appreciated that, in accordance with embodiments of an invention disclosed herein, or in accordance with an invention disclosed herein, other system architectures may be used that distribute processing response and reporting duties differently than those described above.

According to some embodiments, or according to an invention disclosed herein, the system 100 will deploy the mobile robot 200 to collect environmental data in response to data collected by a stationary sensor 120, 122, 124 or in response to instructions from a user (e.g., via a remote terminal 144). For example, when the system 100 is in a security mode and the huh 110 or remote management server 150 receives data from a stationary sensor 120, 122, 124 indicating the presence of an occupant or opening of a door or window, the system 100 may respond by launching the mobile robot 200 to patrol or investigate a selected zone or zones or the space 20 generally. The robot 200 may send images (e.g., still photos or a live video feed) from the camera 270B or other environmental sensor data to enable the system 100 or user to confirm or better assess the nature of the intrusion or occupancy.

Turning now to the connectivity of household appliances, in accordance with FIGS. 5-13, several embodiments of the present invention include, or an invention disclosed herein, includes, a mobile robot 200 communicating with an end user terminal 142, 144, 300 via a networked hub 110, or via a wireless access point 164.

In some embodiments and according to a first aspect, or according to an invention disclosed herein, a household mobile robot 200 for "coverage" missions (sweeping, vacuuming, mopping, spreading fluid, and/or any combination of these) uses a suitable technique or techniques, in some embodiments, or in an invention disclosed herein, "Simultaneous Localization and Mapping" (SLAM) techniques, to generate a map of the surface being, for example, vacuumed. There are various techniques, and various maps that may be generated. Maps may be topological, Cartesian, polar, representational, probabilistic, or other; and/or may track walls, obstacles, open spaces, fiducials, natural features, "occupancy, or other map features. In some techniques, many maps, each of some degree of probable correctness, are recorded. In common, however:

1) The surface area in which the robot 200 expects to be able to localize grows over time (i.e., the map" gets bigger as the robot 200 travels);

2) A relationship between "the map" recorded by the robot 200 and the actual household floorplan (e.g., Zone A, Zone B and Zone C in FIGS. 4, 21, 26, and 27) may be generated or modeled and graphically represented, and at some point the map of navigable area (or a subset of it) is substantially complete;

3) For a coverage robot 200, areas over which the robot 200 has already traveled have been simultaneously covered (usually cleaned or vacuumed); and the covered area may be graphically represented as an irregular area within the complete map;

4) A ratio or other comparison between the covered area and the complete map can be calculated as a percentage or other representation of partial completeness;

5) Specific physical items, such as a hub or gateway device (e.g., hub 110) or a robot dock (dock 140) or wirelessly networked automation device 126, 128, 129, may be located within and represented within the complete map if the robot 200 or another device hosting the complete map receives a localization for such items within the complete map; and 6) Meaningful subdivisions of the complete map may be assigned based on analysis or user input. For example, a leftmost third of the complete map may be designated as corresponding to a kitchen area, a middle section as a living room, and so on. These room identities may be stored as sub-areas or sub-divisions, as transition lines from one subdivision to another, as localized markers within the complete map, or the like.

In the first aspect, the autonomous mobile robot 200 may be provided with sufficient SLAM capability to build a progressively improving map at the same time as it covers (e.g., cleans) within this map, as well as sufficient connectivity to transmit map data (e.g., entire sets of map data, simplified representations of map data, or abstractions of map data). For example, this could include: a processor; a set of sensors collecting and/or calculating range and bearing data from environmental features (including natural landmarks, placed landmarks, and/or walls and obstacles); a map database including at least one progressively improving map; a coverage database including data representing the covered area within the progressively improving map; and a wireless transmitter or transceiver.

In order to reach the public internet with its data or representations and/or abstractions thereof, the processor and/or wireless transmitter or transceiver (including those with their own embedded processors) would communicate using IP (Internet Protocol) and support conventional addressing and packetizing for the public Internet 170.

Any portion of the map database or coverage database may be transmitted to and stored in a location other than the robot 200, e.g., a local hub 110 or gateway within the household, a hub, gateway, server or similar on the Internet, or virtualized instances of the same available on the Internet.

Figure 5:
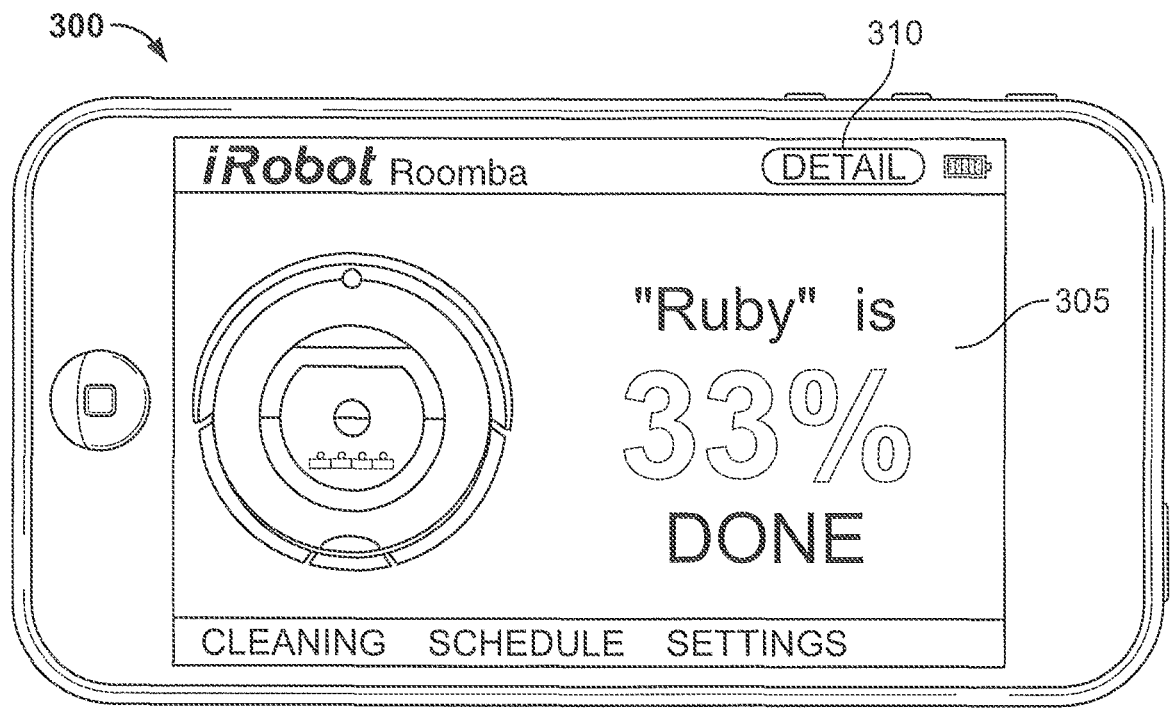
FIGS. 5-18 are plan views of a mobile user terminal which may form a part of the environmental management system of FIG. 1, illustrating screen displays of the mobile user terminal and related operations according to methods and computer program product embodiments of the present invention.
Figure 6:
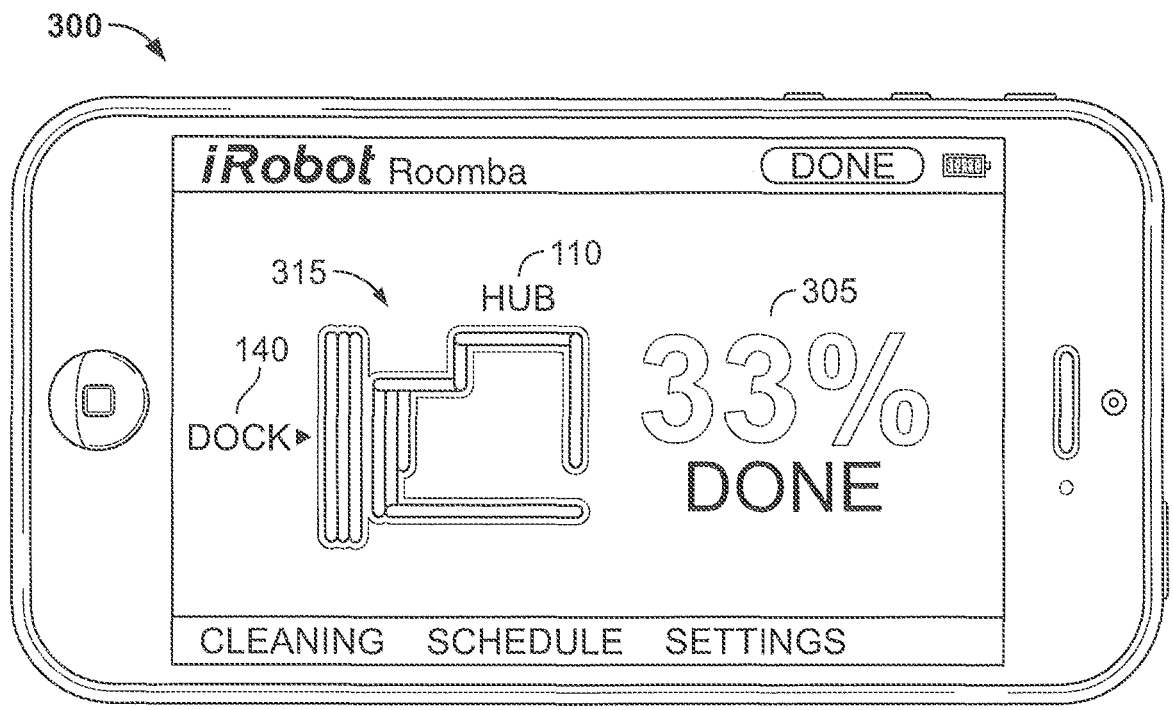

In some embodiments according to the first aspect, or according to an invention disclosed herein, and as illustrated in FIGS. 5 and 6, an application executed by a mobile terminal or device 300 (including but not limited to, for example, a mobile telephone, smart phone or tablet) receives the progressively improving map as well as the covered area within the progressively improving map, compares the two, and displays a representation of the comparison, such as a completion ratio 305 (e.g., percent covered or done by the mobile robot 200). The application instantiates and maintains a user interface element 310 for an end user (e.g., the user of the mobile device 300) to activate to elect to examine the covered area and/or progressively improving map 315 itself. The mobile device 300 may be the local user terminal 142 including a touchscreen HMI, for example.

When the end user activates the user interface element (e.g., the application icon on the touchscreen of the mobile device 300), the application executes a graphical representation of the progressively improving map and the same is displayed, and within this graphical representation, a second graphical representation of the covered area is displayed. It should be noted that the first graphical representation may be replaced with an envelope limiting the extent of the second graphical representation. Optionally, physical devices or locations (such as the location of a robot dock, or the location of an internet gateway) may be localized by the robot 200 and displayed by the application in positions relative to the first graphical representation of the progressively improving map.

Figure 7:
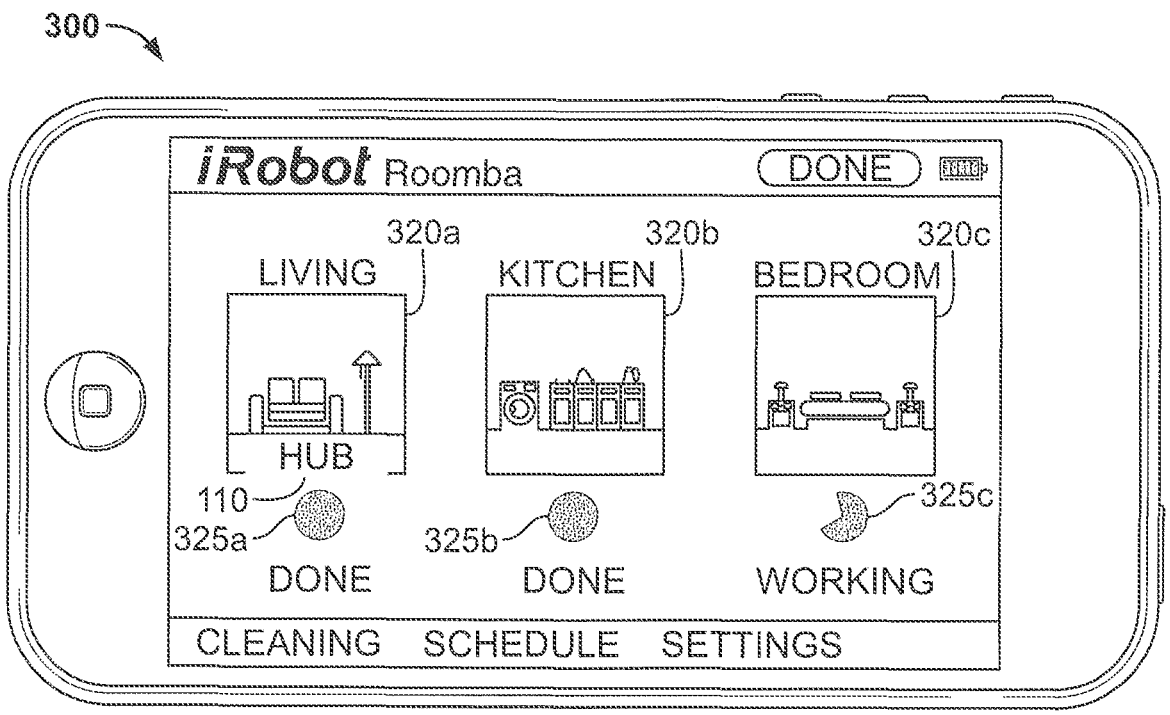

According to FIG. 7, in an alternative example, when the user interface element is activated, the application executes a graphical representation of room identity markers 320a, 320b, 320c within the progressively improving map coupled with a completion ratio 325a, 325b, 325c for subdivisions of the complete or progressively improving map 315. That is, each subdivision may have its own completion ratio 325a, 325b, 325c, which may be derived, for example, by comparing the covered area to each subdivision. Optionally, physical devices or locations (such as the location of a robot dock 140, or the location of an Internet gateway or hub 110) may be localized by the robot 200 and displayed by the application in positions corresponding to their subdivision.

Figure 8:
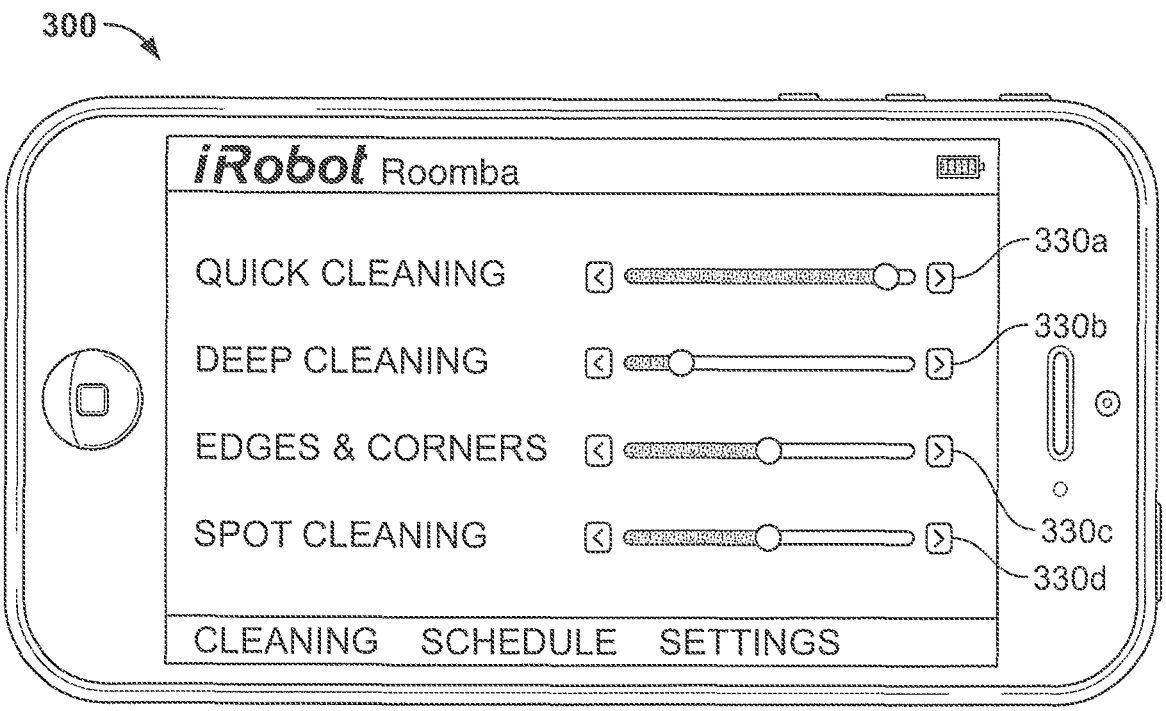
Figure 9:
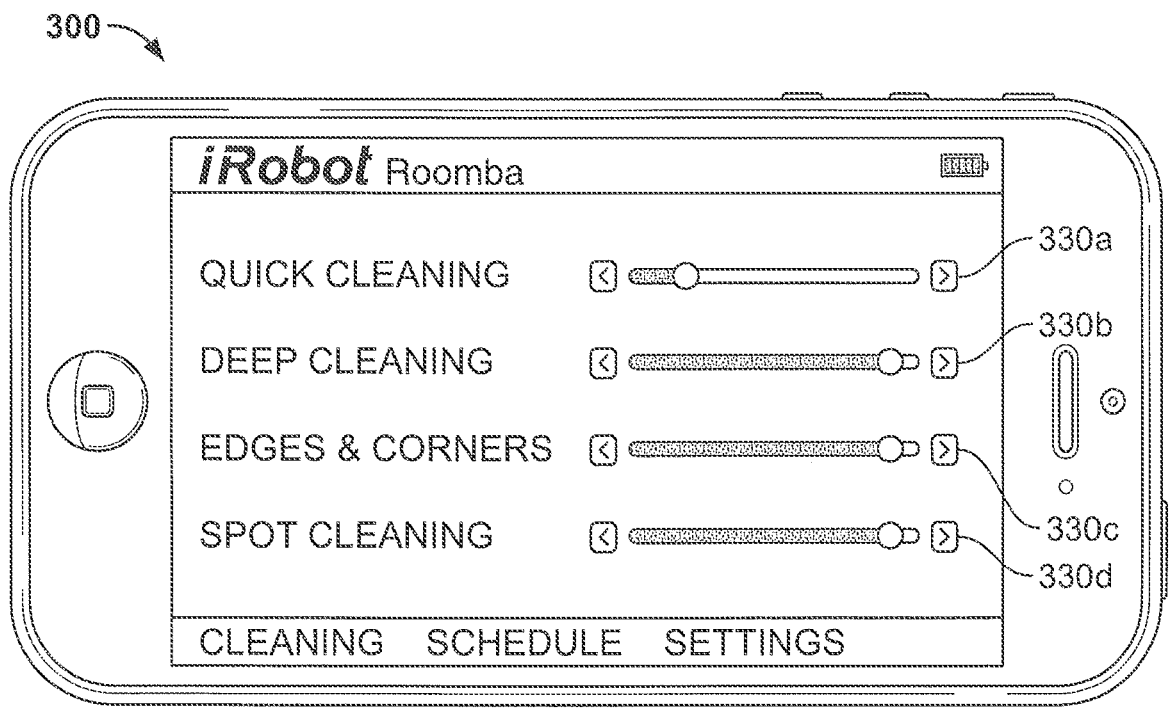

In accordance with FIGS. 8 and 9, according to a second aspect an autonomous mobile robot 200 is provided with the elements noted above, and also interacting tunable parameters 330a-330d within its cleaning strategy.

For example, a mobile cleaning robot 200 is theoretically able to execute substantially single-pass coverage (i.e., clean each portion of surface area one time and one time only), by following a strategy to cover only area within the progressively improving map 315 that has not already been covered. Perfect single-pass coverage is challenging with an unknown map. Substantial single-pass coverage would be, for example, where the areas that needed to be reached within the progressively improving map were separated by already-covered patches.

This would seem to be ideal, as single-pass coverage is the fastest way to complete the room. However, depending upon the efficacy of a cleaning, spreading, mopping, vacuuming effector, two-pass coverage, or multi-pass coverage, may be the best way to clean. Many stubborn particulates need multiple pass coverage to be adequately cleaned.

Moreover, end users have shown a marked preference for spot cleaning (i.e., cleaning where they can visibly identify a dirt patch themselves, or where dirt is known to be) and also for edge and corner cleaning. Preferences aside, this can also increase overall efficacy, as repeated cleaning of a known dirty area can improve the average level of cleanliness, and corners and edges naturally accumulate dirt with ordinary traffic in any home.

However, these goals (single-pass or "quick" cleaning, multi-pass or "deep" cleaning, spot cleaning, and edge and corner cleaning) are to some extent mutually exclusive. If a mobile cleaning robot 200 repeatedly addresses a dirty spot, it cannot achieve substantially single-pass cleaning (because the dirty spot has been passed over) and will take more time to complete the entire room (absent changes in cleaning power or speed). If a robot 200 follows the perimeter of obstacles and walls twice instead of once, similarly, it takes longer than a single pass.

As such, these goals are correlated with one another. If a robot 200 is commanded to execute the best possible single-pass coverage as an overriding goal, it will never do spot coverage or address edges more than once, and can only begin to perform multiple passes (two, three or more) once the first pass is complete.

Tunable parameters within a cleaning strategy may include time balance (e.g., spend 80 percent of time in single pass mode, entering spot covering mode only 20 percent of opportunities); sensitivity (e.g., enter spot covering mode only when a threshold is crossed, interrupting other modes only upon that threshold event); power output (faster agitation or higher vacuum airflow); and/or forward speed (the traveling speed across a floor).

In one implementation, attention among these goals may be balanced by controlling one or more parameters to lower as one or more than one other parameters increase.

For example, if a slider control is provided in a user interface to represent single pass or quick cleaning goal orientation—for example, 0-100 points of orientation—then a linked, simultaneously and optionally oppositely moving slider may represent multi-pass or deep cleaning orientation. Should the quick cleaning slider 330a be moved to 100 points or percent of attention, such as illustrated in FIG. 8, the robot's 200 cleaning strategy may seek to revisit cleaned areas as little as possible (and the coupled multi-pass slider 330b is automatically coupled to decrease to 0 or very few points). Note that the slider controls in this example reflect a parameter available to the robot's 200 cleaning strategy.

Should the slider 330a be moved to a 50-50 position (with the multi-pass slider coupled to move there as well), the robot's 200 cleaning strategy may seek to prioritize exploring uncertain areas, edges, corners, or map frontiers more, or may concentrate on re-covering proximate areas (e.g., in a different direction).

Another pair of potentially linked sliders may be spot cleaning 330d and edge and corner cleaning 330c. As noted, there are different ways of having two conflicting goals interact. In this case, one way would be to permit the robot 200 to spot clean and/or edge clean opportunistically (upon sensing either of dirt/spot opportunity with optical or piezo sensing, or edge opportunity with proximity sensing), but should both opportunities be detected simultaneously, to permit the higher setting to win more often. This may show a shift in cleaning strategy at 70 percent versus 30 percent "winning" percentage, for example. It should be noted that the sliders or coupled parameters can be set to change interactive principle at along the attention or orientation range. For example, in more skewed or imbalanced settings. e.g., 90 percent versus 10 percent, the robot 200 could begin to ignore opportunities to, for example, spot clean to pursue more opportunities to edge clean.

More than two sliders or tunable parameters may be linked. For example, if all of the quick clean, deep clean, spot clean, and edge clean sliders 330a-330d were linked, moving any one of them may move the others to less emphasis or more emphasis (e.g., in the corresponding direction of slider and attention parameter). As a specific example, if a spot cleaning attention parameter were increased, the robot's 200 reactive threshold to dirt detection could be lowered (or frequency of response, or other parameter that translates into increased orientation). In such a case, the robot 200 may be expected to repeatedly cover already covered areas (lowering the quick clean slider 330a and a corresponding parameter), to spend less time on edges and corners (lowering that slider 330c and corresponding parameter), and to re-cover more areas (increasing the multiple pass slider 330b and corresponding parameter).

The second aspect may include an application executed by a mobile device (including but not limited to a mobile telephone, smart phone or tablet) the receives the current state of the interactive parameters from the robot 200, instantiates user interface controls representative of the relative states (such as slider controls 330a-330d), and displays a representation of the relative states of the parameters using those controls. The application monitors the user interface elements or controls for an end user (e.g., the user of the mobile device 300) to activate to change a parameter, or a percentage emphasis on a parameter, or the like.

When the end user activates the user interface element, the application on the mobile device 300 executes a graphical representation of the progressively changing parameter, and simultaneously with representing the change in one parameter, alters one or more other controls to display a coupled parameter changing simultaneously with the user-controlled activity in the active control.

Figure 10:
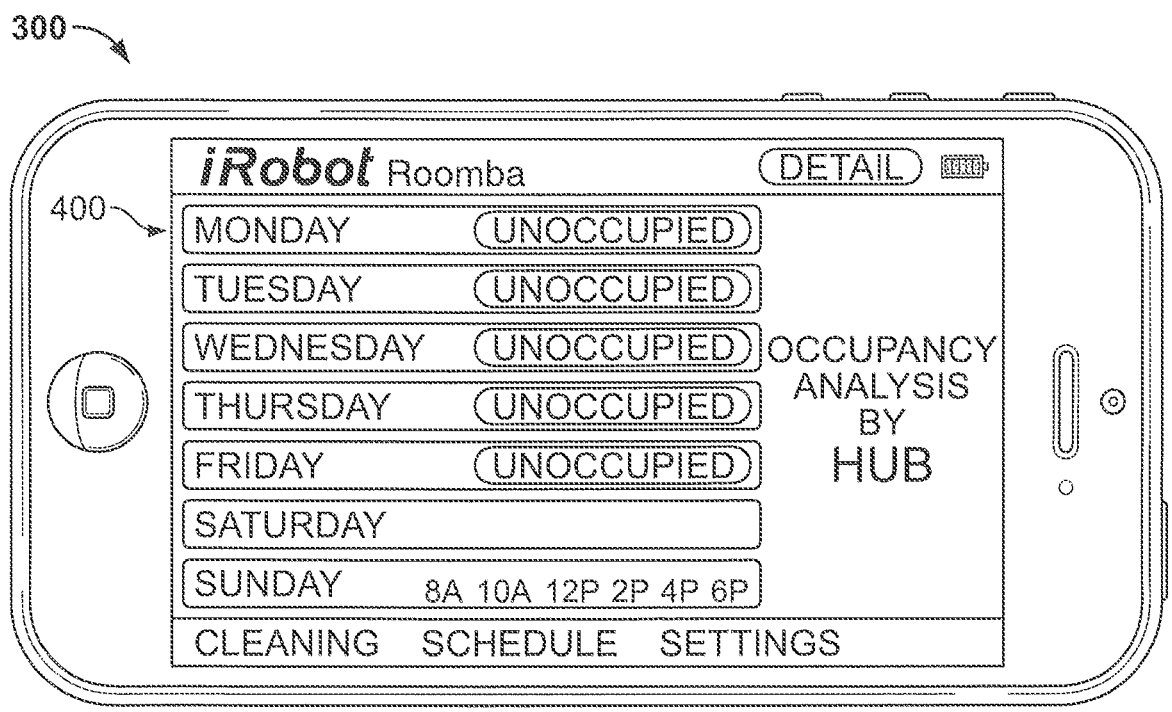
Figure 11:
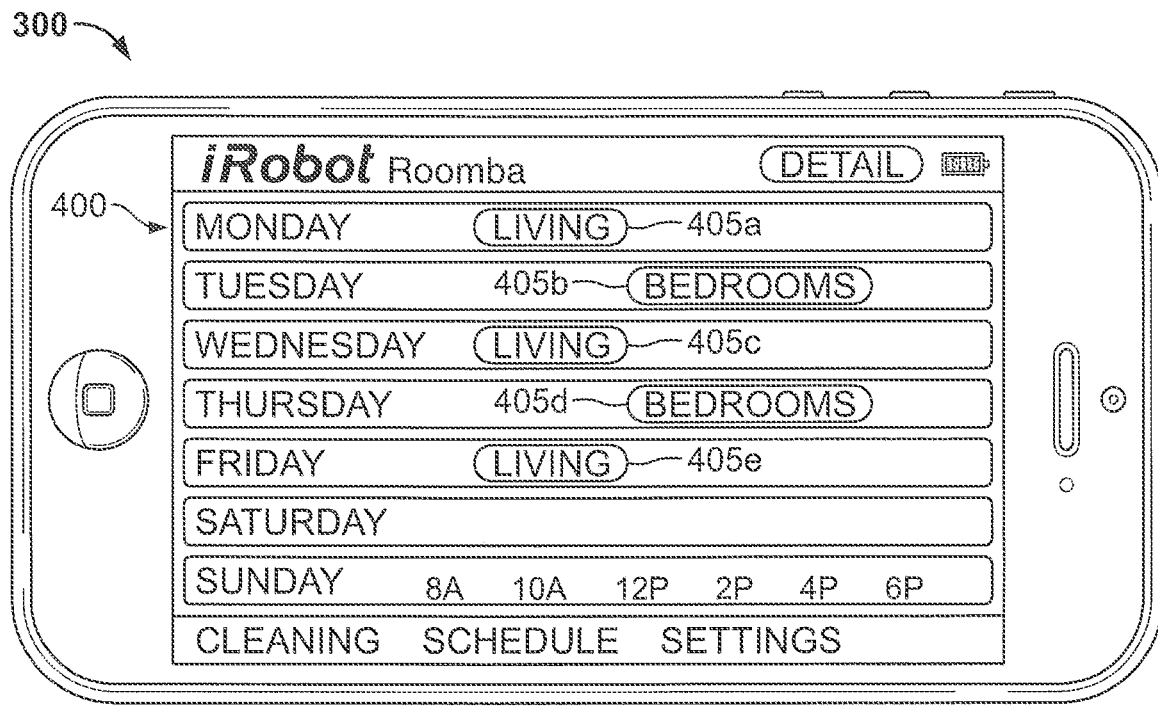
Figure 12:
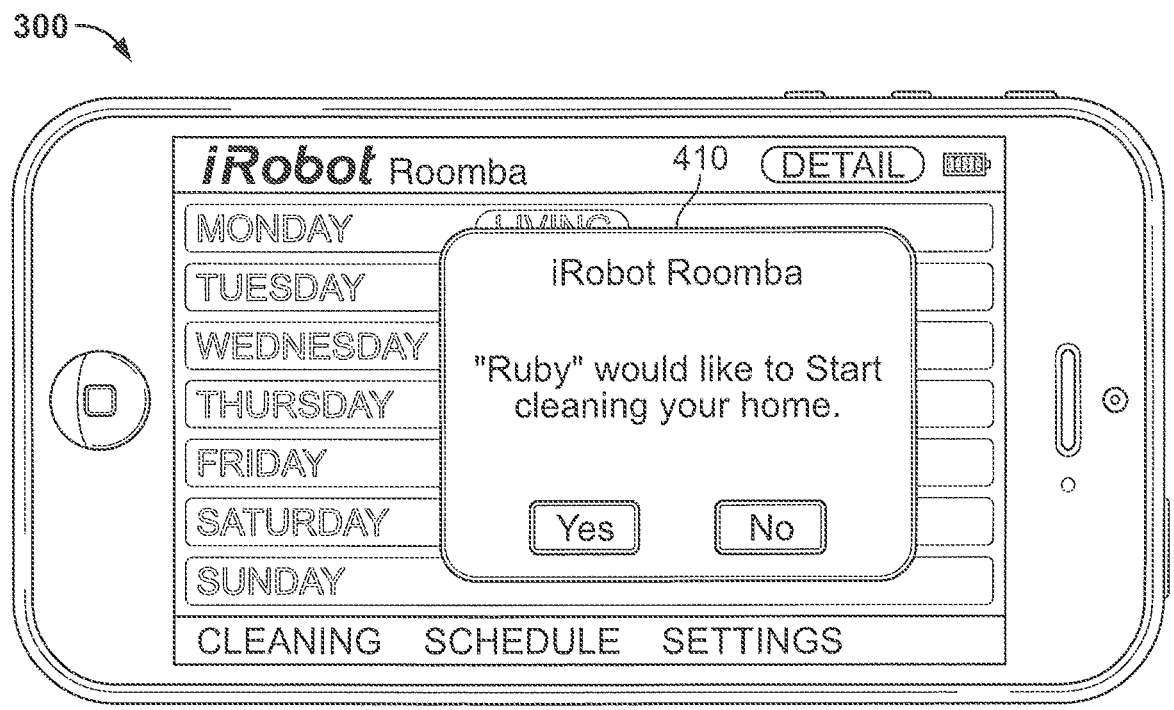

Turning now to FIGS. 10-12, in another embodiment according to a third aspect, or according to an invention disclosed herein, an autonomous mobile robot 200 is provided with sufficient timer and scheduling capability to self-initiate cleaning on a schedule or be commanded to initiate remotely, as well as sufficient connectivity to communicate schedules and receive commands. In addition, the robot 200 may include connectivity to a local access point or hub 110 which includes, or is connected to, an occupancy sensor. One example of such an Access Point 110 is the NEST™ thermostat, which in addition to controlling household temperatures is connected to the public Internet 170 and local Internet of Things articles via IEEE 802.11 and 802.14 protocols and hardware and may address and exchange messages with remote clients and local articles. In addition, the NEST thermostat includes occupancy sensors (e.g., a passive infrared monitor which can detect passing human body heat and movement, a microphone which can detect ambient noise, and/or an ambient light sensor which can detect variations in light as passers-by obscure it).

In some embodiments, according to the third aspect, or according to an invention disclosed herein, the system of robot 200 and hub 110 (access point acting as a bridge between household Ethernet or 802.11 networks and the robot 200), for example, may include: a processor; a set of sensors collecting and/or human occupancy data from environmental electromagnetic, acoustic, or other sensing; an occupancy database including at least one progressively more accurate profile of household traffic and/or presence map; a scheduling database including data representing the intended missions compatible with the occupancy database.

In an example of data collection and communications message flow, the hub 110 may, over the course of a week or Ionizer, survey the local household and identify traffic patterns, with the goal of aligning cleaning schedules of the robot 200 with unoccupied household time(s). The data is analyzed (e.g., anomalies removed, etc.) and stored in an occupancy database.

The occupancy database may be retained by the hub 110, or communicated to the mobile robot 200. In general, it is advantageous to keep small data sets such as this on the mobile robot 200 itself because wireless communications in the home may be interrupted, noisy, or of varying strength throughout a large household.

Any portion of the databases discussed herein may be transmitted to and stored in a location other than the robot 200 (e.g., a local hub 110 or gateway within the household, a hub, gateway, server or similar on the Internet 170, or virtualized instances of the same available on the Internet 170). Most advantageously, the scheduling process works interactively with a charging and/or evacuating dock 140, such that the robot 200 may launch on schedule in a fully charged and/or empty (cleaning bin) state.

In another embodiment, or in an invention disclosed herein, an end user, presented with the occupancy opportunities may schedule activity of the robot in different ways, such as the following:

(1) Requesting the system (hub 110, robot 200, or either) to advantageously schedule household cleaning automatically in the best times available;

(2) Selecting times within the presented occupancy, and/or overriding suggestions from the auto-scheduler;

(3) Adding schedule elements even when the home is occupied, for other needs; or (4) Tuning room to room coverage, to designate rooms or areas for specific attention on a specific day.

This embodiment, or an invention disclosed herein, may use interactive user interface elements in a mobile device application.

As depicted in FIGS. 10 and 11, when the end user activates the user interface element on a mobile device 300, the application executes a graphical representation of the occupancy database 400 and displays the same. In a modification within this graphical representation 400, a second graphical representation of user selected times 405a-405e within the occupancy database is successively displayed or overlayed.

As depicted in the embodiment of FIG. 12, or in an invention disclosed herein, an end user may wish to be notified when the robot 200, hub 110, or combination of the two intend to launch a cleaning mission, even when the schedule has been approved (or the robot 200 is self-launching according to other criteria). This request notification 410 may be presented to the user on a remote user terminal 144, such as a remote mobile device 300. In some cases, the end user may wish to cancel the launch (for example, if the user is in fact at home but has simply been too quiet for occupancy sensing to operate).

Figure 13:
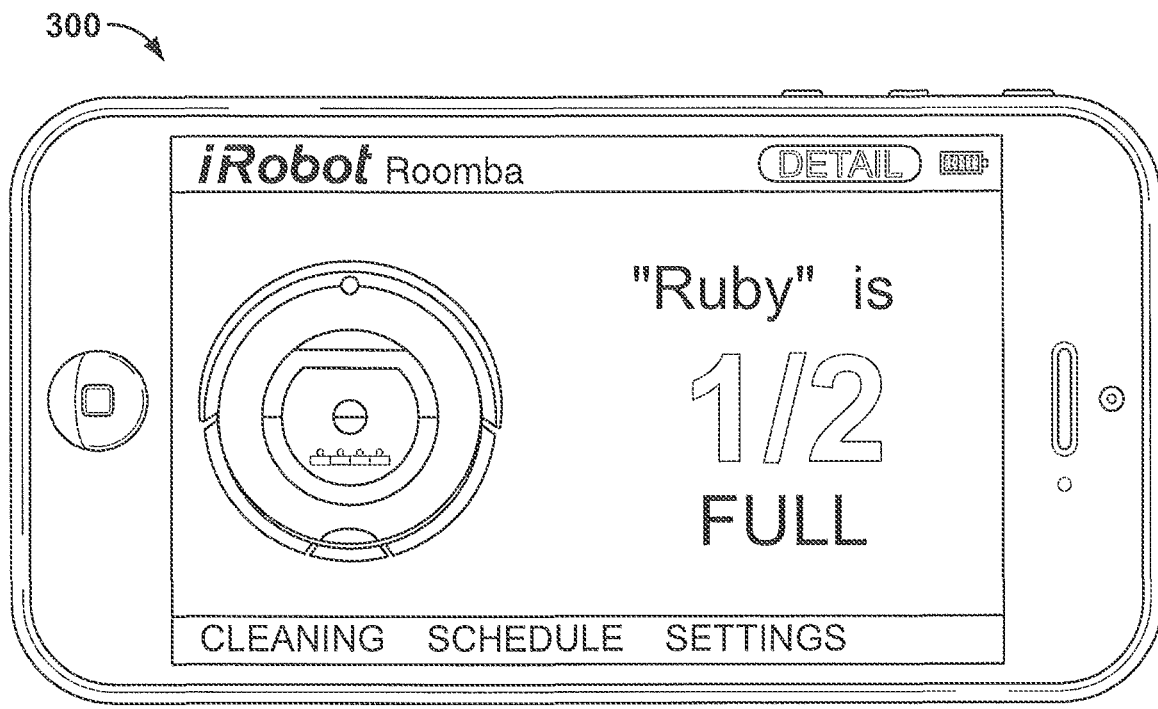
Figure 14:
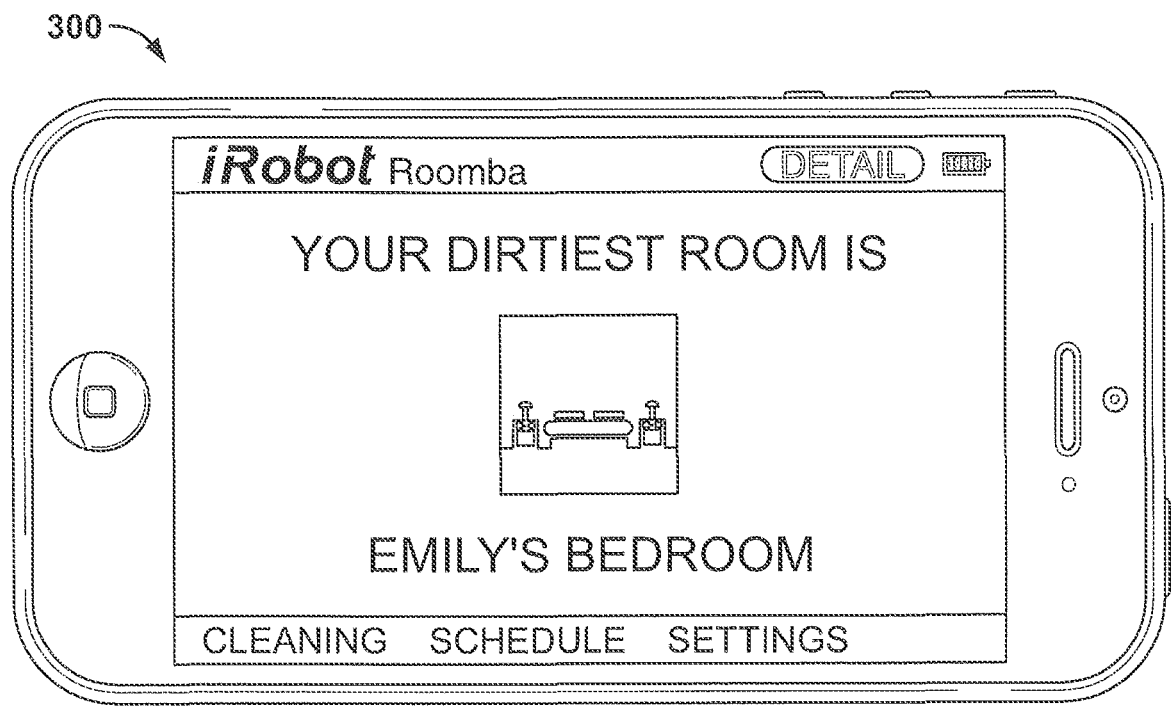

In other embodiments depicted in FIGS. 13 and 14, or in an invention disclosed herein, a user may launch an application via a user interface element on a mobile device 300 to provide calculated information that may be of interest to the user, such as the amount of matter collected by a cleaning robot 200 and/or the location at which the greatest amount of matter was collected. For example, a bin debris sensor may be used to track the amount of matter entering the robot collection bin. Using a known bin volume, the robot 200 may extrapolate the capacity occupied or remaining in the collection bin based on the amount and/or frequency of matter passing by the debris sensor. Additionally, in embodiments of the robot 200 having mapping capabilities, or in an invention disclosed herein, the robot 200 may track the rate of debris collection and/or the amount of debris collected at various delineated areas or compartments within a floor plan and identify the room containing the largest amount of collected debris.

Figure 20:
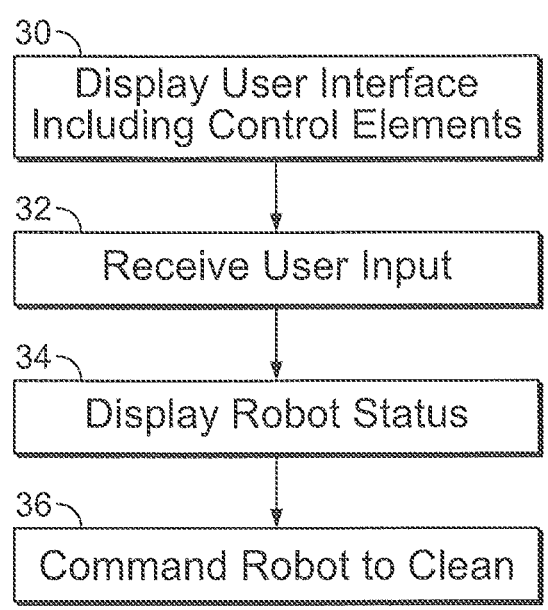
FIG. 20 is a schematic diagram of a household environment mapped and controlled by a mobile robot according to some embodiments or according to an invention disclosed herein.

With reference to the flowchart of FIG. 20, a computer-implemented method according to some embodiments of the present invention, or according to an invention disclosed herein, for receiving user commands for a remote cleaning robot and sending the user commands to the remote cleaning robot (the remote cleaning robot including a drive motor and a cleaning motor) is represented therein. The method includes displaying a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state (Block 30). User input is then received via the user-manipulable control elements (Block 32). Responsive to the user inputs, a real-time robot state reflecting a unique combination of control states is displayed simultaneously within the same control area (Block 34). Concurrently or thereafter, the remote cleaning robot is commanded to actuate the drive motor and cleaning motor to clean a surface based on the received input and unique combination of control states (Block 36).

Figure 15:
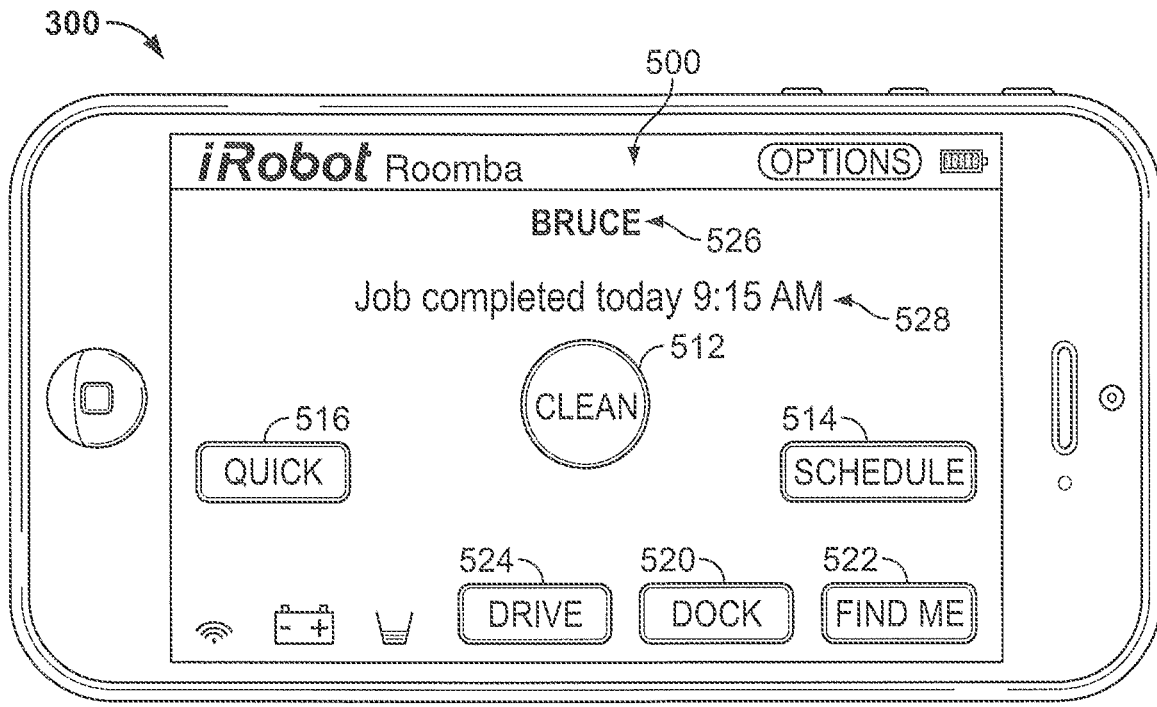

According to further embodiments, or according to an invention disclosed herein, and with reference to FIGS. 15-18, an application is provided on a mobile device 300 (which may be, for example, the local user terminal 142 having a touchscreen HMI) to provide additional functionality as described below. FIG. 15 shows an exemplary home screen 500 provided by the application to enable control and monitoring of the robot 200. The home screen 500 includes a control area 501 (the active input area of the touchscreen display of the device 300) and therein user manipulable control or interface elements in the form of a cleaning initiator button 512, a scheduling button 514, a cleaning strategy toggle button 516 (which toggles alternatingly between "QUICK" and "STANDARD" (not shown) status indicators when actuated), a dock recall button 520, a robot locator button 522, and a drive button 524. The home screen 500 may further display a robot identification 526 (e.g., a name ("Bruce") assigned to the robot 200 by the user) as well as one or more operational messages 528 indicating a status of the robot 200 and/or other data.

When activated, the cleaning initiator button 512 will cause the device 300 to command (via wireless signal) the robot 200 to begin a prescribed cleaning protocol.

The cleaning strategy button 516 can be used to select from a plurality of different available cleaning modes, settings or protocols, examples of which are discussed in more detail below. In particular, the cleaning strategy button has a primary cleaning strategy control state (i.e., "Standard clean" or "Deep clean") and an alternative cleaning strategy control state (i.e., "Quick clean").

Figure 16:
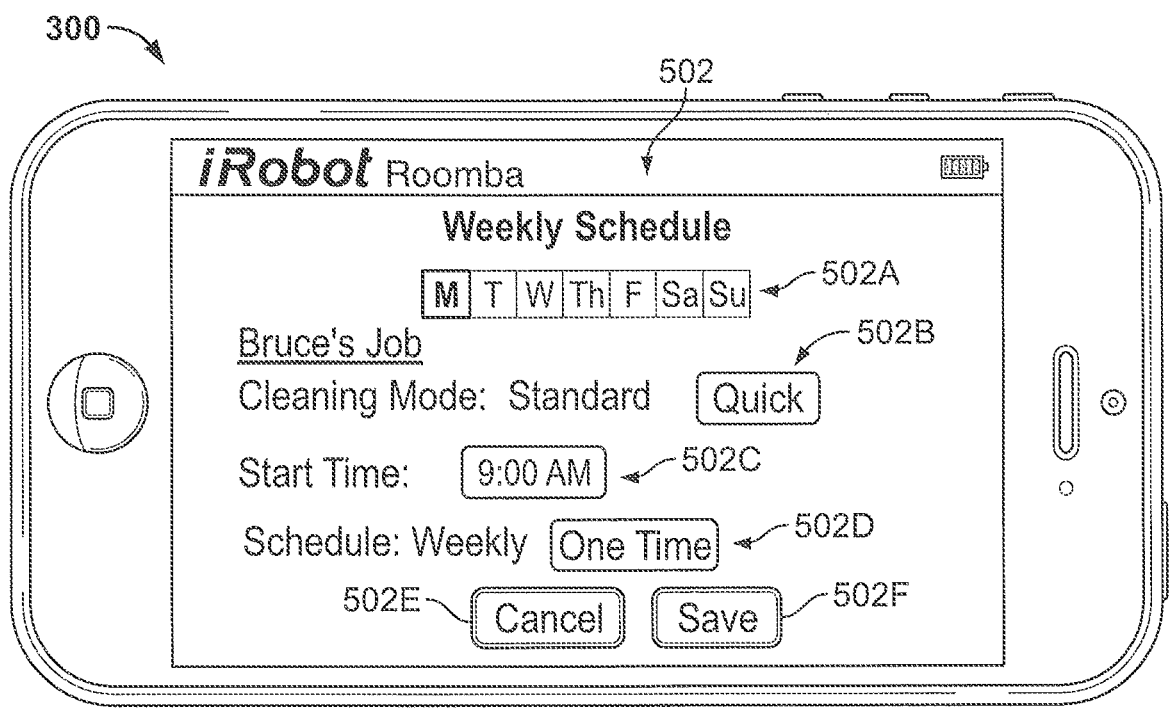

When activated, the scheduling button 514 will initiate a scheduling screen 502 as shown in FIG. 16. The user can use the control elements 502A-F therein to schedule a single cleaning operation/session or a periodic (e.g., weekly) cleaning operation/session by the robot 200. A cleaning mode (e.g., "Standard" or "Quick") as described below may be selected for each scheduled cleaning session using the control element 5021. A deferred command to begin and execute a configured cleaning operation or session can be initiated by actuating the "Save" button 502F.

The cleaning initiator button 512, the scheduling button 514, and the scheduling control elements 5024-F collectively form a user-manipulative launch control group. This launch control group has an immediate launch state (i.e., when the cleaning initiator button 512 is actuated) and a deferred launch control state (i.e., when the "Save" button 502F is selected).

The dock recall button 520 and the robot locator button 522 collectively form a physical recall control group. The physical recall group has an immediate recall control state (by actuating the dock recall button 520) and a remote audible locator control state (by actuating the robot locator button 522). When activated, the dock recall button 520 will cause the device 300 to command the robot 200 to return to the dock 140.

When activated, the robot locator button 522 will cause the device 300 to command the robot 200 to emit an audible signal (e.g., beeping from an audio transducer or speaker 274B; FIG. 3). The user can use the audible signal to locate the robot 200.

In use, the application on the device 300 receives user input via the above-described user manipulable control elements. Responsive to the user inputs, the application displays simultaneously on the device 300 within the control area 501 a real-time robot state reflecting the unique combination of the control states. The application further commands the robot 200 to actuate the drive system 230 (including a motive drive motor) and the service operation cleaning system 242 (including a cleaning motor or actuator for an end effector 242D) of the robot 200 to clean a surface based on the received input and unique combination of control states.

When actuated, the drive button 524 will initiate a robot motive control screen (not shown) including user manipulable control elements (e.g., a virtual joystick or control pad) that the user can use to remotely control the movement of the robot 200 about the living space.

Figure 17:
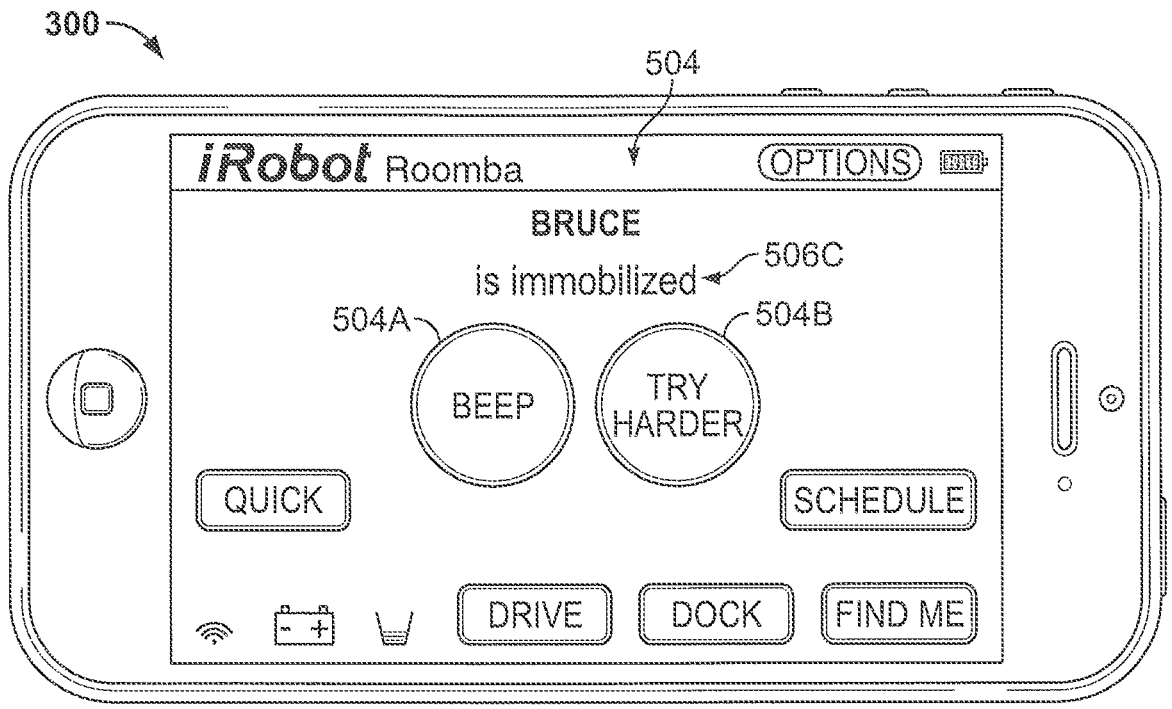

In some instances, the robot 200 may become immobilized or stuck during a cleaning session. According to some embodiments, or according to an invention disclosed herein, the robot 200 is enabled to recognize its immobilized condition and will send an alert signal to the user via the application on the device 300 (e.g., using SMS or email). The application will display an alert screen 504 as shown in FIG. 17 on the device 300. Additionally or alternatively, the alert screen 504 may be generated in response to the user actuating the cleaning initiator button 512 or the dock recall button 520 when the robot 200 is immobilized or otherwise unable to execute the commanded operation. The alert screen 504 includes one or more control elements manipulable by the user to perform a remedial, subsequent action. In some embodiments, or in an invention disclosed herein, a beacon control element such as a "Beep" button 504A can be actuated to command the robot 200 emit an audible signal from the audio transducer 274B. In some embodiments, or in an invention disclosed herein, an escape maneuver control element 504B can be actuated to command the robot 200 to execute one or more prescribed maneuvers to attempt to disengage or become unstuck.

As discussed above, the application may enable the user to select between two or more cleaning strategies or modes (e.g., using the toggle button 516). According to some embodiments, or according to an invention disclosed herein, the user can (using the toggle button 516) instruct the remote robot 200 to perform either: 1) a lower cumulative energy cleaning strategy (also referred to herein as "quick clean") with the control element 516 in a first or primary cleaning strategy control state; or a higher cumulative energy cleaning strategy (also referred to herein as "standard" or "deep clean") with the control element 516 in a second or alternative cleaning strategy control state. As used herein, "cleaning energy" may be deployed in various ways; for example, the robot can either go longer or repeat passes, or can increase motor power, or can otherwise do "more" (standard) or "less" (quick) cleaning. Typically, the quick cleaning options (e.g., as described below) are cumulatively less work. For example, in some embodiments, or in an invention disclosed herein, the robot 200 passes substantially only a single pass over each portion of the covered area in the quick clean strategy or control state, and passes substantially two passes (e.g., the passes crisscross) over each portion of the covered area in the deep clean strategy or control state.

According to some embodiments, or according to an invention disclosed herein, the lower cumulative energy cleaning strategy ("quick clean") includes one or more of the following:

a. The robot 200 travels a deterministic, systematic or planned single pass coverage or travel pattern or path. In some embodiments, or in an invention disclosed herein, the travel pattern follows a boustrophedon path.

b. The robot 200 travels at faster forward speed (as compared to the deep cleaning control state) across the surface.

c. The robot 200 concentrates its cleaning in open areas.

d. The cleaning coverage of the robot 200 is configured to cover the most distance from the dock 140.

e. The robot 200 travels at at faster forward speed (as compared to the deep cleaning control state) across the surface combined with a higher vacuum power.

f. The robot 200 does not use a discovery process, but instead navigates using a stored map.

g. The robot 200 travels primarily only along rows in one direction (i.e., pattern is parallel rows with little or no crossing of rows).

h. The robot 200 does not detect the density of the dirt lifted from the surface being cleaned.

i. The robot 200 does detect the density of the dirt lifted from the surface being cleaned (e.g., using the dirt sensor 242C) and controls its path, speed or power in view thereof, but the dirt detection threshold required to trigger such modification to its cleaning operation is set at a higher threshold (as compared to the deep cleaning control state).

j. The robot 200 does not evacuate its onboard debris bin 242B during the cleaning session (i.e., except at the end of the cleaning session).

k. The robot 200 spends less time cleaning around time consuming clutter (e.g., table, chairs) (as compared to the deep cleaning control state).

l. The robot 200 cleans high traffic areas first.

m. The robot 200 avoids cleaning under anything invisible to visitors (e.g., under beds, chairs and couches).

u. The robot 200 concentrates its cleaning in a designated area.

According to some embodiments, or according to an invention disclosed herein, the higher cumulative energy cleaning strategy ("standard clean" or "deep clean") includes one or more of the following:

a. The robot 200 travels a deterministic, systematic or planned multiple pass (two or more) coverage or travel pattern or path. In some embodiments, or in an invention disclosed herein, the travel pattern follows a crisscross path.

b. The robot 200 travels at slower forward speed (as compared to the quick cleaning control state) across the surface.

c. The robot 200 concentrates its cleaning, at least in part, on edges and corners of the living space.

d. The cleaning coverage of the robot 200 is configured to cover the area within a full perimeter circle about the dock 140.

e. The cleaning coverage of the robot 200 is configured to cover the area within a full perimeter circle about the dock 140 twice.

f. The robot 200 concentrates its cleaning in the same area it started in.

g. The robot 200 travels at a slower forward speed (as compared to the quick cleaning control state) across the surface combined with a higher vacuum power.

h. The robot 200 does uses more discovery (as compared to the quick cleaning control state; e.g., the robot 200 probes edges and corners more).

i. The robot 200 travels along rows in intersecting directions (e.g., a crisscross pattern).

j. The robot 200 detects the density of the dirt lifted from the surface being cleaned (e.g., using the dirt sensor 242C) and controls its path, speed or power in view thereof.

k. The robot 200 detects the density of the dirt lifted from the surface being cleaned and controls its path, speed or power in view thereof, and the dirt detection threshold required to trigger such modification to its cleaning operation is set at a lower threshold (as compared to the quick cleaning control state).

l. The robot 200 evacuates its onboard debris bin 242A during the cleaning session to increase vacuum power.

m. The robot 200 executes a two or more stage cleaning pattern including a systematic (one or more passes) cleaning pattern and a random and edge diffusion pattern.

n. The robot 200 executes a multi-stage cleaning pattern including alternating systematic and random patterns.

o. The robot 200 detects the density of the dirt lifted from the surface being cleaned and cleans more if more dirt is detected.

p. The robot 200 cleans hallways more than once.

q. The robot 200 cleans using a scrubbing action.

r. The robot 200 cleans until its battery runs out (parking on the floor) or until the battery level is very low (and the robot 200 then returns to the dock substantially depleted of battery charge). In this case, the robot 200 may execute a commanded cleaning pattern and then assume an end cleaning mode until the battery charge level is sufficiently low. The end cleaning mode may include, e.g., perimeter cleaning, random pattern cleaning, or cleaning concentrated on prescribed or detected high dirt areas.

s. The robot 200 spends more time cleaning around time consuming clutter (e.g., table, chairs) (as compared to the quick cleaning control state).

t. The robot 200 spends more time in high traffic areas (as compared to the quick cleaning control state).

u. The robot 200 concentrates its cleaning in a designated area.

v. The robot 200 spends more time on area rugs (as compared to the quick cleaning control state).

w. The robot 200 spends more time on area rug perimeters and edges (as compared to the quick cleaning control state).

x. The robot 200 seeks to clean under furniture for completeness (e.g., under beds, chairs and couches).

y. The robot 200 detects (e.g., using the dirt sensor 242C) the character or attributes of the dirt lifted from the surface being cleaned and controls its path, speed or power in view thereof. For example, the robot 200 provides less deep cleaning responsive to detection of fuzzy or fluffy dirt, and more deep cleaning responsive to detection of particulate or sandy dirt.

Figure 18:
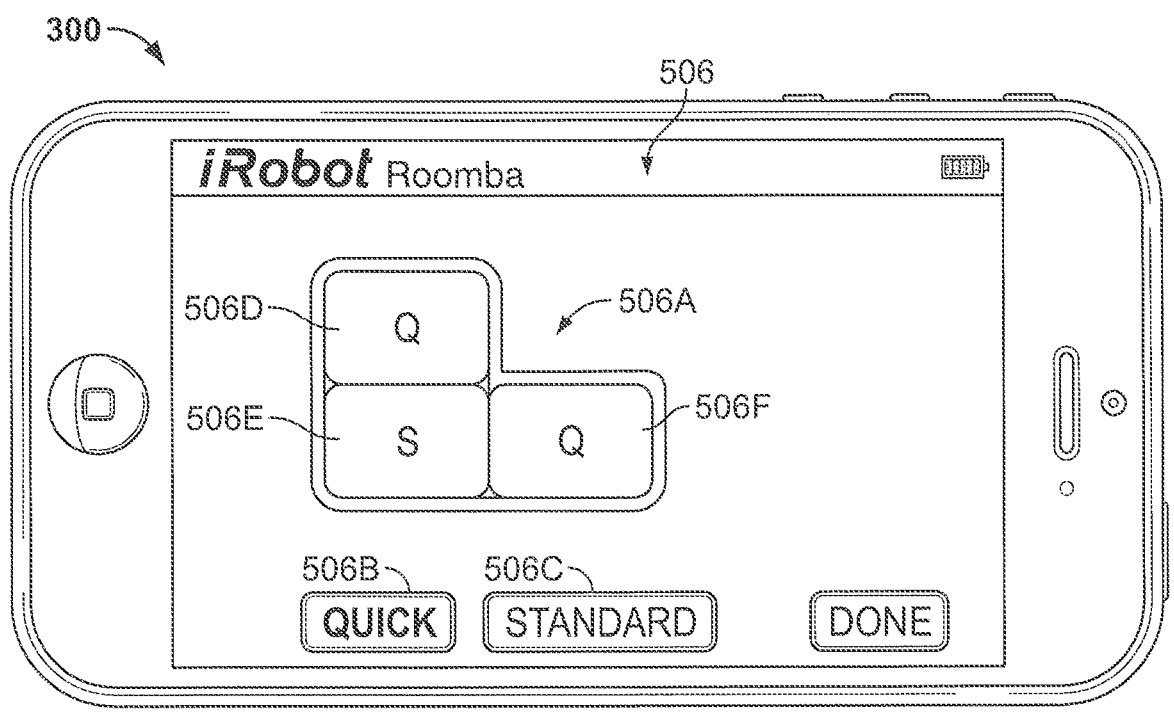

According to some embodiments, or according to an invention disclosed herein, the robot 200, in a given cleaning session, executes a lower cumulative energy cleaning strategy ("quick clean") in some areas of the coverage area and executes a higher cumulative energy cleaning strategy ("deep clean") in other areas of the coverage area. According to some embodiments or according to an invention disclosed herein, this multi-mode cleaning strategy includes combinations and permutations of one or more of the following:

a. The robot 200 sets the cleaning strategy for each area or region based on selected or prescribed focus criteria. The focus criteria may include the density or character of dirt collected by the robot 200 in the area.

b. The user, using the application on the device 300, sets the cleaning strategy based on selected or prescribed focus criteria.

c. The user, using the application on the device 300, sets the cleaning strategy for selected subregions or subsections of the area to be cleaned (e.g., different zones such as Zone A, Zone B and Zone C). With reference to FIG. 18, the application may provide an interface screen 506 including a graphical representation or map 506A of the area to be cleaned and cleaning strategy control elements (cleaning mode buttons 506B, 506C). The user can then use the cleaning mode buttons 506B, 506C to select the desired cleaning strategy and then select a region to be cleaned in this manner (e.g., by tracing around a selected area, touching the interior of a designated region 506D-F, or selecting a designated region from a list or the like). The map 506A and designated regions 506D-F may be generated from the map data discussed above and the robot 200 may conduct the cleaning operation with reference to the map and localization with respect thereto.

d. The robot 200 may set the cleaning level based on the floor type it detects (e.g., quick cleaning of hard surface and deep cleaning of carpet).

e. The robot 200 may identify area rugs and execute a deeper cleaning strategy (e.g., more time) on them.

f. The robot 200 may associate bump or other proximity events with detected dirt ingestion events and, in response thereto, execute deeper cleaning. These combined conditions indicate the presence of edges.

In some embodiments, or in an invention disclosed herein, the robot 200 is provided with an onboard, user actuatable cleaning mode selection switch 274C (e.g., a button) that can be used to switch the robot 200 between the quick and deep/standard cleaning modes of operation. The robot 200 may include one or more lights 274A or other indicators to indicate its cleaning mode status (i.e., quick clean or deep clean). The robot 200 may emit an audible signal or signals (using the audio transducer 274B) to indicate its cleaning mode status (e.g., a quick beep for quick clean mode and a long beep for deep dean mode).

According to some embodiments, or according to an invention disclosed herein, the robot 200 or the application on the device 300 is configured to estimate the remaining time required for the robot 200 to complete its cleaning operation and to report the same to the user. In some embodiments, or in an invention disclosed herein, the robot 200 or the application can estimate and report the estimated time required for each cleaning mode in the alternative.

In some embodiments, or in an invention disclosed herein, the user can set (using the application on the device 300, for example) the time available and the area to be cleaned, and the robot 300 or application can determine the appropriate or preferred cleaning mode(s) (quick, deep, or multi-mode) based on these criteria. In some embodiments, or in an invention disclosed herein, the robot 300 or application optimizes the user's original input settings, and the user can then decide whether to adopt the recommendation or proceed with the original settings. In some embodiments, or in an invention disclosed herein, the recommended new settings are indicated by reconfiguring the control elements on the user interface as discussed above, or new settings learned by the mobile robot 200 collecting and processing occupancy schedule.

Some of the determinations discussed above may utilize data derived from sensors that monitor dirt accumulation or extraction from the surface. Examples of such sensors may include instantaneous sensors such as piezoelectric or optical dirt detectors 242C integrated with the robot 200. Also, as discussed above, some determinations may utilize the detected fullness level of the debris bin 242A as detected by the bin level sensor 242B.

The system may further be configured to provide operational messages to the user based on conditions sensed by the robot 200 and/or data collected or derived by the application (e.g., messages 528 and 506C in FIGS. 15 and 17). The operational messages may include robot status messages and/or inquiry messages. For example, the system may display on the device 300 "You should do a deep clean soon: quick shows that the amount of dirt is higher than average. Would you like to schedule a deep clean? When? You are not normally at home Tuesdays at 11—how about tomorrow at 11?"

In some embodiments, or in an invention disclosed herein, the application on the device 300 enables the user to input designated high traffic areas for corresponding cleaning by the robot 200. In some embodiments, or in an invention disclosed herein, the robot 200 is configured to discover or detect and identify high traffic areas automatically and programmatically.

In some embodiments, or in an invention disclosed herein, the application on the device 300 enables the user to select a cleaning pattern or patterns (e.g., spirals, back and forth, crosswise, or scrubbing) the user believes or has determined are preferable in some regard (e.g., better, quicker, or deeper).

The remote user terminals as disclosed herein (e.g., terminals 142 and 300) may be communication terminals configured to communicate over a wireless interface, and may be referred to as "wireless communication terminals" or "wireless terminals." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infrared communication interface. In some embodiments, or in an invention disclosed herein, the remote user terminals 142, 300 are mobile terminals that are portable. In some embodiments, or in an invention disclosed herein, the remote user terminals 142, 300 are handheld mobile terminals, meaning that the outer dimensions of the mobile terminal are adapted and suitable for use by a typical operator using one hand. According to some embodiments, or according to an invention disclosed herein, the total volume of the handheld mobile terminal is less than about 200 cc and, according to some embodiments, or according to an invention disclosed herein, the total volume of the handheld mobile terminal is less than about 100 cc.

Figure 19:
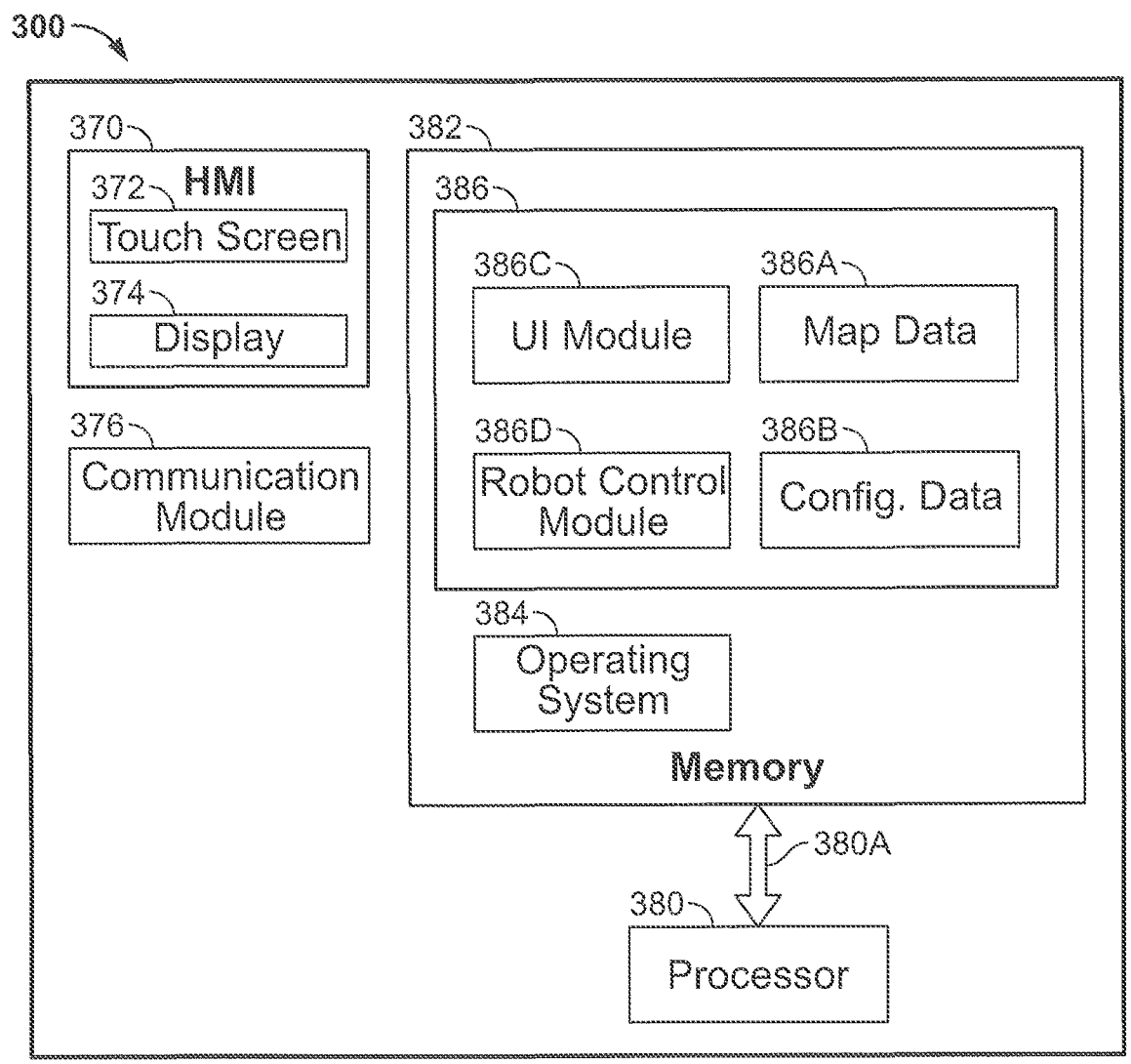
FIG. 19 is a schematic diagram of the user terminal of FIG. 1.

FIG. 19 is a schematic illustration of an exemplary user terminal that may be used as the user terminal 142 or 300 as discussed herein. The terminal 300 includes a human-machine interface (HMI) 370, a communication module, and a circuit or data processing system including a processor 380 and memory 382. The circuits and/or data processing systems may be incorporated in a digital signal processor. The processor 380 communicates with the HMI 370 and memory 382 via an address/data bus 380A. The processor 380 can be any commercially available or custom processor. The memory 382 is representative of the overall hierarchy of memory devices containing the software and data used to implement the functionality of the data processing system. The memory 382 can include, but is not limited to, the following types of devices: cache, ROM, PROM, EPROM, EEPROM, flash memory, SRAM, and DRAM.

The memory 382 may include several categories of software and data used in the data processing system: the operating system 384; applications (including the robot control and monitoring application 386); and the input/output (I/O) device drivers. The application 386 includes mapping data 386A (e.g., corresponding to the coverage map and/or representing the positions of objects or boundaries in the living space), configuration data 386B (e.g., corresponding to the settings and configurations of the application 386 on the terminal 300 and the robot 200), a user interface (UI) module 386C and a robot control module 386D. The UI module 386C includes logic for generating the control elements and other displayed components on the display 374 and for receiving inputs from the user via the HMI 370 (e.g., via the touchscreen 372). The robot control module 3861D includes logic for processing the user instructions and issuing commands to the robot 200 and receiving messages from the robot via a wireless communication module 376.

The display 374 may be any suitable display screen assembly. For example, the display screen 374 may be an active matrix organic light emitting diode display (AMO-LED) or liquid crystal display (LCD) with or without auxiliary lighting (e.g., a lighting panel).

The HMI 370 may include, in addition to or in place of the touchscreen 372, any other suitable input device(s) including, for example, a touch activated or touch sensitive device, a joystick, a keyboard/keypad, a dial, a directional key or keys, and/or a pointing device (such as a mouse, trackball, touch pad, etc.).

The wireless communication module 376 may be configured to communicate data over one or more wireless interfaces as discussed herein to the robot transmitter 252, the hub wireless communication module 112, or other desired terminal. The communication module 32 can include a direct point-to-point connection module, a WLAN module, and/or a cellular communication module. A direct point-to-point connection module may include a direct RF communication module or a direct IR communication module. With a WLAN module, the wireless terminal 300 can communicate through a WLAN (e.g., a router) using a suitable communication protocol.

In some embodiments, or in an invention disclosed herein, the wireless terminal 300 is a mobile radiotelephone forming a part of a radiotelephone communication system.

As will be appreciated by those of skill in the art, other configurations may also be utilized while still benefiting from the teachings of the present technology. For example, one or more of the modules may be incorporated into the operating system, the I/O device drivers or other such logical division of the data processing system. Thus, the present technology should not be construed as limited to the configuration of FIG. 19, which is intended to encompass any configuration capable of carrying out the operations described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system" Furthermore, aspects of the present disclosure may take the form of a computer program product embodied in one or more computer readable media having computer readable program code embodied thereon.

Any combination of one or more non-transitory computer readable media may be utilized. Non-transitory computer readable media comprises all computer readable media, with the exception of transitory, propagating signals. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure, or according to an invention disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, or in an invention disclosed herein, and that modifications to the disclosed embodiments, as well as other embodiments, are intended to be included within the scope of an invention disclosed herein.

That which is claimed is:

1. A system for operating a cleaning robot, the system comprising:
   a user terminal configured to provide at least one user-selectable pre-planned cleaning strategy control element having a plurality of cleaning strategies including at least a deep cleaning strategy control state and a quick cleaning strategy control state; and
   a controller configured to:
      responsive to a user selection of the deep cleaning strategy control state, generate a control signal to the cleaning robot to execute a deep cleaning strategy to clean a first area; and
      responsive to a user selection of the quick cleaning strategy control state, generate a control signal to the cleaning robot to execute a quick cleaning strategy to clean a second area more extensive in size and farther away from a dock station than the first area.

2. The system of claim 1, wherein the deep cleaning strategy includes the cleaning robot concentrating its cleaning on edges and corners of a living space.

3. The system of claim 1, wherein the at least one user-selectable pre-planned cleaning strategy control element comprises a cleaning strategy button configured to receive user selection from a plurality of different cleaning modes, the plurality of different cleaning modes comprises at least the deep cleaning strategy control state and the quick cleaning strategy control state.

4. The system of claim 1, wherein the at least one user-selectable pre-planned cleaning strategy control element comprises a graphically displayed element for receiving a user input.

5. The system of claim 1, wherein the quick cleaning strategy control state comprises a deterministic, planned travel pattern over a cleaning area in a single-pass.

6. The system of claim 1, wherein the quick cleaning strategy control state comprises a faster forward speed as compared to a speed in the deep cleaning strategy control state.

7. The system of claim 1, further comprising a display configured to generate a graphical representation of a map of an area at the user terminal, the graphical representation comprising a plurality of subdivisions of the map,
   wherein to provide the at least one user-selectable pre-planned cleaning strategy control element includes to receive a user input to select an associated cleaning strategy from the plurality of cleaning strategies for one or more of the plurality of subdivisions of the map.

8. The system of claim 7, wherein the plurality of subdivisions of the map comprise a room identity.

9. The system of claim 8, wherein the room identity comprises an area of the map, a transition line from one subdivision to another subdivision, or as localized markers within the map.

10. The system of claim 7, wherein the plurality of subdivisions of the map comprise at least a first subdivision corresponding to a first cleaning strategy and a second subdivision corresponding to a second cleaning strategy that is different from the first cleaning strategy, the first cleaning strategy and the second cleaning strategy each selected from the plurality of cleaning strategies.

11. The system of claim 1, wherein the quick cleaning strategy includes the cleaning robot concentrating its cleaning in open areas and/or in designated areas.

12. The system of claim 1, wherein the quick cleaning strategy includes avoiding dirt detection by the cleaning robot, or setting a relatively higher dirt detection threshold to trigger a modification of cleaning operation as compared to the deep cleaning strategy.

13. A computer-implemented method for operating a cleaning robot, the method comprising:
   providing at least one user-selectable pre-planned cleaning strategy control element at a user terminal, the at least one user-selectable pre-planned cleaning strategy control element having a plurality of cleaning strategies including at least a deep cleaning strategy control state and a quick cleaning strategy control state, wherein:
   responsive to selection of the deep cleaning strategy control state, the user terminal commands the cleaning robot to execute a deep cleaning strategy; and
   responsive to selection of the quick cleaning strategy control state, the user terminal commands the cleaning robot to execute a quick cleaning strategy to prioritize cleaning of a high-traffic area before a low-traffic area during a cleaning session.

14. The computer-implemented method of claim 13, wherein the at least one user-selectable pre-planned cleaning strategy control element comprises a cleaning strategy button configured to receive user selection from a plurality of different cleaning modes, the plurality of different cleaning modes comprises at least the deep cleaning strategy control state and the quick cleaning strategy control state.

15. The computer-implemented method of claim 13, wherein the quick cleaning strategy control state comprises a deterministic, planned travel pattern over a cleaning area in a single-pass.

16. The computer-implemented method of claim 13, further comprising displaying a graphical representation of a map of an area at the user terminal, the graphical representation comprising a plurality of subdivisions of the map comprising at least a first subdivision corresponding to the deep cleaning strategy and a second subdivision corresponding to the quick cleaning strategy,
  wherein providing the at least one user-selectable pre-planned cleaning strategy control element includes receiving a user input to select an associated cleaning strategy from the plurality of cleaning strategies for one or more of the plurality of subdivisions of the map.

17. A computer-implemented method for operating a cleaning robot, the method comprising:
  providing at least one user-selectable pre-planned cleaning strategy control element at a user terminal, the at least one user-selectable pre-planned cleaning strategy control element having a plurality of cleaning strategies including at least a deep cleaning strategy control state and a quick cleaning strategy control state, wherein:
  responsive to selection of the deep cleaning strategy control state, the user terminal commands the cleaning robot to execute a deep cleaning strategy; and
  responsive to selection of the quick cleaning strategy control state, the user terminal commands the cleaning robot to execute a quick cleaning strategy to avoid, or spend relatively less time, cleaning invisible or less-visible areas, as compared to the deep cleaning strategy.

18. The computer-implemented method of claim 17, wherein the at least one user-selectable pre-planned cleaning strategy control element comprises a cleaning strategy button configured to receive user selection from a plurality of different cleaning modes, the plurality of different cleaning modes comprises at least the deep cleaning strategy control state and the quick cleaning strategy control state.

19. The computer-implemented method of claim 17, wherein the quick cleaning strategy control state comprises a deterministic, planned travel pattern over a cleaning area in a single-pass.

20. The computer-implemented method of claim 17, further comprising displaying a graphical representation of a map of an area at the user terminal, the graphical representation comprising a plurality of subdivisions of the map comprising at least a first subdivision corresponding to the deep cleaning strategy and a second subdivision corresponding to the quick cleaning strategy,
  wherein providing the at least one user-selectable pre-planned cleaning strategy control element includes receiving a user input to select an associated cleaning strategy from the plurality of cleaning strategies for one or more of the plurality of subdivisions of the map.

\* \* \* \* \*

UNITED STATES PATENT AND TRADEMARK OFFICE
CERTIFICATE OF CORRECTION

| | |
|---|---|
| PATENT NO. | : 11,648,685 B2 |
| APPLICATION NO. | : 16/138155 |
| DATED | : July 2, 2024 |
| INVENTOR(S) | : Schneider et al. |

It is certified that error appears in the above-identified patent and that said Letters Patent is hereby corrected as shown below:

On the Title Page

In Column 1, under "Related U.S. Application Data", Line 1, delete "(60)" and insert --(62)-- therefor Signed and Sealed this
Twentieth Day of August, 2024

Katherine Kelly Vidal
*Director of the United States Patent and Trademark Office*